United States Patent [19]

Sawasaki et al.

[11] Patent Number: 5,838,365
[45] Date of Patent: Nov. 17, 1998

[54] TRACKING APPARATUS FOR TRACKING IMAGE IN LOCAL REGION

[75] Inventors: Naoyuki Sawasaki; Masahiko Sato, both of Kawasaki, Japan

[73] Assignee: Fujitsu Limited, Kawasaki, Japan

[21] Appl. No.: 521,076

[22] Filed: Aug. 29, 1995

[30] Foreign Application Priority Data

Sep. 20, 1994 [JP] Japan ................................. 6-225419
Jul. 5, 1995 [JP] Japan ................................. 7-170058

[51] Int. Cl.⁶ ........................................................ G01S 7/00
[52] U.S. Cl. ........................... 348/169; 342/189; 348/171
[58] Field of Search ........................... 364/516; 382/103; 342/189, 378; 348/169

[56] References Cited

U.S. PATENT DOCUMENTS

| 4,220,967 | 9/1980 | Ichida et al. | 348/699 |
| 4,864,629 | 9/1989 | Deering | 382/34 |
| 4,958,224 | 9/1990 | Lepore et al. | 348/171 |
| 5,285,273 | 2/1994 | James et al. | 348/169 |
| 5,365,269 | 11/1994 | Holmes et al. | 348/297 |

FOREIGN PATENT DOCUMENTS

| 0 005 918 | 12/1979 | European Pat. Off. . |
| 58-163019 | 9/1983 | Japan . |
| 59-079868 | 5/1984 | Japan . |
| 4-115376 | 4/1992 | Japan . |

OTHER PUBLICATIONS

Richardson et al., "STi 3220 motion estimation processor," *Microprocessors and Microsystems*, vol. 17, No. 7, Sep. 1993, pp. 425–434, Jordan Hill, Oxford, GB, XP000397915.

*Primary Examiner*—Thomas Peeso
*Attorney, Agent, or Firm*—Staas & Halsey

[57] ABSTRACT

A local region image tracking apparatus continuously tracks an arbitrary local region within a search image that is described by search image data by comparing the search image data to be subjected to a tracking process out of input image data picked up by image pickup means with reference image data related to the arbitrary local region. The local region image tracking apparatus includes an image data bus transferring the input image data from the image pickup means, and a plurality of correlation tracking processors coupled in parallel to the image data bus and respectively capable of independently carrying out the tracking process with respect to at least one search image, where the tracking process with respect to one or a plurality of search images is distributively carried out by the correlation tracking processors.

50 Claims, 63 Drawing Sheets

FIG.14

| ROM ADDRESS (5bit) | INPUT IMAGE MEM SELECT SIGNAL (2bit) | SEARCH IMAGE MEM SELECT SIGNAL (2bit) | REF IMAGE MEM SELECT SIGNAL (2bit) |
|---|---|---|---|
| 2 | 2 | 0 | 1 |
| 3 | 0 | 2 | 1 |
| 4 | 1 | 0 | 2 |
| 5 | 0 | 1 | 2 |
| 8 | 2 | 1 | 0 |
| 9 | 1 | 2 | 0 |
| 12 | 0 | 1 | 2 |
| 13 | 1 | 0 | 2 |
| 16 | 1 | 2 | 0 |
| 17 | 2 | 1 | 0 |
| 18 | 0 | 2 | 1 |
| 19 | 2 | 0 | 1 |

FIG.21

| ROM ADDRESS (10bit) | REF IMAGE MEM SELECT SIGNAL (3bit) | SEARCH IMAGE MEM SELECT SIGNAL (3bit) | INPUT IMAGE MEM SELECT SIGNAL (3bit) |
|---|---|---|---|
| 20 | 1 | 2 | 3 |
| 21 | 1 | 3 | 2 |
| 34 | 2 | 1 | 3 |
| 35 | 2 | 3 | 1 |
| 166 | 2 | 3 | 0 |
| 167 | 2 | 0 | 3 |
| 180 | 3 | 2 | 0 |
| 181 | 3 | 0 | 2 |
| 278 | 1 | 3 | 0 |
| 279 | 1 | 0 | 3 |
| 306 | 3 | 1 | 0 |
| 307 | 3 | 0 | 1 |
| 304 | 3 | 0 | 1 |
| 305 | 3 | 1 | 0 |
| 262 | 0 | 3 | 1 |
| 263 | 0 | 1 | 3 |
| 416 | 2 | 0 | 1 |
| 417 | 2 | 1 | 0 |
| 388 | 0 | 2 | 1 |
| 389 | 0 | 1 | 2 |
| 176 | 3 | 0 | 2 |
| 177 | 3 | 2 | 0 |
| 134 | 0 | 3 | 2 |
| 135 | 0 | 2 | 3 |
| 400 | 1 | 0 | 2 |
| 401 | 1 | 2 | 0 |
| 386 | 0 | 1 | 2 |
| 387 | 0 | 2 | 1 |
| 50 | 3 | 1 | 2 |
| 51 | 3 | 2 | 1 |
| 22 | 1 | 3 | 2 |
| 23 | 1 | 2 | 3 |
| 258 | 0 | 1 | 3 |
| 259 | 0 | 3 | 1 |
| 272 | 1 | 0 | 3 |
| 273 | 1 | 3 | 0 |
| 52 | 3 | 2 | 1 |
| 53 | 3 | 1 | 2 |
| 38 | 2 | 3 | 1 |
| 39 | 2 | 1 | 3 |
| 132 | 0 | 2 | 3 |
| 133 | 0 | 3 | 2 |
| 144 | 2 | 0 | 3 |
| 145 | 2 | 3 | 0 |
| 404 | 1 | 2 | 0 |
| 405 | 1 | 0 | 2 |
| 418 | 2 | 1 | 0 |
| 419 | 2 | 0 | 1 |

FIG. 40A  FIG. 40B  FIG. 40C
 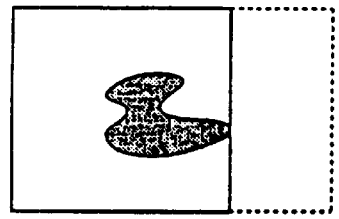 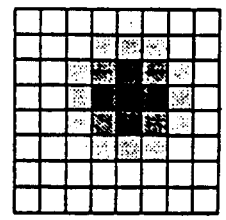
FIG. 41A  FIG. 41B  FIG. 41C
 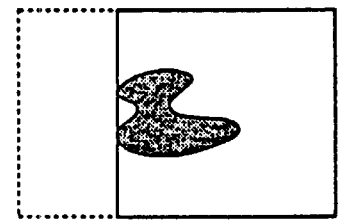 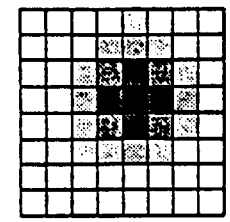
FIG. 42A  FIG. 42B  FIG. 42C
 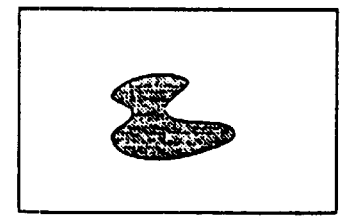 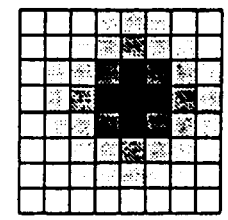

FIG. 49

| IMAGE MEM NO. | X-COORDINATE OF CORRELATION PEAK POSITION | Y-COORDINATE OF CORRELATION PEAK POSITION |
|---|---|---|
| 0 | X0 | Y0 |
| 1 | X1 | Y1 |
| 2 | X2 | Y2 |
| 3 | X3 | Y3 |
| 4 | X4 | Y4 |
| 5 | X5 | Y5 |
| 6 | X6 | Y6 |
| ● | ● | ● |
| ● | ● | ● |
| N−2 | −1 | −1 |
| N−1 | −1 | −1 |

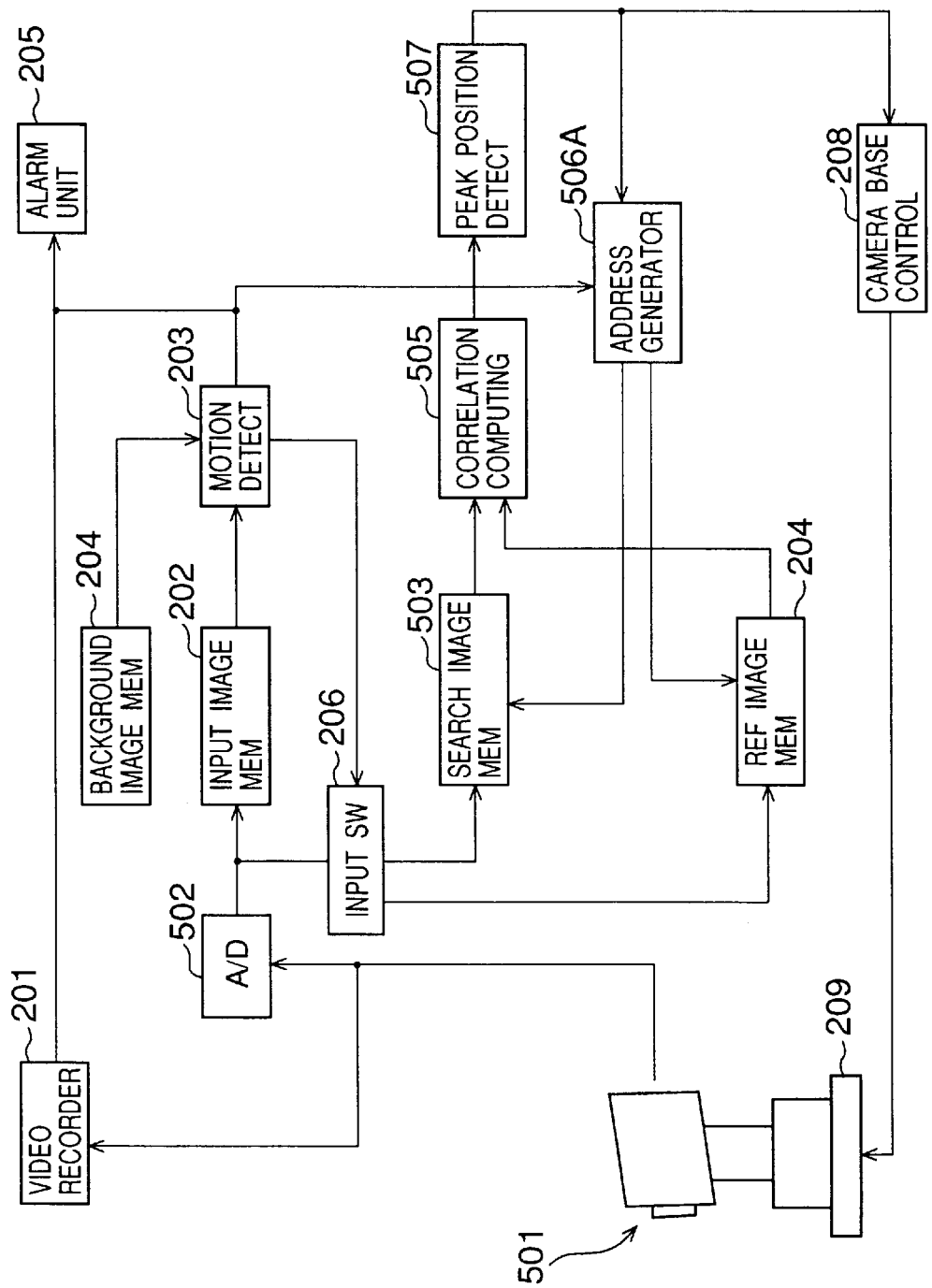

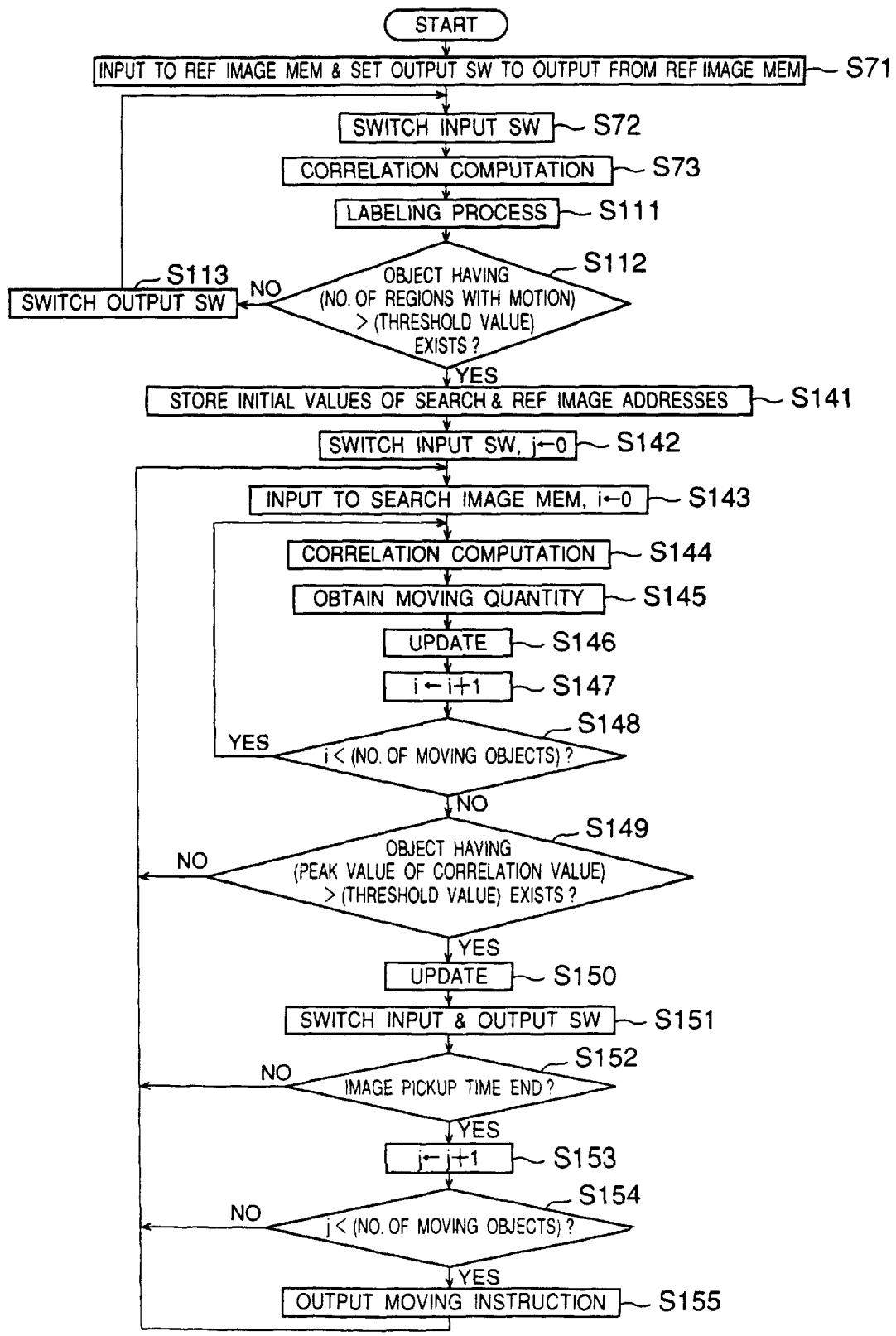

… …

TRACKING APPARATUS FOR TRACKING IMAGE IN LOCAL REGION

BACKGROUND OF THE INVENTION

The present invention generally relates to tracking apparatuses, and more particularly to a tracking apparatus which tracks an image in a local region by continuously tracking a moving object within an image that is picked up by a television camera or the like.

A tracking apparatus which tracks an image in a local region (hereinafter simply referred to as a "local region image tracking apparatus") by tracking a moving object within a picked up image is used in various systems. Examples of such systems are systems which make a non-contact type measurement of motion without the use of an acceleration sensor or visualize motion vectors, systems which make automatic supervision or monitoring, systems which recognize human gesture, expression or line of vision, systems which control cameras when making a movie or broadcasting a sports program, systems which control moving robots or self-controlled vehicles, and systems which tracks moving objects from a satellite.

FIG. 1 is a system block diagram showing a part of an example of a conventional local region image tracking apparatus. In FIG. 1, the local region image tracking apparatus generally includes an image pickup device 501, an analog-to-digital (A/D) converter 502, a search image memory 503, a reference image memory 504, a correlation computing unit 505, an address generator 506, and a correlation value peak position detector 507.

Analog image data related to an images that is picked up by the image pickup device 501 are converted into digital image data by the A/D converter 502, and are successively stored in the search image memory 502. The reference image memory 504 prestores Fixed reference image data related to a predetermined object which is to be tracked. The correlation computing unit 505 carries out a correlation computation to obtain a correlation value which indicates the correlation between the image data within the search image memory 503 and the reference image data within the reference image memory 504. The correlation value peak position detector 507 detects a peak position of this correlation value, that is, a position having a highest correlation within the picked up image. The peak position from the correlation value peak position detector 507 is fed back to the address generator 506, and the address generator 506 generates a memory address corresponding to the peak position and supplies this memory address to the search image memory 503 and the reference image memory 504. Accordingly, the peak value of the correlation value is always obtained from the correlation value peak position detector 507, and it is possible to track the predetermined object within the picked up image in real-time based on this peak position.

However, the following problems existed in the conventional local region image tracking apparatus.

First, during a time in which the image data from the image pickup device 501 are written into the search image memory 503 via the A/D converter 502, it is not possible to read the image data from the search image memory 503 and to carry out the correlation computation in the correlation computing unit 505. For this reason, there was a problem in that the tracking process could not be carried out for each frame with respect to the picked up image. As a result, in the conventional local region image tracking apparatus, the correlation computation in the correlation computing unit 505 is carried out for every other 1 frame of the image data, for example, and in this case, the tracking process could only be carried out for every other 1 frame. In other words, the tracking process could not be carried out at a high speed in the conventional local region image tracking apparatus.

Second, since only 1 correlation computing unit 505 is provided with respect to the images pickup device 501, there was a problem in that the number of objects that may be tracked at one time becomes limited by the processing capability of the correlation computing unit 505. In other words, since new image data are transmitted from the image pickup device 501 for every 1 frame, the correlation computing unit 505 must end the correlation computation within the time of 1 frame. However, when the number of objects to be tracked at one tire is large, it is impossible to end the correlation computation for each of the objects within the time of 1 frame. Depending on the processing capability of the correlation computing unit 505, it was only possible to track 1 object at one time. As a result, the conventional local region image tracking apparatus could not carry out the tracking process at a high speed.

Third, because the reference image memory 504 prestores the fixed reference image data related to the predetermined object that is to be tracked, there was a problem in that the contents of the reference image memory 504 cannot be updated at an arbitrary time during the tracking process.

SUMMARY OF THE INVENTION

Accordingly, it is a general object of the present invention to provide a novel and useful local region image tracking apparatus in which the problems described above are eliminated.

Another and more specific object of the present invention is to provide a local region image tracking apparatus which continuously tracks an arbitrary local region within a search image that is described by search image data by comparing the search image data to be subjected to a tracking process out of input image data picked up by image pickup means with reference image data related to the arbitrary local region, comprising an image data bus transferring the input image data from the image pickup means, and a plurality of correlation tracking processors, coupled in parallel to the image data bus, respectively capable of independently carrying out the tracking process with respect to at least one search image, where the tracking process with respect to one or a plurality of search images is distributively carried out by the correlation tracking processors. According to the local region image tracking apparatus of the present invention, it is possible to carry out the tracking process at a high speed by operating the plurality of correlation tracking processors in parallel.

Still another object of the present invention is to provide a local region image tracking apparatus which continuously tracks an arbitrary local region within a search image that is described by search image data by comparing the search image data to be subjected to a tracking process out of input image data picked up by image pickup means with reference image data related to the arbitrary local region, comprising at least three image memories, selector means for selectively switching the image memories to an input image memory which stores the input image data, a search image memory which stores the search image data, and a reference image memory which stores the reference image data, correlation computing means for computing a correlation value which indicates a correlation between the reference image data stored in the reference image memory and the search image data stored in the search image memory by carrying out a correlation computing process, peak position detecting means for obtaining a peak position of the correlation value from the correlation computing means, and image memory managing means for controlling the selector means based on the peak position from the peak position detecting means and successively storing a history of the reference image data in the image memory, so as to update the reference image data based on a history of the peak position of the correlation value stored within the search image memory. According to the local region image tracking apparatus of the present invention, it is possible to improve the reliability of the tracking process.

A further object of the present invention is to provide a local region image tracking apparatus which continuously tracks an arbitrary local region within a search image that is described by search image data by comparing the search image data to be subjected to a tracking process out of input image data picked up by image pickup means that is supported on moving means with reference image data related to the arbitrary local region, comprising memory means for storing at least the search image data and the reference image data, reference image data generating means for automatically generating the reference image data from the input image data, address generating means for generating addresses for reading the search image data and the reference image data from the memory means, correlation computing means for computing a correlation value which indicates a correlation between the reference image data and the search image data read from the memory means by carrying out a correlation computing process, and control means for outputting a moving instruction which moves the image pickup means by the moving means so as to track the arbitrary local region based on a peak position of the correlation value obtained from the correlation computing means. According to the local region image tracking apparatus of the present invention, it is possible to automatically detect the moving object within the input image that is picked up by the image pickup means.

Another object of the present invention is to provide a local region image tracking apparatus which continuously tracks an arbitrary local region within a search image that is described by search image data by comparing the search image data to be subjected to a tracking process out of input image data picked up by image pickup means with reference image data related to the arbitrary local region, comprising memory means for storing at least the search image data and the reference image data, reference image data generating means for automatically generating the reference image data related to a plurality of local regions from the input image data, labeling means for labeling the plurality of local regions to identify the plurality of local regions, address generating means for generating addresses for reading the search image data and the reference image data from the memory means, correlation computing means for computing a correlation value which indicates a correlation between the reference image data and the search image data read from the memory means by carrying out a correlation computing process with respect to each of the plurality of labeled local regions, and control means for tracking the plurality of labeled local regions based on a peak position of the correlation value obtained from the correlation computing means. According to the local region image tracking apparatus of the present invention, it is possible to satisfactorily track and pickup a plurality of moving objects even if a single fixed image pickup device is used.

Other objects and further features of the present invention will be apparent from the following detailed description when read in conjunction with the accompanying drawings.

BRIEF DESCRIPTION OF THE DRAWINGS

FIG. 14 is a diagram showing the relationship of the value of the 5-bit address signal supplied to the read only memory and the value of selection data read from the read only memory;

FIG. 21 is a diagram showing the relationship of the value of the (3n+1)-bit address signal supplied to the read only memory shown in FIG. 19 and the value of selection data read from the read only memory;

FIGS. 40A, 40B and 40C respectively are diagrams for explaining the operation of the tenth embodiment;

FIGS. 41A, 41B and 41C respectively are diagrams for explaining the operation of the tenth embodiment;

FIGS. 42A, 42B and 42C respectively are diagrams for explaining the operation of the tenth embodiment;

FIG. 49 is a diagram for explaining a memory table;

FIG. 54 is a system block diagram showing the general construction of a fifteenth embodiment of the local region image tracking apparatus according to the present invention;

FIG. 72 is a flow chart for explaining the operation of a twenty-fourth embodiment of the local region image tracking apparatus according to the present invention.

DESCRIPTION OF THE PREFERRED EMBODIMENTS

First, a description will be given of a first embodiment of a local region image tracking apparatus according to the present invention, by referring to FIGS. 2 through 10.

Figure 2:
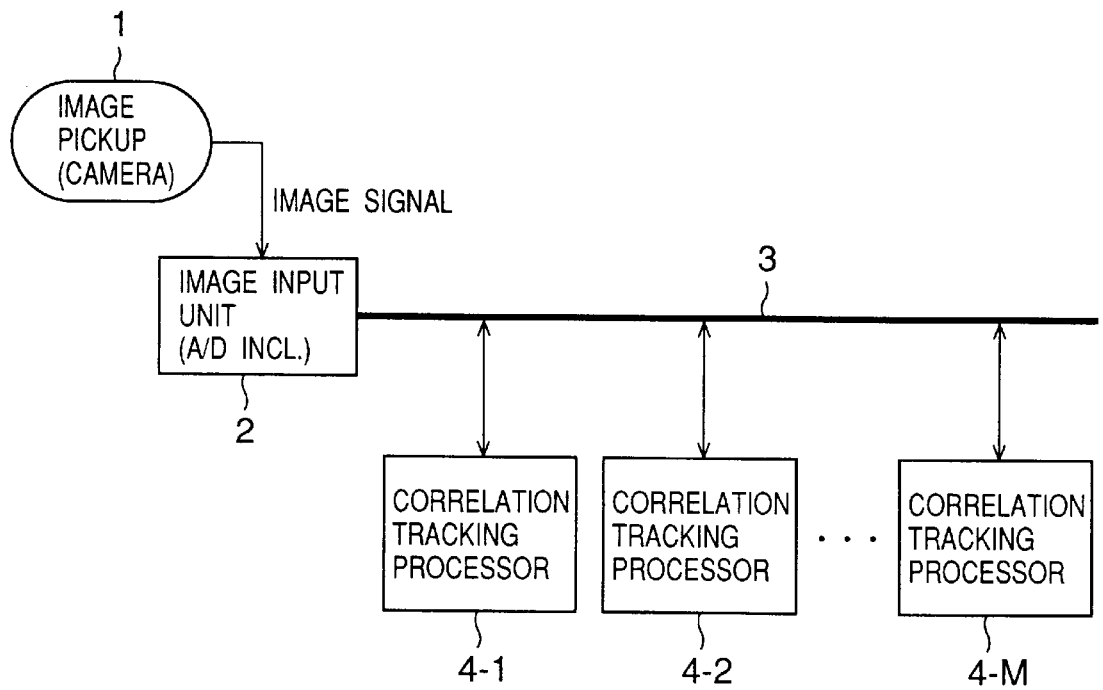
FIG. 2 is a system block diagram showing the general construction of a first embodiment of a local region image tracking apparatus according to the present invention.
Figure 3:
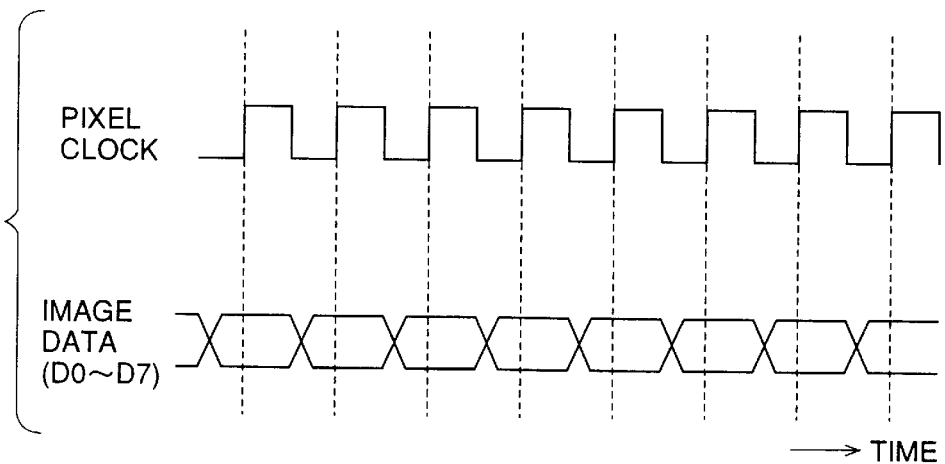
FIG. 3 is a time chart showing the relationship of a pixel clock and image data.

FIG. 2 shows the general construction of the first embodiment. In FIG. 2, a local region image tracking apparatus generally includes an image pickup device 1 such as a camera, an image input unit 2 including an A/D converter, and a plurality of correlation tracking processors 4-1 through 4-M which are coupled to the image input unit 2 via an image data bus 3. In other words, the plurality of correlation tracking processors 4-1 through 4-M are coupled in parallel with respect to the image input unit 2 via the image data bus 3. The correlation tracking processors 4-1 through 4-M respectively have the same construction.

Image data related to an image picked up by the image pickup device 1 are converted into digital image data in the image input unit 2, and are supplied to each of the correlation tracking processors 4-1 through 4-M via a frame synchronizing signal line, a pixel clock signal line and an image data signal line of the image data bus 3. The pixel clock transferred on the pixel clock signal line and the image data transferred on the image data signal line have a timing relationship shown in FIG. 3, for example. Each of the correlation tracking processors 4-1 through 4-M latches each of pixel data in response to a rising edge of the pixel clock and store the pixel data in a corresponding image memory.

A tracking process can be carried out at a high speed by selectively operating arbitrary ones of the correlation tracking processors 4-1 through 4-M in parallel. Each of the correlation tracking processors 4-1 through 4-M selectively switches and uses the image memories, so that the process of writing into the image memory and the process of reading from the image memory and carrying out the correlation computation can be carried out in parallel, thereby making it possible to carry out the tracking process for each frame of the image data.

Figure 4:
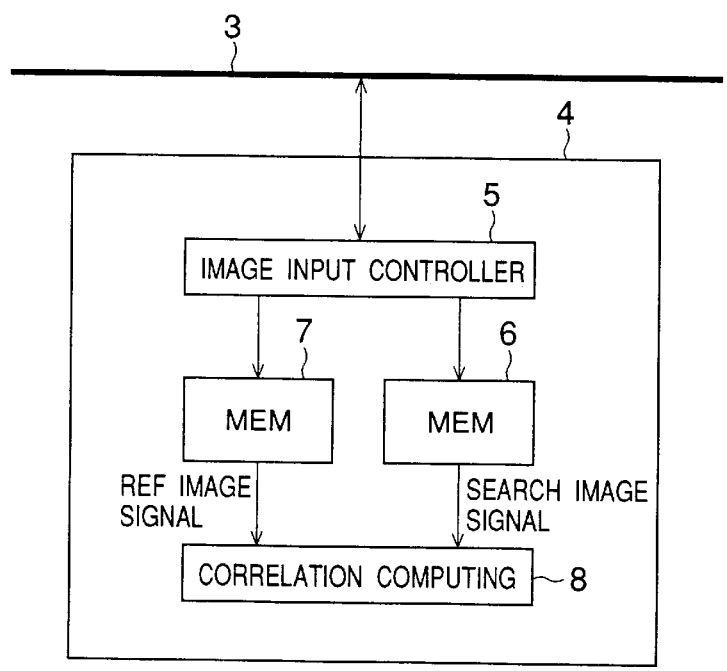
FIG. 4 is a system block diagram showing the construction of a correlation tracking processor of the first embodiment.

FIG. 4 is a system block diagram showing the construction of the correlation tracking processor 4 of this embodiment. In FIG. 4, the correlation tracking processor 4 includes an image input controller 5 connected to the image data bus 3, a search image memory 6, a reference image memory 7, and a correlation computing unit 8. The image input controller 5, the search image memory 6, the reference image memory 7 and the correlation computing unit 8 are all provided on a single substrate.

The analog image data related to the image that is picked up by the image pickup device 1 are converted into the digital image data in the image input unit 2, and are successively stored in the search image memory 6 via the image input controller 5 of the correlation tracking processor 4. The reference image memory 7 prestores reference image data related to a predetermined object which is to be tracked. The correlation computing unit 8 carries out a correlation computation so as to obtain a correlation value indicating the correlation between the image data within the search image memory 6 and the reference image data within the reference image memory 7. A peak position of this correlation value, that is, a position having a highest correlation within the picked up image, is detected by a correlation value peak position detector (not shown). Accordingly, the peak position of the correlation value is always obtained from the correlation value peak position detector, and it is possible to track the predetermined object within the picked up image in real-time based on the peak position.

Figure 5:
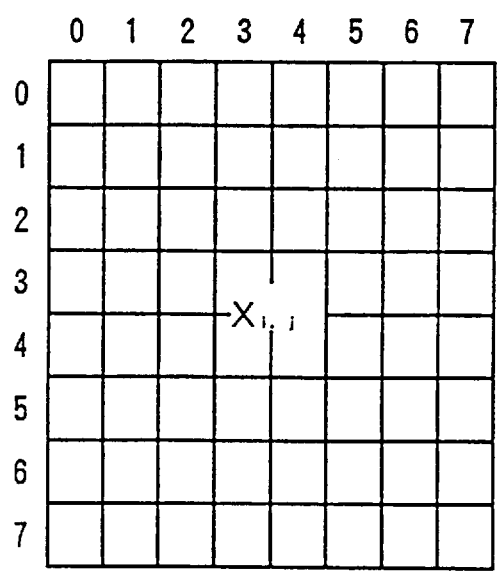
FIG. 5 is a diagram showing a 8 pixel×8 pixel reference image.
Figure 6:
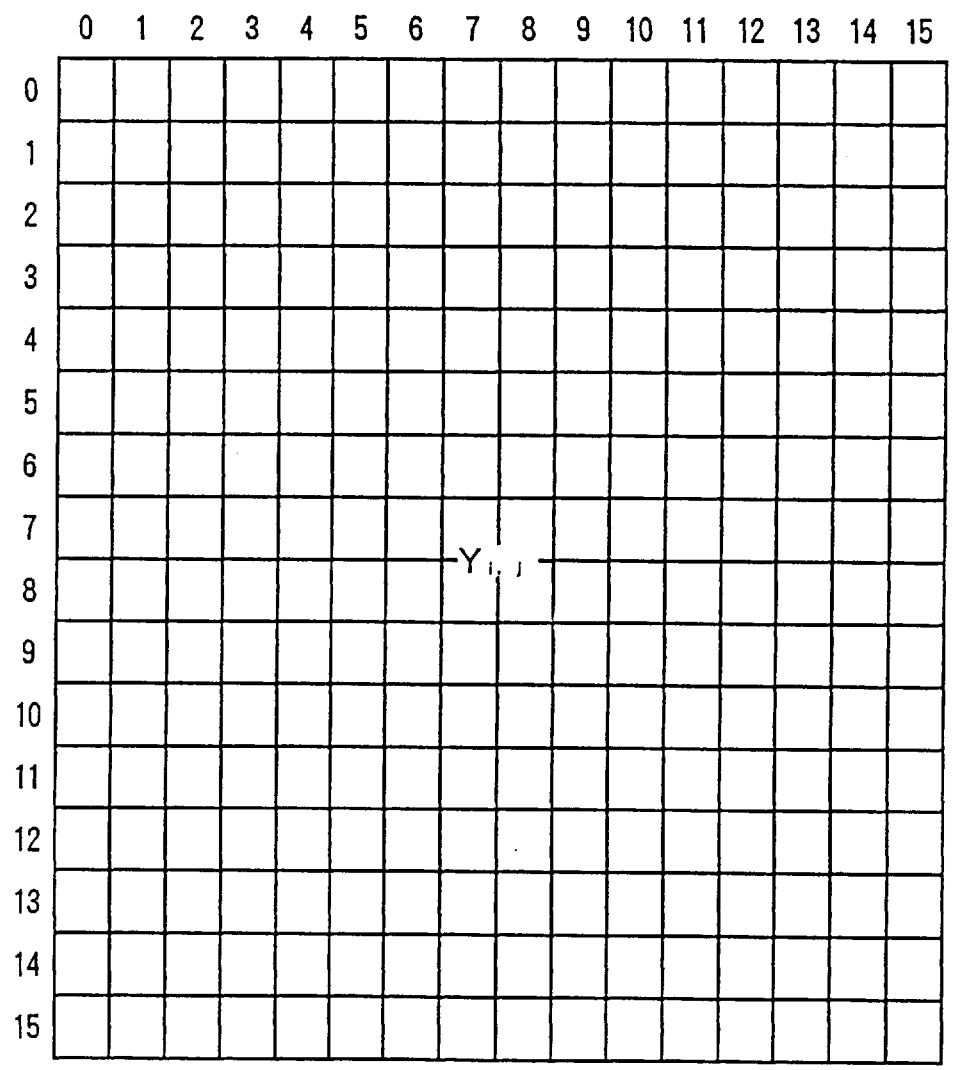
FIG. 6 is a diagram showing a 16 pixel×16 pixel search image.
Figure 7:
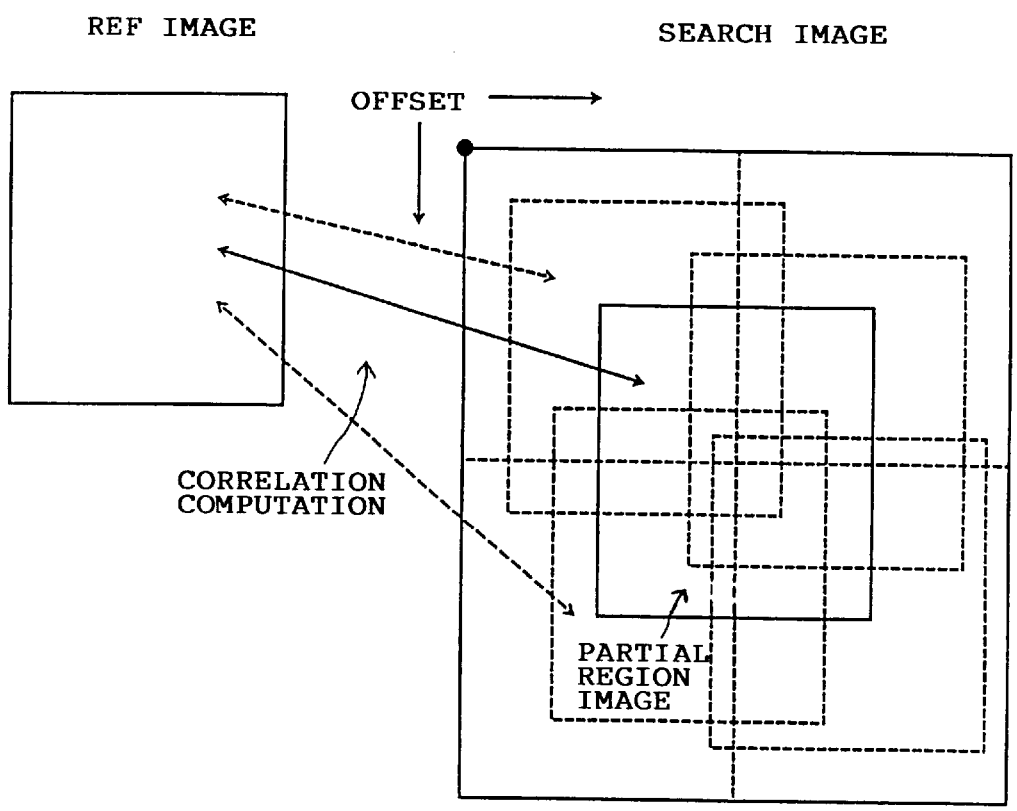
FIG. 7 is a diagram for explaining a partial region image having the same size as a reference image within the search image.

The correlation computing unit 8 carries out the following operation with respect to the image data within the search image memory 6 and the reference image data within the reference image memory 7. For the sake of convenience, it will be assumed that the reference image is made up of 8 pixels×8 pixels as shown in FIG. 5, and a pixel value within this reference image is denoted by $X_{i,j}$. In this case, with respect to the search image which is made up of 16 pixels× 16 pixels as shown in FIG. 6, the correlation computing unit 8 carries out an operation described by the following formula with a partial region image having the same size as the reference image within the search image as shown in FIG. 7. In the following formula, $Y_{i,j}$ denotes a pixel value within the search image, $D_{m,n}$ denotes a correlation value indicating how similar the two images are by a numerical value, m=0, ..., 7, and n=0, ..., 7.

$$D_{m,n} = \sum_{i=0}^{7} \sum_{j=0}^{7} |X_{i,j} - Y_{i+m, j+n}|$$

In the formula described above, the value of $D_{m,n}$ becomes smaller as the two images become more similar to each other.

Figure 8:
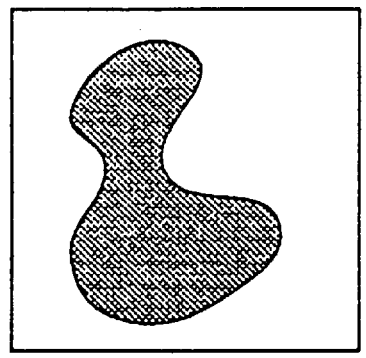
FIG. 8 is a diagram showing the reference image.
Figure 9:
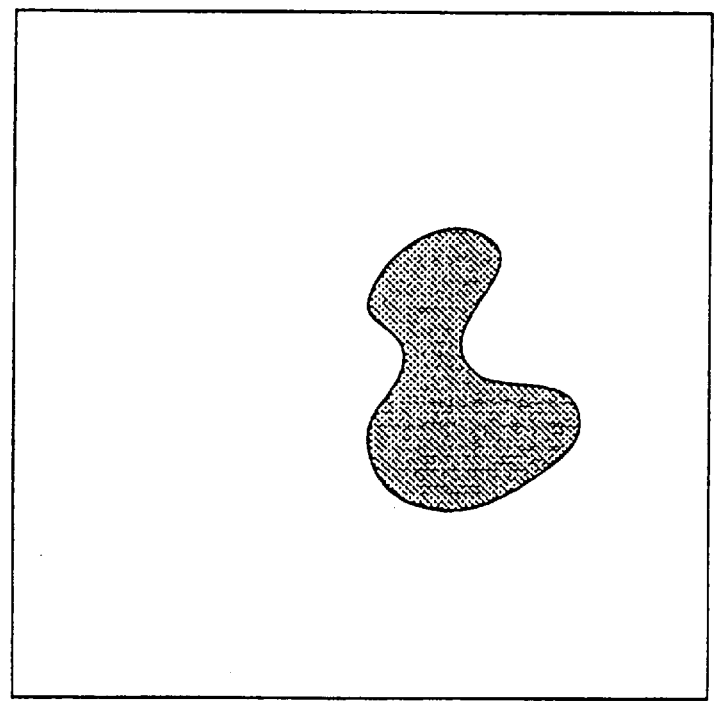
FIG. 9 is a diagram showing the search image.
Figure 10:
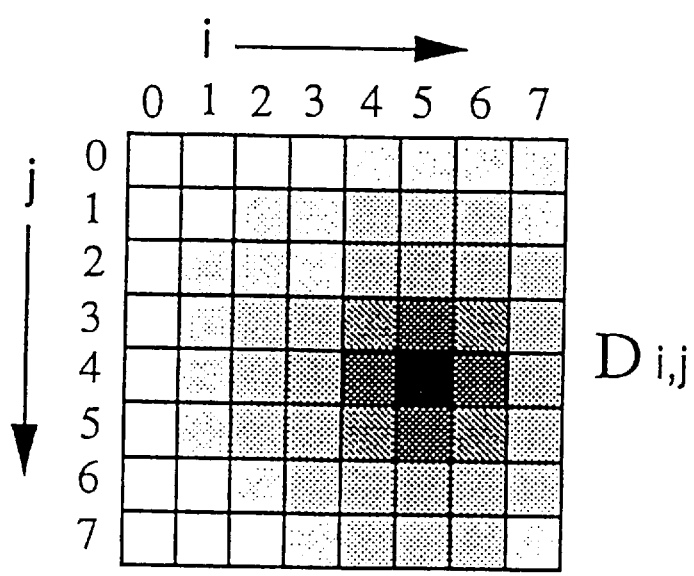
FIG. 10 is a diagram showing the result of a correlation computation carried out with respect to the reference image shown in FIG. 8 and the search image shown in FIG. 9.

FIG. 8 shows an example of the actual reference image, and FIG. 9 shows an example of the actual search image. In addition, FIG. 10 shows, a result which is obtained by carrying out the correlation computation in the correlation computing unit 8 with respect to the reference image shown in FIG. 8 and the search image shown in FIG. 9. In this particular case, $D_{m,n}$ has a minimum value when m=5 and n=4, and it is indicated that the partial region image at this position is most similar to, that is, most closely resembles, the reference image.

The correlation computation carried out with respect to the image can find an image portion which most closely resembles the reference image. Hence, by carrying out this correlation computation process with respect to a moving image for each frame, it is possible to track the moving object within the image.

If the correlation computation process that is described by the formula described above and is carried out by the correlation computing unit 8 is only to an extent such that the correlation values are obtained by carrying out the correlation computation with respect to the reference image made up of 16 pixels×16 pixels for 256 partial region images within the search image made up of 32 pixels×32 pixels, for example, a large scale integrated circuit (LSI) of the correlation computing unit has already been developed including the correlation value peak position detector which detects the peak position of the correlation value. In such a LSI, the calculation time required for the above correlation computation process is only 500 μs or less. For example, a LSI STI3220 manufactured by S.G.S. Thomson may be used for the correlation computing unit 8. Hence, by setting the size of the reference image to 16 pixels×16 pixels as in this embodiment, it is possible to realize a high-speed local region image tracking apparatus which is compact and can carry out 50 to 70 correlation computations within the time of 1 frame.

In addition, even if the number of objects to be tracked is large, the correlation computations and the like to be carried out with respect to each of the objects can be distributed to the plurality of correlation tracking processor 4-1 through 4-M and carried out in parallel by the correlation tracking processors 4-1 through 4-M. Thus, it is possible to carry out the tracking process at a high speed regardless of the number of objects to be tracked.

Next, a description will be given of a second embodiment of the local region image tracking apparatus according to the present invention, by referring to FIGS. 11 through 17. This embodiment also employs the basic construction of the first embodiment shown in FIG. 2.

Figure 11:
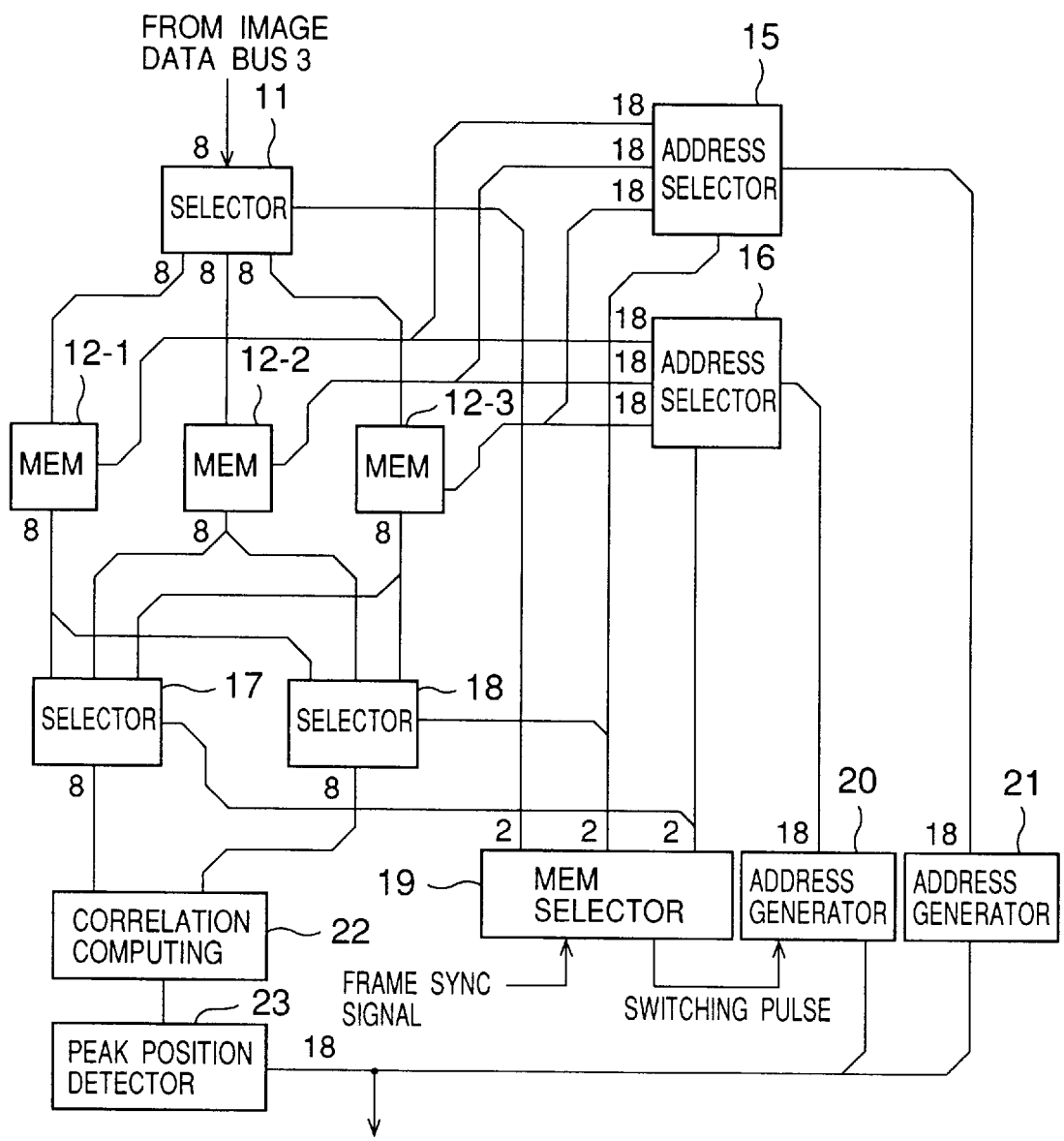
FIG. 11 is a system block diagram showing the construction of the correlation tracking processor of a second embodiment of the local region image tracking apparatus according to the present invention.

FIG. 11 is a system block diagram showing the construction of the correlation tracking processor 4 in this second embodiment. In FIG. 11, the correlation tracking processor 4 includes selectors 11, 17 and 18, image memories 12-1, 12-2 and 12-3, address selectors 15 and 16, a memory selector 19, a reference image address generator 20, a search image address generator 21, a correlation computing unit 22, and a peak position detector 23 which are connected as shown. In this embodiment, the 3 image memories 12-1 through 12-3 are selectively used to realize the tracking process in each frame, the input of the search image at each frame, and the updating of the reference image at arbitrary frame intervals.

The selector receives an 8-bit input image data from the image data signal line of the image data bus 3. The selector 11 supplies the 8-bit input image data to a selected one of the 3 image memories 12-1 through 12-3 based on a 2-bit input memory selection signal from the memory selector 19.

Figure 12:
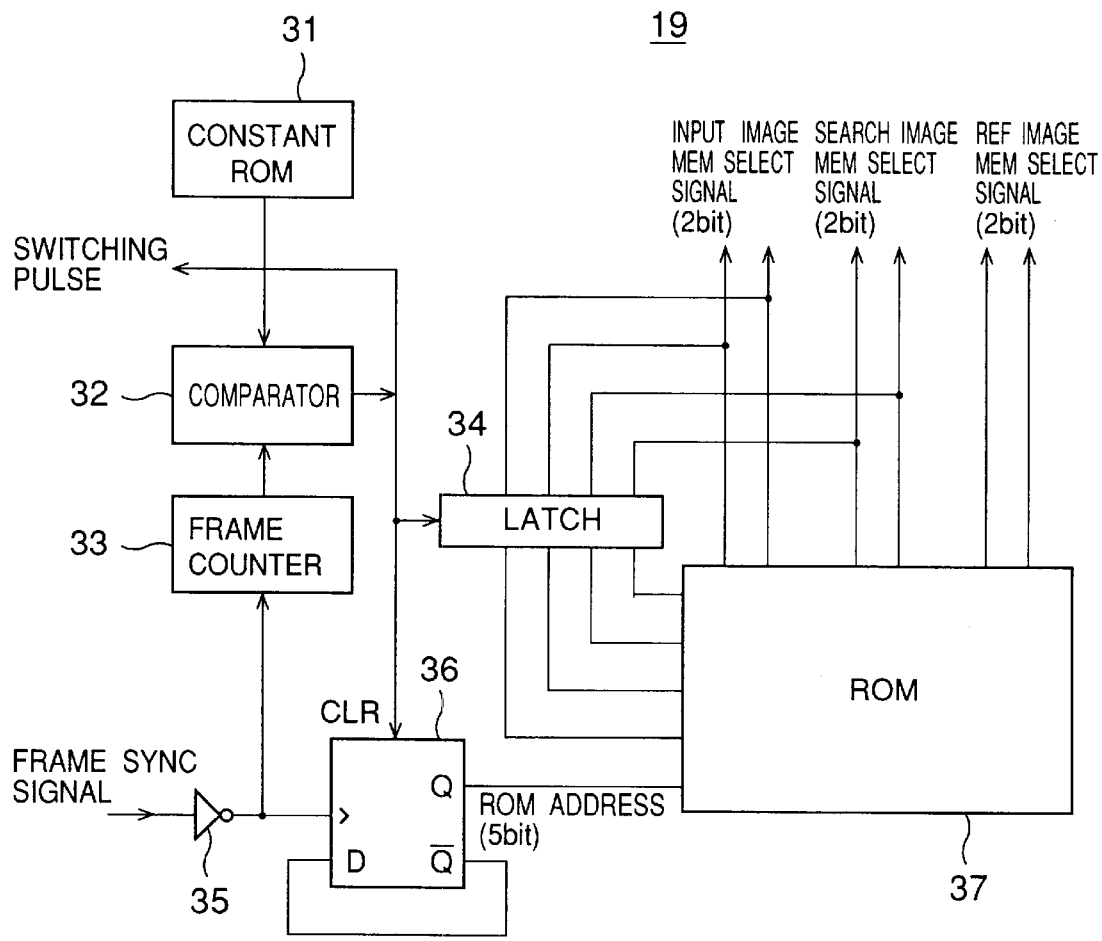
FIG. 12 is a system block diagram showing an embodiment of a memory selector.

FIG. 12 is a system block diagram showing an embodiment of the memory selector 19. In FIG. 12, the memory selector 19 includes a constant read only memory (ROM) 31, a comparator 32, a frame counter 33, a latch circuit 34, an inverter 35, a flip-flop 36, and a ROM 37 which are connected as shown.

The constant ROM 31 prestores constants indicating switching intervals of the reference image. On the other hand, a frame synchronizing signal obtained from the frame synchronizing signal line of the image data bus 3 is passed through the inverter 35 and supplied to the frame counter 33 and to a clock input terminal of the flip-flop 36. Accordingly, the frame counter 33 counts the inverted frame synchronizing signal from the inverter 35, and supplies a counted value to the comparator 32. The comparator 32 compares the constant read from the constant ROM 31 and the counted value output from the frame counter 33, and outputs a switching pulse when the compared constant and the counted value match. This switching pulse starts switching of the reference image memory. The switching pulse is supplied to the reference image address generator 20 shown in FIG. 11, and also to the latch circuit 34 and to a clear terminal of the flip-flop 36.

A /Q-output (or inverted-Q output) of the flip-flop 36 is supplied to a data input terminal D thereof, and a Q-output of the flip-flop 36 is supplied to the ROM 37 as 1 bit out of the bits of address signal of the ROM 37. Remaining 4 bits of the address signal of the ROM 37 are supplied from the latch circuit 34. The ROM 37 prestores selection data related to the selection of the image memories 12-1 through 12-3. The selection data read from the address of the ROM 37 specified by the 5-bit address signal are output as a 2-bit input image memory selection signal, a 2-bit search image memory selection signal and a 2-bit reference image memory selection signal. The input image memory selection signal determines which one of the image memories 12-1 through 12-3 is to be used as the input image memory for storing the input image data. Similarly, the search image memory selection signal determines which one of the image memories 12-1 through 12-3 is to be used as the search image memory for storing the search image data, and the reference image memory selection signal determines which one of the image memories 12-1 through 12-3 is to be used as the reference image memory for storing the reference image data.

The 2-bit input image memory selection signal and the 2-bit search image memory selection signal are supplied to the ROM 37 as the remaining 4 bits of the address signal via the latch circuit 34. In addition, the 2-bit input image memory selection signal is supplied to the selector 11, the 2-bit search image memory selection signal is supplied to the address selector 15 and the selector 18, and the 2-bit reference image memory selection signal is supplied to the address selector 16 and the selector 17.

Figure 13:
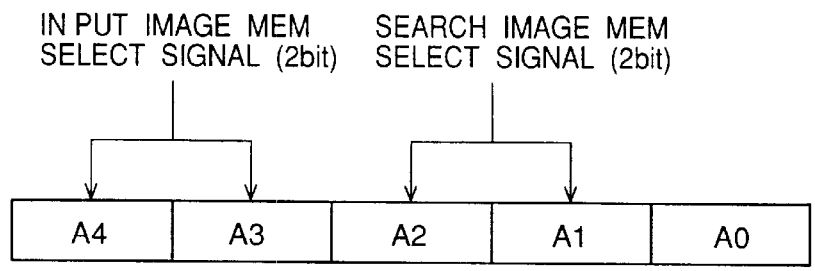
FIG. 13 is a diagram for explaining a 5-bit address signal supplied to a read only memory.

FIG. 13 is a diagram showing the 5-bit address supplied to the ROM 37. As shown in FIG. 13, the address signal is made up of bits A0 through A4. The bit A0 corresponds to the signal from the flip-flop 36. The bits A1 and A2 correspond to the 2-bit search image memory selection signal obtained via the latch circuit 34. The bits A3 and A4 correspond to the 2-bit input image memory selection signal obtained via the latch circuit 34. Depending on whether the bit A0 is "0" or "1", the image memories 12-1 through 12-3 are switched so as to alternately input the image data to the two image memories other than the image memory used as the reference image memory.

FIG. 14 is a diagram showing the relationship of the value of the 5-bit address signal (ROM address) supplied to the ROM 37, the selection data read from the ROM 37 depending on the ROM address, that is, the values of the 2-bit input image memory selection signal, the 2-bit search image memory selection signal and the 2-bit reference image memory selection signal. For example, when the value of the ROM address is "2", the value of the input image memory selection signal is "2", the value of the search image memory selection signal is "0", and the value of the reference image memory selection signal is "1". In this case, the image memory 12-1 is selected when the value of the image memory selection signal is "0", the image memory 12-2 is selected when the value of the image memory selection signal is "1", and the image memory 12-3 is selected when the value of the image memory selection signal is "2". Accordingly, when the value of the ROM address is "2", the image memory 12-3 is selected as the input image memory, the image memory 12-1 is selected as the search image memory, and the image memory 12-2 is selected as the reference images memory. In other words, the selector 11 shown in FIG. 11 selectively supplies the image data to the image memory 12-1, 12-2 or 12-3 depending on whether the value of the input image memory selection signal is "0", "1" or "2". Of course, FIG. 14 does not show all of the relationships, and only a part of the relationships is shown for the sake of convenience.

The address selector 15 shown in FIG. 11 supplies an 18-bit search image address generated from the search image address generator 21 to one of the image memories 12-1 through 12-3 that is selected as the search image memory, based on the search image memory selection signal from the memory selector 19. In addition, the address selector 16 supplies an 18-bit reference image address generated from the reference image address generator 20 to one of the image memories 12-1 through 12-3 that is selected as the reference image memory, based on the reference image memory selection signal from the memory selector 19.

The image data read from the image memories 12-1 through 12-3 are supplied to each of the selectors 17 and 18. As described above, the selector 17 receives the search image memory selection signal from the memory selector 19, and the selector 18 receives the reference image memory selection signal from the memory selector 19. Hence, out of the image data read from the image memories 12-1 through 12-3, the selectors 17 and 18 select only the search image data and the reference image data and supply these image data to the correlation computing unit 22. The correlation computing unit 22 obtains the correlation value by carrying out the correlation computing process similarly to the first embodiment. The correlation value is supplied from the correlation computing unit 22 to the peak position detector 23, and the peak position of the correlation value is detected by the peak position detector 23. Since the peak position detector 23 outputs an 18-bit peak position address indicating the peak position, it is possible to track the predetermined object within the picked up image in real-time based on this peak position address. The 18-bit peak position address output from the peak position detector 23 is supplied to the reference image address generator 20 and the search image address generator 21.

Figure 15:
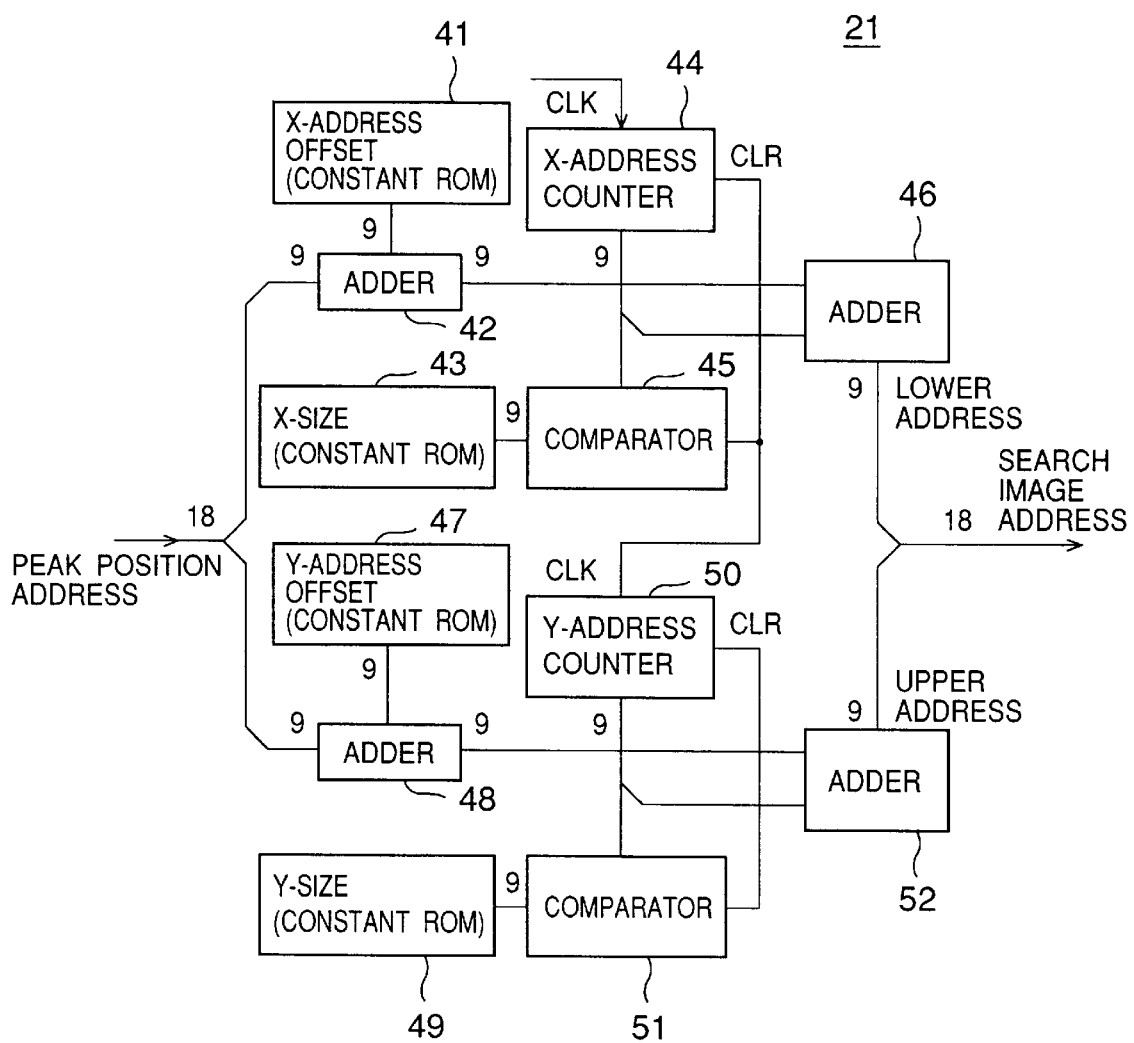
FIG. 15 is a system block diagram showing an embodiment of a search image address generator.

FIG. 15 is a system block diagram showing an embodiment of the search image address generator 21. In FIG. 15, the search image address generator 21 includes constant ROMs 41, 43, 47 and 49, adders 42, 46, 48 and 52, a X-address counter 44, comparators 45 and 51, and a Y-address counter 50 which are connected as shown.

The constant ROM 41 prestores a 9-bit X-address minimum value (offset value). The adder 42 adds a 9-bit X-address minimum value read from the constant ROM 41 and 9 bits related to the X-address of the image data out of the 18-bit peak position address from the peak position detector 23 shown in FIG. 11, and supplies a 9-bit added value to the adder 46. The X-address counter 44 counts the pixel clock signal obtained from the pixel clock signal line of the image data bus 3, and supplies a 9-bit counted value to the adder 46 and the comparator 45. The pixel clock signal is generated in correspondence with each of the pixels (picture elements) forming the image data.

On the other hand, the constant ROM 43 prestores a 9-bit X-size data. The X-size data indicates the size (or magnitude) of the search image in the direction X. The comparator 45 compares the X-size data read from the constant ROM 43 and the counted value output from the X-address counter 44, and outputs a match signal when the two compared values match. This match signal is supplied to a clear terminal of the X-address counter 44 to clear the same, and is also supplied to the Y-address counter 50.

The Y-address counter 50 counts the match signal and supplies a 9-bit counted value to the adder 52 and the comparator 51. The constant ROM 47 prestores a 9-bit Y-address minimum value (offset value). The adder 48 adds a 9-bit Y-address minimum value read from the constant ROM 47 and 9 bits related to the Y-address of the image data out of the 18-bit peak position address from the peak position detector 23 shown in FIG. 11, and supplies a 9-bit added value to the adder 52. The constant ROM 49 prestores a 9-bit Y-size data. The Y-size data indicates the size (or magnitude) of the search image in the direction Y. The comparator 51 compares the Y-size data read from the constant ROM 49 and the counted value output from the Y-address counter 50, and outputs a match signal when the two compared values match. This match signal is supplied to a clear terminal of the Y-address counter 50 to clear the same.

Hence, 9 bits of the lower address of the search image address are obtained from the adder 46, and 9 bits of the upper address of the search image address are obtained from the adder 52. The search image address having a total of 18 bits are obtained from the adders 46, and 52 and supplied to the address selector 15 shown in FIG. 11.

Figure 16:
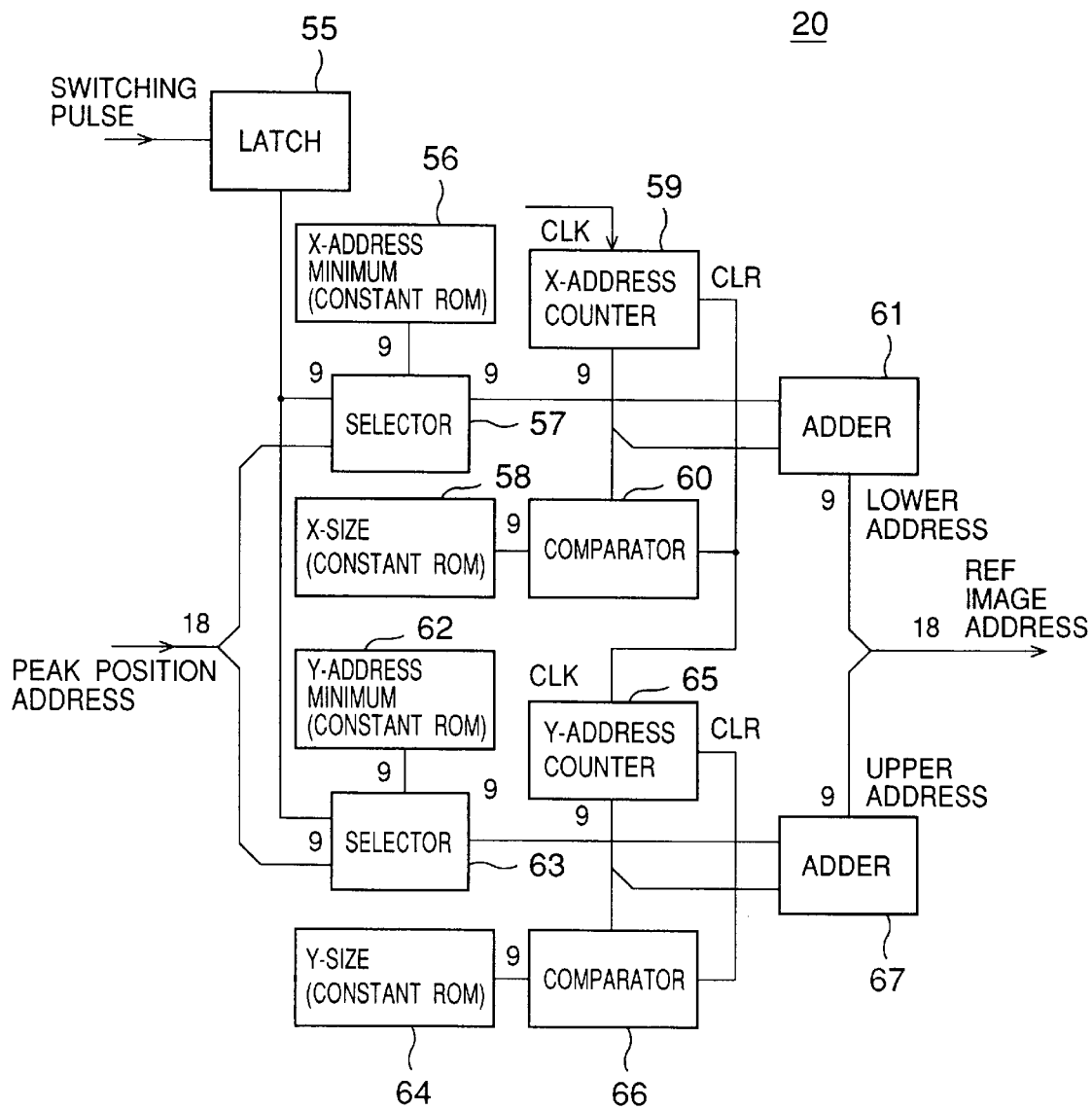
FIG. 16 is a system block diagram showing an embodiment of a reference image address generator.

FIG. 16 is a system block diagram showing an embodiment of the reference image address generator 20. In FIG. 16, the reference image address generator 20 includes a latch circuit 55, constant ROMs 56, 58, 62 and 64, selectors 57 and 63, a X-address counter 59, comparators 60 and 66, a Y-address counter 65, and adders 61 and 67 which are connected as shown.

The latch circuit 55 receives the switching pulse from the memory selector 19 shown in FIG. 11, and an output of this latch circuit 55 is supplied to the selectors 57 and 63. The constant ROM 56 prestores a 9-bit X-address minimum value, and the constant ROM 62 prestores a 9-bit Y-address minimum value. Out of the 18-bit peak position address from the peak position detector 23 shown in FIG. 11, 9 bits related to the X-address of the image data are supplied to the selector 57. In addition, out of the 18-bit peak position address from the peak position detector 23, 9 bits related to the Y-address of the image data are supplied to the selector 63. The selector 57 selectively supplies one of the X-address minimum value read from the constant ROM 56 and the X-address within the peak position address depending on the output of the latch circuit 55. The selector 63 selectively supplies one of the Y-address minimum value read from the constant ROM 62 and the Y-address within the peak position address depending on the output of the latch circuit 55.

The X-address counter 59 counts the pixel clock signal obtained from the pixel clock signal line of the image data bus 3, and supplies a 9-bit counted value to the adder 61 and the comparator 60. On the other hand, the constant ROM 58 prestores the X-size in 9 bits. This X-size indicates the size (or magnitude) of the reference image in the direction X. The comparator 60 compares the X-size data read from the constant ROM 58 and the counted value output from the X-address counter 59, and outputs a match signal when the two compared values match. This match signal is supplied to a clear terminal of the X-address counter 59 to clear the same, and is also supplied to the Y-address counter 65.

The Y-address counter 65 counts the match signal, and supplies a 9-bit counted value to the adder 67 and the comparator 66. The constant ROM 64 prestores the Y-size in 9 bits. This Y-size indicates the size (or magnitude) of the reference image in the direction Y. The comparator 66 compares the Y-size data read from the constant ROM 64 and the counted value output from the Y-address counter 65, and outputs a match signal when the two compared values match. This match signal is supplied to a clear terminal of the Y-address counter 65 to clear the same.

Accordingly, 9 bits of the lower address of the reference image address are obtained from the adder 61, and 9 bits of the upper address of the reference image address are obtained from the adder 67. The reference image address having a total of 18 bits are obtained from the adders 61 and 67 and supplied to the address selector 16 shown in FIG. 11.

Therefore, when fixing the reference image and carrying out the tracking process with respect to the input image in this embodiment, one of the image memories other than the image memory selected as the reference image memory is selected as the search image memory, and the remaining one image memory is selected as the input image memory. The correlation computation in the correlation computing unit 22 uses as the search image the newest input image the input of which is completed. In addition, by using the image memory which is used as the search image memory in the present frame as the reference image memory in the next or subsequent frames, it is possible to update the reference image. In a frame immediately after the reference image is updated, the image memory that was used as the input image memory in the previous frame is used as the search image memory, and the image memory that was used as the reference image memory in the previous frame is used as the input image memory. As a result, the 3 image memories 12-1 through 12-3 are switched and used, so that the tracking process can be carried out in each frame, the input of the search image can be made in each frame, and the reference image can be updated at arbitrary frame intervals.

Figure 17:
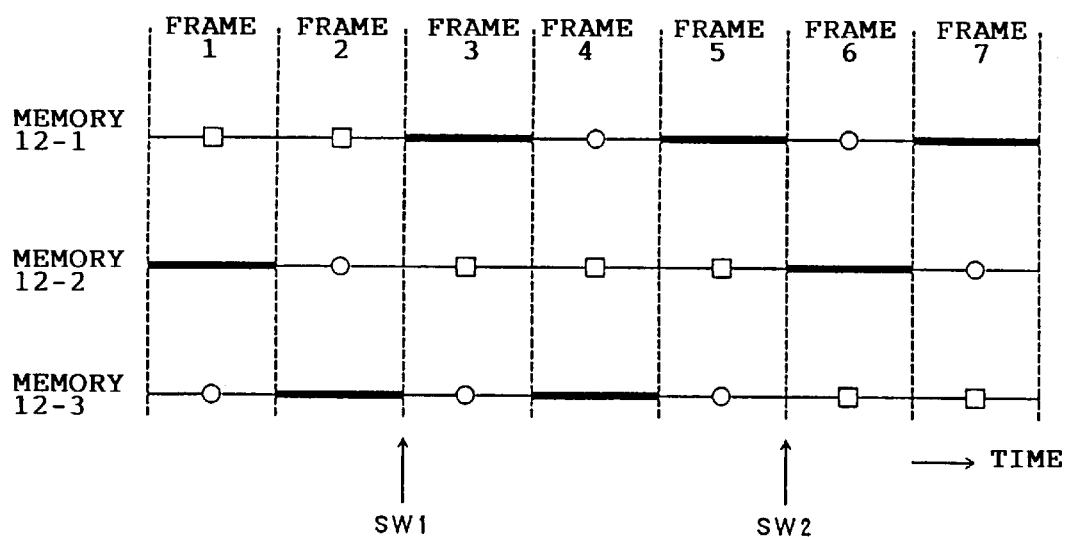
FIG. 17 is a diagram for explaining the switching of image memories in the second embodiment.

FIG. 17 is a diagram for explaining the switching of the image memories 12-1 through 12-3. In FIG. 17, a rectangular mark indicates that the image memory is storing the reference image data, a circular mark indicates that the image memory is storing the search image data, and a bold solid line indicates that the image memory is storing the input image data. In addition, arrows SW1 and SW2 respectively indicate times when the reference image memory is switched based on the switching pulse from the memory selector 19 shown in FIG. 11. More particularly, SW1 indicates the timing when the reference image memory is changed from the image memory 12-1 to the image memory 12-2, and SW2 indicates the timing when the reference image memory is changed from the image memory 12-2 to the image memory 12-3.

Next, a description will be given of a third embodiment of the local region image tracking apparatus according to the present invention, by referring to FIGS. 18 through 22. This embodiment also employs the basic construction of the first embodiment shown in FIG. 2.

Figure 18:
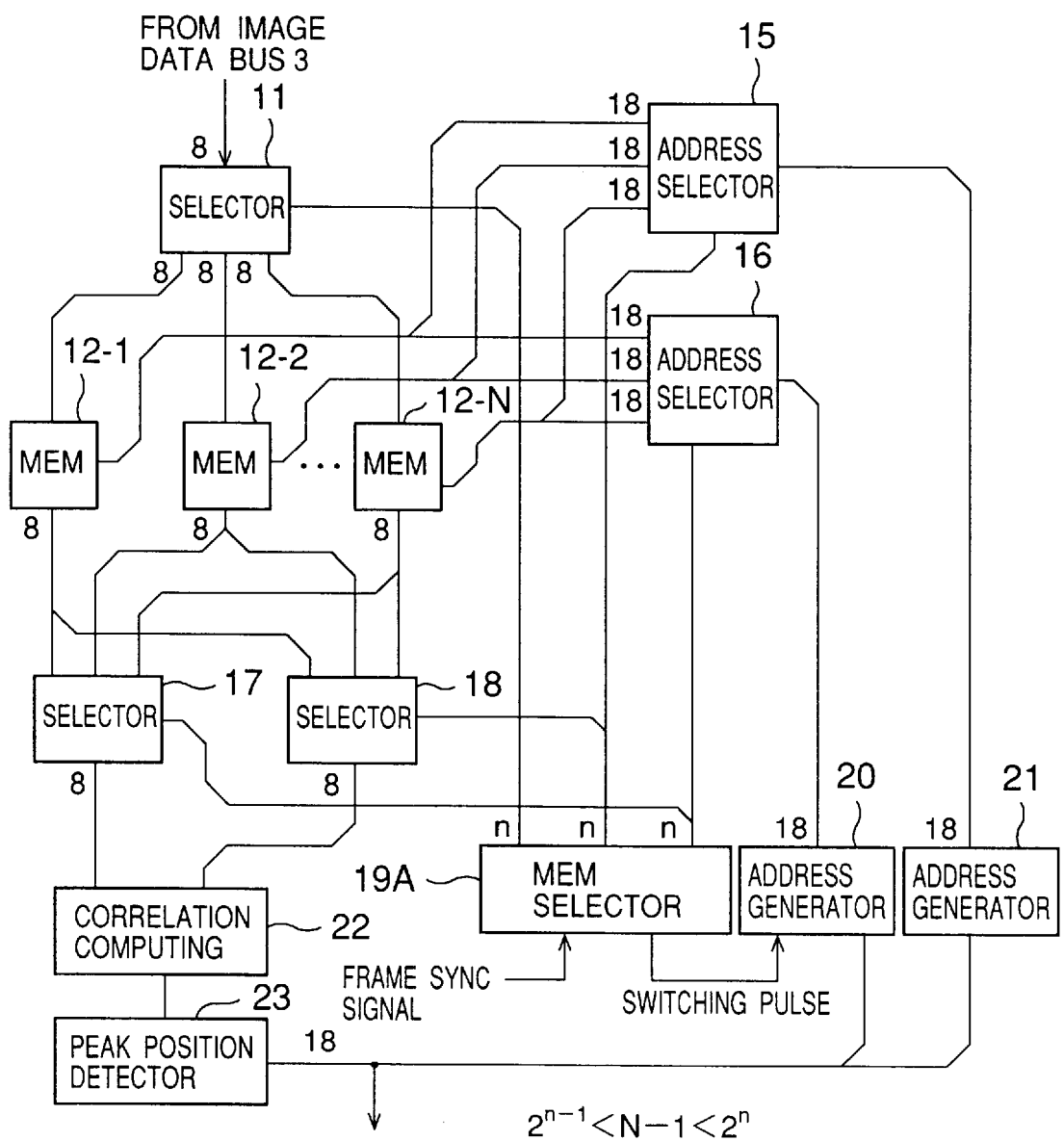
FIG. 18 is a system block diagram showing the construction of the correlation tracking processor of a third embodiment of the local region image tracking apparatus according to the present invention.

FIG. 18 is a system block diagram showing the construction of the correlation tracking processor 4 of this third embodiment. In FIG. 18, those parts which are the same as those corresponding parts in FIG. 11 are designated by the same reference numerals, and a description thereof will be omitted.

In this embodiment, if N is an integer greater than or equal to 4, N image memories 12-1 through 12-N are provided as shown in FIG. 18. In addition, a memory selector 19A outputs a n-bit input image memory selection signal, a n-bit search image memory selection signal, and a n-bit reference image memory selection signal. Other parts of the correlation tracking processor 4 shown in FIG. 18 are basically the same as that shown in FIG. 11. In this embodiment, $2^{n-1} < N-1 < 2^n$.

Figure 19:
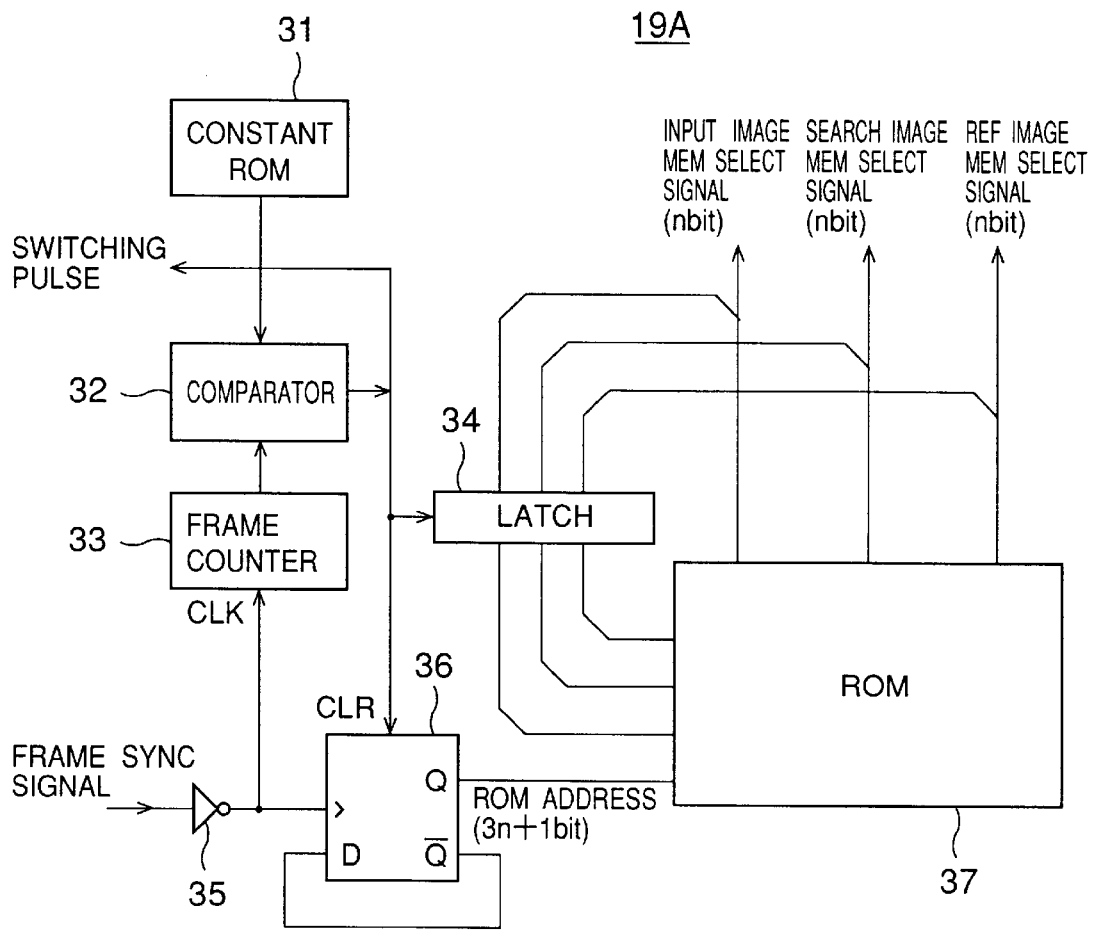
FIG. 19 is a system block diagram showing an embodiment of a memory selector shown in FIG. 18.

FIG. 19 is a system block diagram showing an embodiment of the memory selector 19A shown in FIG. 18. In FIG. 19, those parts which are the same as those corresponding parts in FIG. 12 are designated by the same reference numerals, and a description thereof will be omitted. In the memory selector 19A shown in FIG. 19, the ROM address has 3n+1 bits, and the ROM 37 outputs the input image memory selection signal, the search image memory selection signal and the reference image memory selection signal respectively having n bits. Further, the latch circuit 34 receives the n-bit input image memory selection signal read from the ROM 37. Otherwise, the operation of the memory selector 19A shown in FIG. 19 is basically the same as that of the memory selector 19 shown in FIG. 12.

Figure 20:
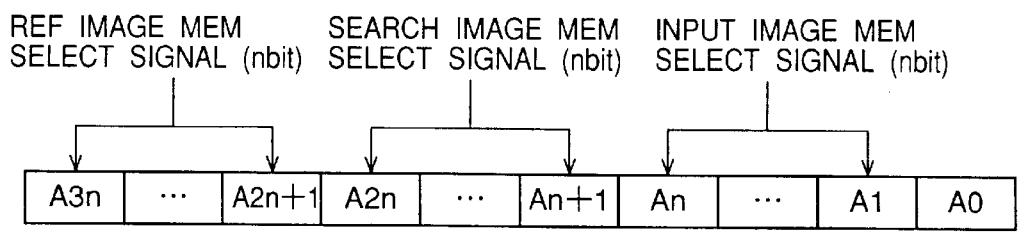
FIG. 20 is a diagram for explaining a (3n+1)-bit address signal supplied to a read only memory shown in FIG. 19.

FIG. 20 is a diagram for explaining the (3n+1)-bit address signal that is supplied to the ROM 37 shown in FIG. 19. As shown in FIG. 20, the address signal is made up of bits A0 through A3n. The bit A0 corresponds to the signal from the flip-flop 36. The bits A1 through An correspond to the n-bit input image memory selection signal obtained via the latch circuit 34. The bits An+1 through A2n correspond to the n-bit search image memory selection signal obtained via the latch circuit 34. In addition, the bits A2n+1 through A3n correspond to the n-bit reference image memory selection signal obtained via the latch circuit 34. The switching of the image memories 12-1 through 12-N is carried out depending on whether the bit A0 is "0" or "1" so as to alternately input the image data to the two image memories other than the reference image memory.

FIG. 21 is a diagram for explaining the relationship of the value of the (3n+1)-bit address signal (ROM address) supplied to the ROM 37 shown in FIG. 19, the selection data read from the ROM 37 depending on the ROM address, that is, the values of the n-bit input image memory selection signal, the n-bit search image memory selection signal and the n-bit reference image memory selection signal. For the sake of convenience, FIG. 21 shows a case where n=3 and N=6. For example, when the value of the ROM address is "34", the value of the input image memory selection signal is "3", the value of the search image memory selection signal is "1", and the value of the reference image memory selection signal is "2". In this case, the image memory 12-2 is selected when the value of the image memory selection signal is "0", the image memory 12-2 is selected when the value of the image memory selection signal is "1", the image memory 12-3 is selected when the value of the image memory selection signal is "2", and the image memory 12-4 is selected when the value of the image memory selection signal is "3". Accordingly, when the ROM address is "34", the image memory 12-4 is selected as the input image memory, the image memory 12-2 is selected as the search image memory, and the image memory 12-3 is selected as the reference image memory. In other words, depending on whether the value of the input image memory selection signal is "0", "1", . . . , or "N−1", the selector 11 shown in FIG. 18 selectively supplies the image data to the image memory 12-1, 12-2, . . . , or 12-N. Of course, not all of the relationships are shown in FIG. 21, and only a part of the relationships is shown in FIG. 21.

As described above, when fixing the reference image and carrying out the tracking process with respect to the input image in this embodiment, one of the image memories other than the image memory selected as the reference image memory is selected as the search image memory, and another image memory is selected as the input image memory. The correlation computation in the correlation computing unit 22 uses as the search image the newest input image the input of which is completed. In addition, by using the image memory which is used as the search image memory in the present frame as the reference image memory in the next or subsequent frames, it is possible to update the reference image. In a frame immediately after the reference image is updated, the image memory that was used as the input image memory in the previous frame is used as the search image memory, and the image memory that was used as the reference image memory in the previous frame is used as the input image memory. As a result, the N image memories 12-1 through 12-N are switched and used, so that the tracking process can be carried out in each frame, the input of the search image can be made in each frame, and the reference image can be updated at arbitrary frame intervals.

Furthermore, when updating the reference image, the image memory that was used as the reference image memory in the previous frame can be replaced by an image memory which was not selected and does not store the reference image data. If the past reference image data are stored in all of the non-selected image memories, it is possible to replace the image memory that was used as the reference image memory in the previous frame by the image memory which stores the oldest reference image data. In addition, the memory selector 19A also has the function of replacing the image memory which stores the reference image data at an arbitrary frame by the image memory that is used as the reference image memory at that point in time. Accordingly, it is possible to store a plurality of candidates for the reference image, and a tracking process having a high stability can be carried out by selectively using the reference image having the highest correlation out of the reference images that are updated in the past.

Figure 22:
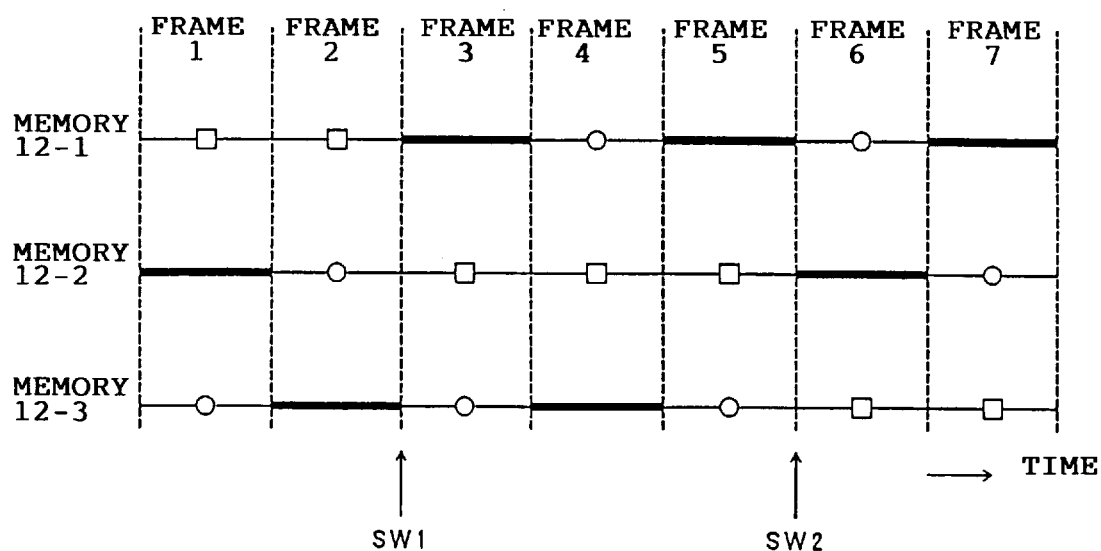
FIG. 22 is a diagram for explaining the switching of the image memories in the third embodiment.

FIG. 22 is a diagram for explaining the switching of the image memories 12-1 through 12-N. In FIG. 22, a rectangular mark indicates that the image memory is storing the reference image data, a circular mark indicates that the image memory is storing the search image data, and a bold solid line indicates that the image memory is storing the input image data. In addition, arrows SW1 and SW2 respectively indicate times when the reference image memory is switched based on the switching pulse from the memory selector 19A shown in FIG. 18. More particularly, SW1 indicates the timing when the reference image memory is changed from the image memory 12-i to the image memory 12-j, and SW2 indicates the timing when the reference image memory is changed from the image memory 12-j to the image memory 12-k, where i, j and k are mutually different integers from 1 to N.

Next, a description will be given of a fourth embodiment of the local region image tracking apparatus according to the present invention, by referring to FIG. 23. This embodiment also employs the basic construction of the first embodiment shown in FIG. 2.

Figure 23:
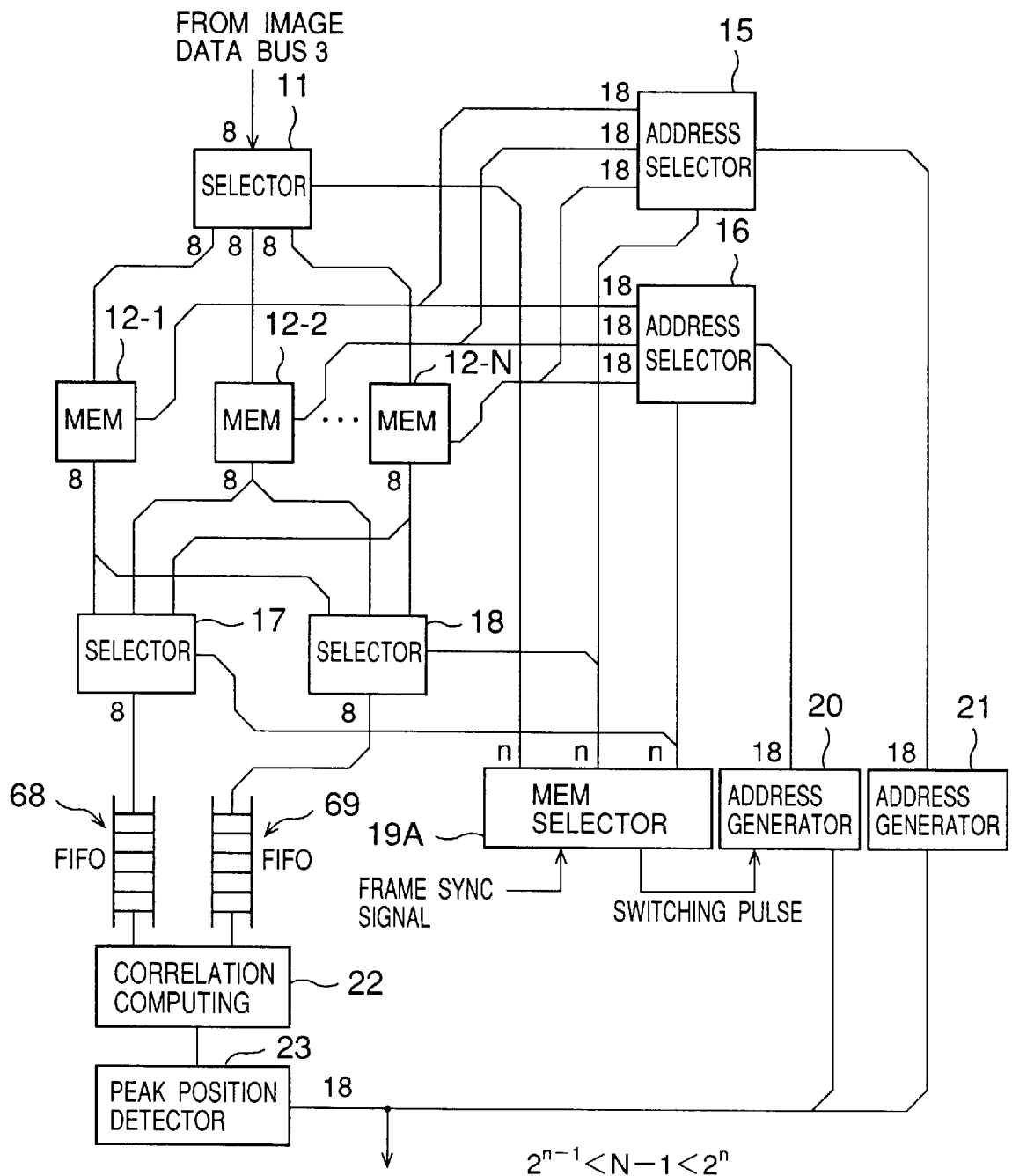
FIG. 23 is a system block diagram showing the construction of the correlation tracking processor of a fourth embodiment of the local region image tracking apparatus according to the present invention.

FIG. 23 is a system block diagram showing the construction of the correlation tracking processor 4 of this fourth embodiment. In FIG. 23, those parts which are the same as those corresponding parts in FIG. 18 are designated by the same reference numerals, and a description thereof will be omitted.

In this embodiment, a first-in-first-out (FIFO) 68 is provided between the selector 17 and the correlation computing unit 22, and a FIFO 69 is provided between the selector 18 and the correlation computing unit 22, as shown in FIG. 23. The search image data and the reference image data from the selectors 18 and 19 are supplied to the corresponding FIFOs 68 and 69, and are successively stored in the FIFOs 68 and 69. The correlation computing unit 22 is started when readable search image data and reference image data exist in the FIFOs 68 and 69, and carries out the correlation computation by reading the search image data and the reference image data from the FIFOs 68 and 69.

According to this embodiment, the extraction of the search image data and the reference image data by the selectors 17 and 18, that is, the read-out from the image memories 12-1 through 12-N, and the correlation computing process of the correlation computing unit 22 with respect to the search image data and the reference image data are carried out in parallel. As a result, it is possible to further improve the speed of the tracking process.

Next, a description will be given of a fifth embodiment of the local region image tracking apparatus according to the present invention, by referring to FIGS. 24 through 27.

Figure 24:
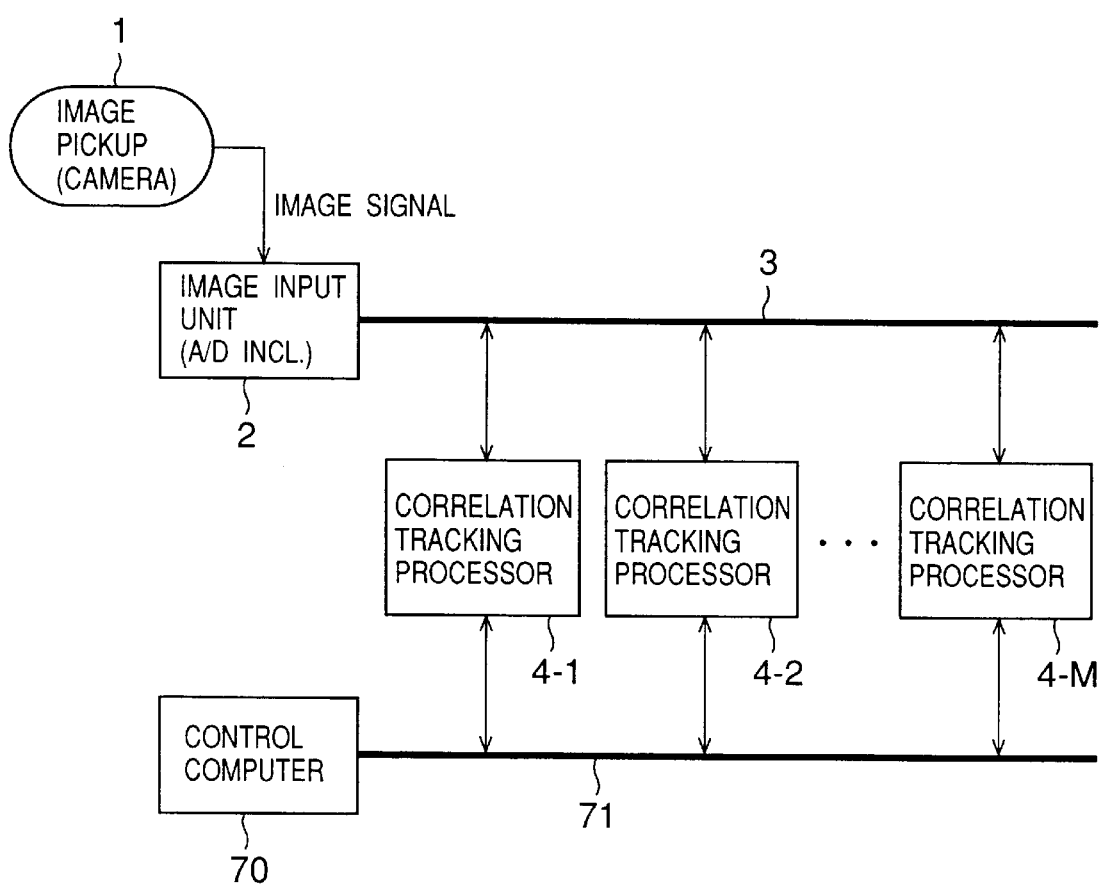
FIG. 24 is a system block diagram showing the general construction of a fifth embodiment of the local region image tracking apparatus according to the present invention.

FIG. 24 is a system block diagram showing the general construction of the fifth embodiment. In FIG. 24, the local region image tracking apparatus generally includes, an image pickup device 1 such as a camera, an image input unit 2 including an A/D converter, a plurality of correlation tracking processors 4-1 through 4-M which are coupled to the image input unit 2 via an image data bus 3, a control computer 70, and a control computer bus 71. In other words, the plurality of correlation tracking processors 4-1 through 4-M are coupled in parallel with respect to the image input unit 2 via the image data bus 3, and these correlation tracking processors 4-1 through 4-M are coupled in parallel with respect to the control computer 70 via the control computer bus 71. The correlation tracking processors 4-1 through 4-M respectively have the same construction.

The image data related to the image picked up by the image pickup device 1 are converted into the digital image data in the image input unit 2 and are supplied to each of the correlation tracking processors 4-1 through 4-M via the frame synchronizing signal line, the pixel clock signal line and the image data signal line of the image data bus 3. The pixel clock transferred on the pixel clock signal line and the image data transferred on the image data signal line have the timings shown in FIG. 3, for example, Each of the correlation tracking processors 4-1 through 4-M latches each pixel data in response to the rising edge of the pixel clock and store the pixel data in the corresponding image memory.

It is possible to carry out the tracking process at a high speed by selectively operating arbitrary ones of the correlation tracking processors 4-1 through 4-M in parallel. Each of the correlation tracking processors 4-1 through 4-M selectively switches and uses the image memories, and carries out the write and read with respect to the image memories and the correlation computation in parallel, so that the tracking process is carried out for each frame of the image data.

The control computer 70 carries out various kinds of control with respect to the correlation tracking processors 4-1 through 4-M via the control computer bus 71. The control operations of the control computer 70 carried out with respect to the correlation tracking processors 4-1 through 4-M include control related to the updating of the reference image and control related to the selection and switching of the image memories, for example. As will be described later, the correlation tracking processors 4-1 through 4-M respectively have a control computer interface provided with various control registers, and the operation of each of the correlation tracking processors 4-1 through 4-M is controlled based on the values set in the control registers within its own control computer interface. The control registers within each control computer interface are mapped in different address spaces of the control computer bus 71, and the write and read with respect to the control registers within each control computer interface are made when the control computer 70 makes accesses to predetermined address spaces. In other words, the values in the control registers can be freely set from the control computer 70. In addition, the control computer 70 manages peak positions of the correlation values which are obtained from each of the correlation tracking processors 4-1 through 4-M via the control computer bus 71, and thus, it is possible to easily track one or a plurality of moving objects.

For example, a bus in conformance with the VME standards may be used as the control computer bus 71. In this case, a board computer having the VME bus specifications is used as the control computer 70.

Figure 25:
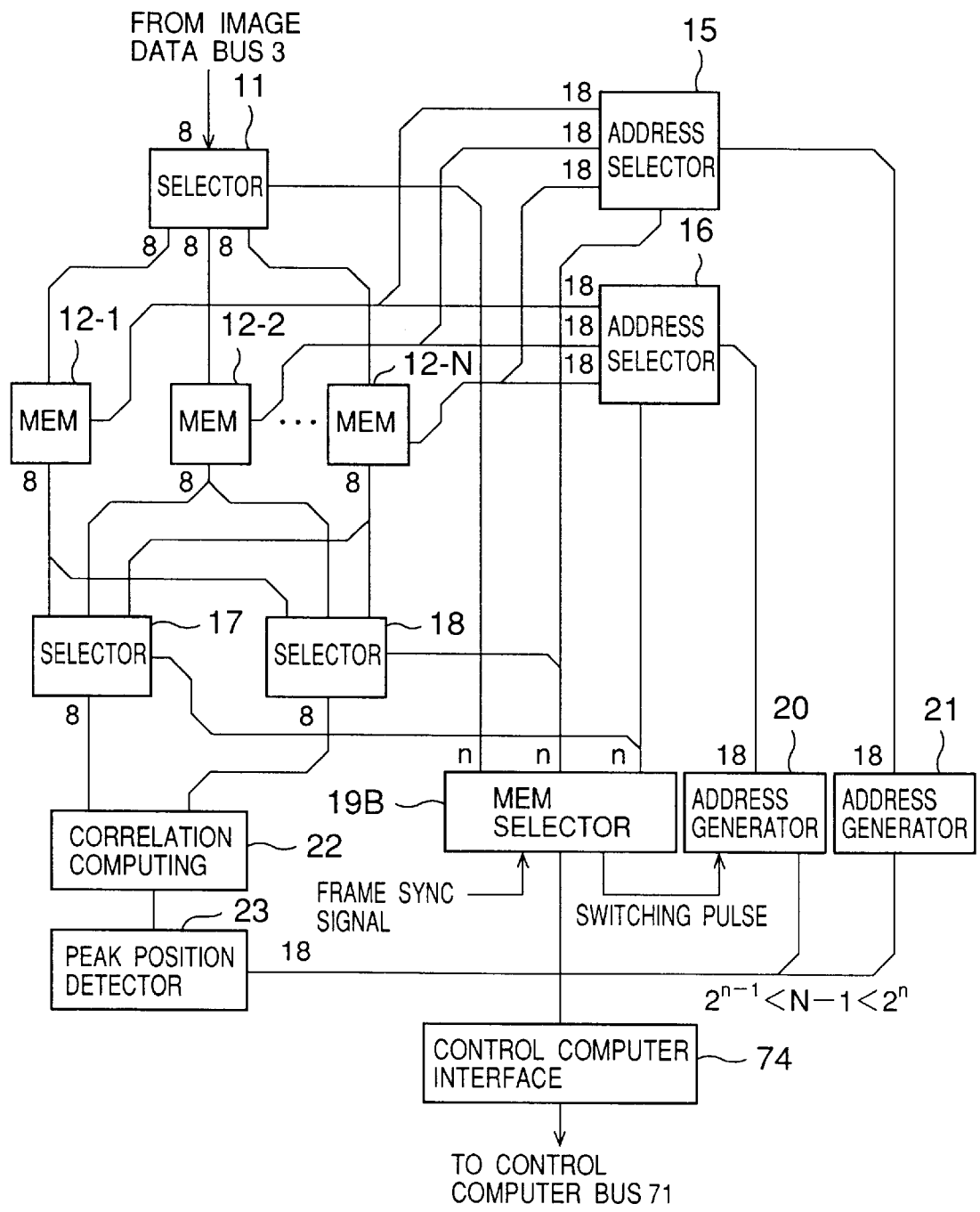
FIG. 25 is a system block diagram showing the construction of the correlation tracking processor of the fifth embodiment.

FIG. 25 is a system block diagram showing the construction of the correlation tracking processor 4 of this embodiment. In FIG. 25, those parts which are the same as those corresponding parts in FIG. 18 are designated by the same reference numerals, and a description thereof will be omitted.

In this embodiment, a control computer it at, interface 71 is provided as shown in FIG. 25. This control computer interface 74 is coupled to the control computer 70 via the control computer bus 71. In addition, the control computer interface 74 is also coupled to a memory selector 19B.

Figure 26:
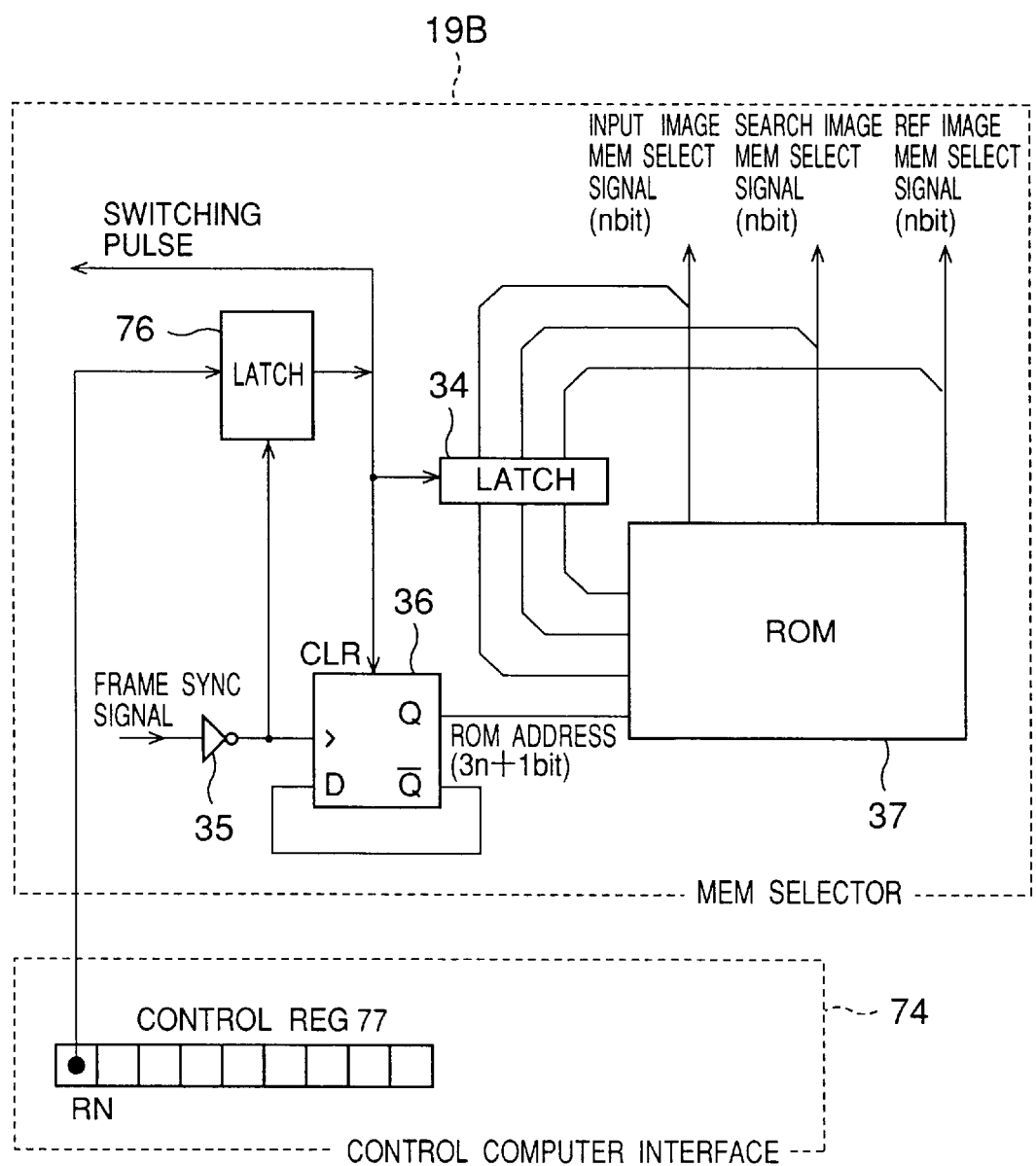
FIG. 26 is a system block diagram showing an embodiment of a memory selector together with a part of a control computer interface.

FIG. 26 is a system block diagram showing an embodiment of the memory selector 19B together with a part of the control computer interface 74. In FIG. 26, those parts which are the same as those corresponding parts in FIG. 19 are designated by the same reference numerals, and a description thereof will be omitted.

Figure 27:
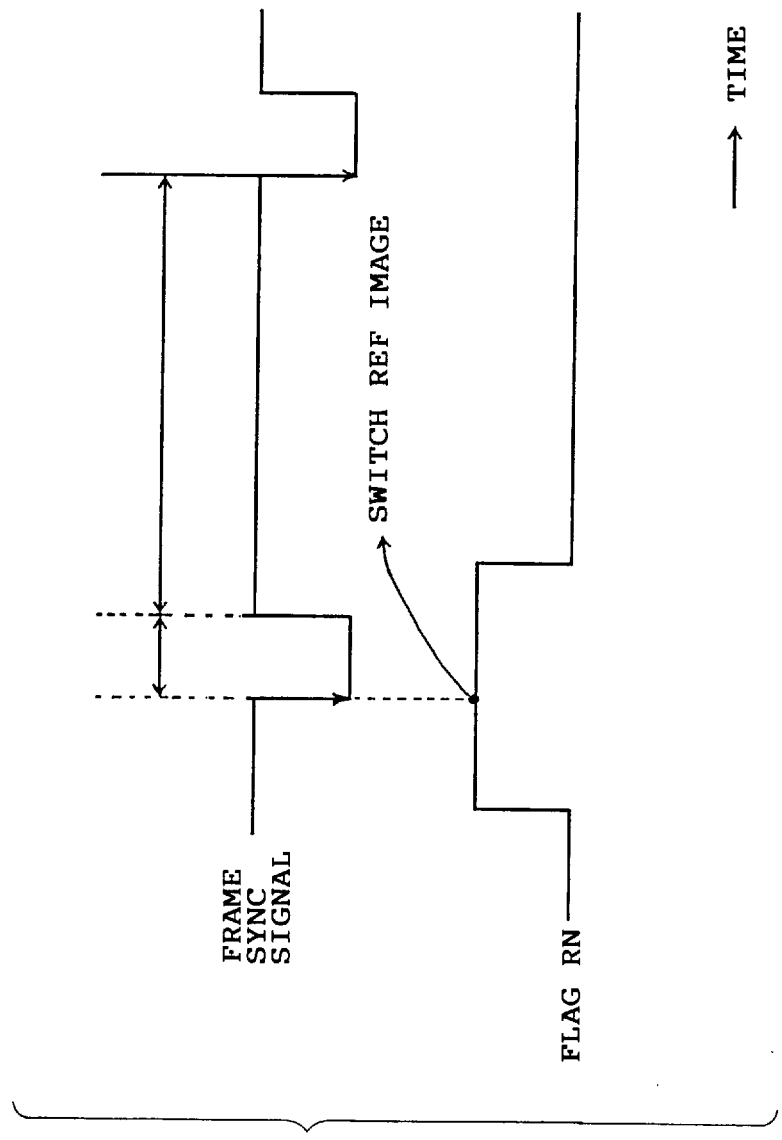
FIG. 27 is a time chart showing the relationship of a frame synchronizing signal and an update instruction flag.

In FIG. 26, the memory selector 19B includes a latch circuit 76 in place of the comparator 32 and the frame counter 33 shown in FIG. 19. This latch circuit 76 receives an update instruction flag RN stored in a control register 77 within the control computer interface 74. The update instruction flag RN can be set from the control computer 70 via the control computer bus 71, and this update instruction flag RN instructs updating of the reference image to the memory selector 19B when set. The latch circuit 76 also receives the inverted frame synchronizing signal that is obtained via the inverter 35. As shown in FIG. 27, when the frame synchronizing signal falls in a state where the update instruction flag RN is set, the latch circuit 76 outputs a switching pulse in response to the falling edge of the frame synchronizing signal. The control register 77 within the control computer interface 74 store various flags other than the update instruction flag RN, and the control computer interface 74 has various control registers other than the control register 77, however, such flags and control registers are not directly related to the subject matter of the present invention and a description and illustration thereof will be omitted in this specification.

Next, a description will be given of a sixth embodiment of the local region image tracking apparatus according to the present invention, by referring to FIGS. 28 and 29. This embodiment employs the basic construction of the fifth embodiment shown in FIG. 24.

Figure 28:
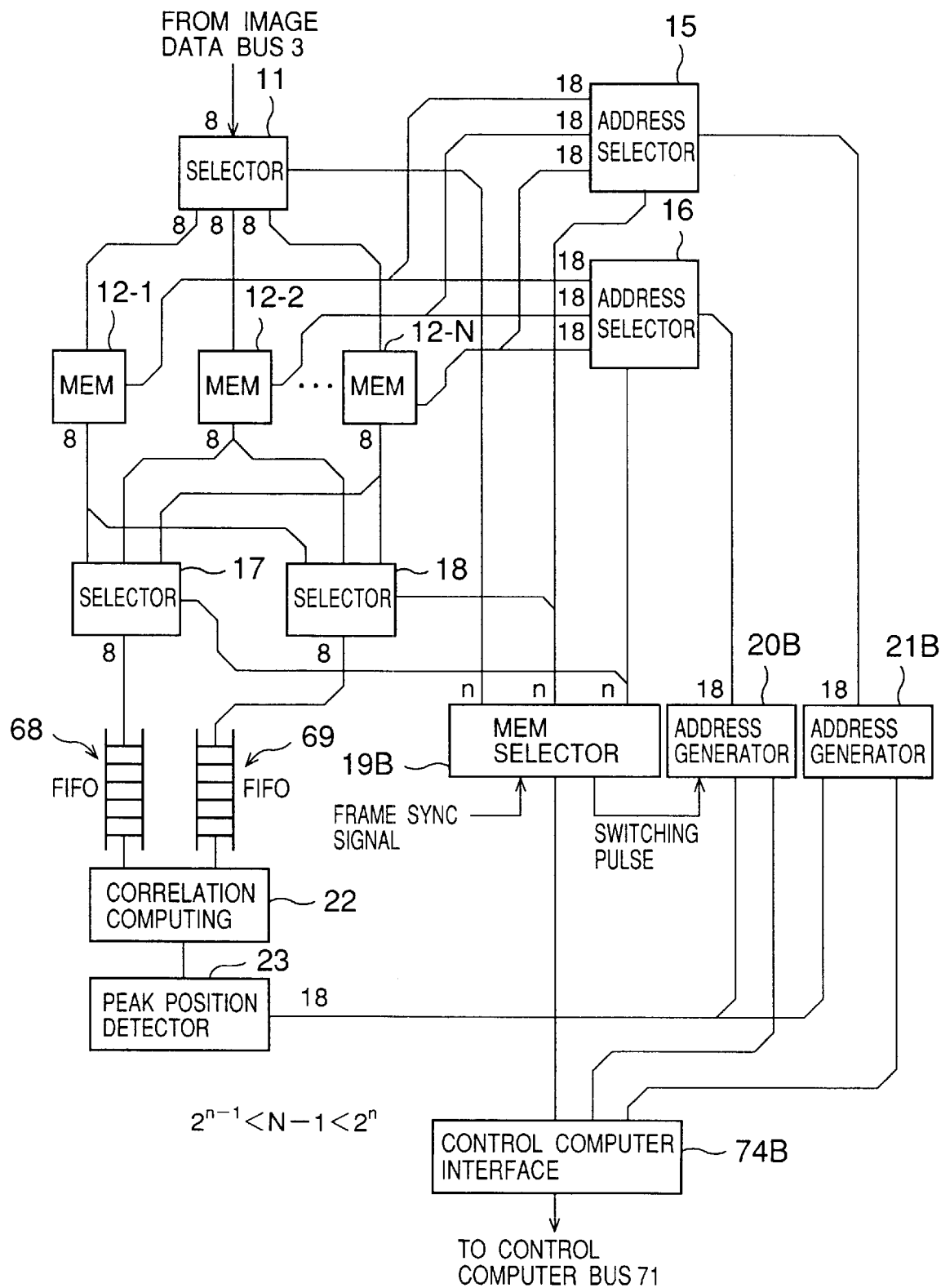
FIG. 28 is a system block diagram showing the construction of the correlation tracking processor of a sixth embodiment of the local region image tracking apparatus according to the present invention.

FIG. 28 is a system block diagram showing the construction of the correlation tracking processor 4 of this embodiment. In FIG. 28, those parts which are the same as those corresponding parts in FIGS. 23 and 25 are designated by the same reference numerals, and a description thereof will be omitted.

In this embodiment, a reference image address generator 20B and a search image address generator 21B are respectively coupled to the control computer 70 via a control computer interface 74 and the control computer bus 71. Hence, the reference image address generator 20B and the search image address generator 21B can respectively generate the reference image address and the search image address depending on the instructions from the control computer 70.

Figure 29:
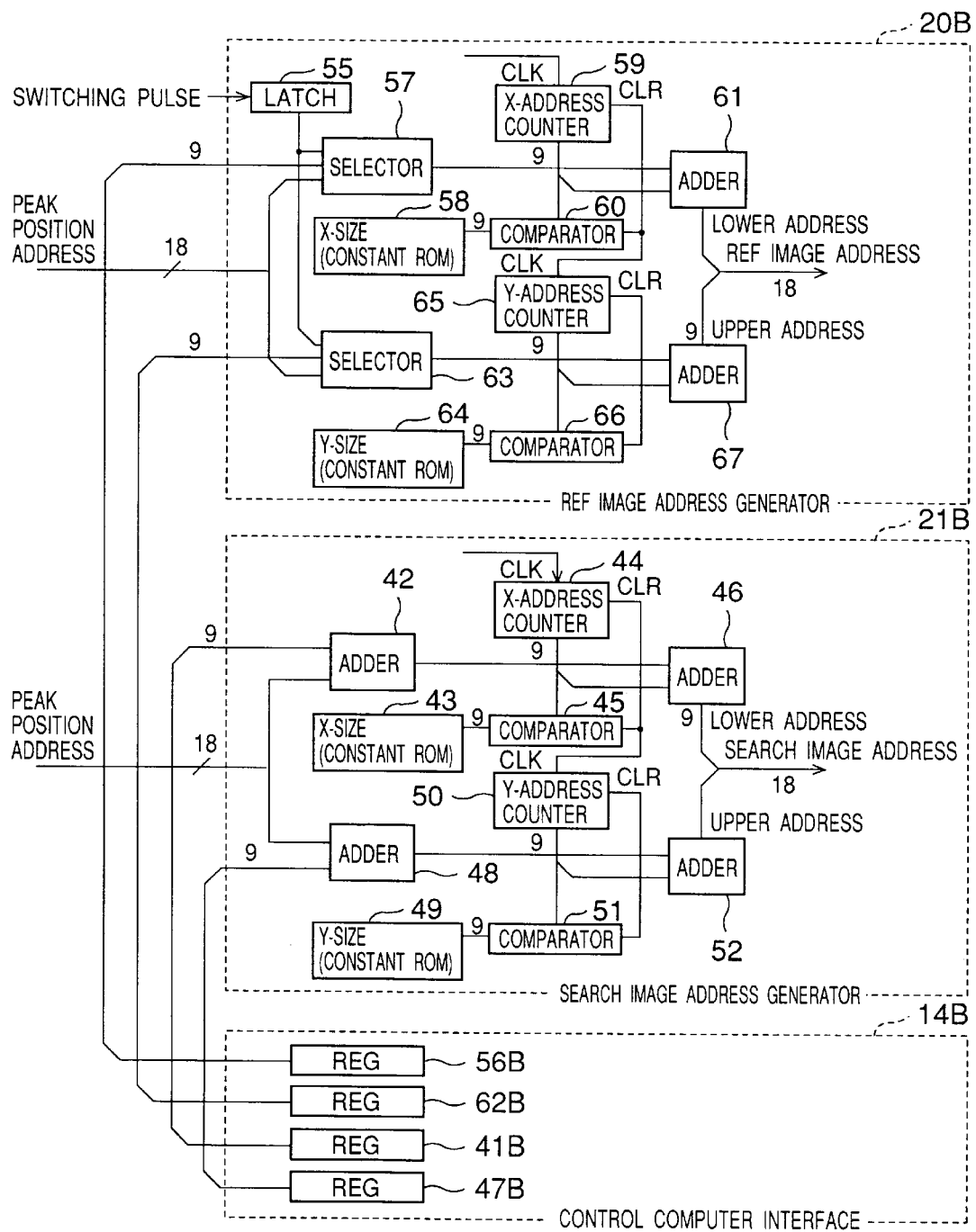
FIG. 29 is a system block diagram showing parts of a reference image address generator, a search image address generator and a control computer interface.

FIG. 29 is a system block diagram showing parts of the reference image address generator 20B, the search image address generator 21B and the Control computer interface 74B. In FIG. 29, those parts which are the same as those corresponding parts in FIGS. 15 and 16 are designated by the same reference numerals, and a description thereof will be omitted.

As shown in FIG. 29, the reference image address generator 20B is not provided with the constant ROM 56 which stores the X-address minimum value and the constant ROM 62 which stores the Y-address minimum value. Instead, a X-address minimum register 56B corresponding to the constant ROM 56 and a Y-address minimum register 62B corresponding to the constant ROM 62 are respectively provided within the control computer interface 74B. Similarly, the search address generator 21B is not provided with the constant ROM 41 which stores the X-address minimum value and the constant ROM 47 which stores the Y-address minimum value. Instead, a X-address minimum register 41B corresponding to the constant ROM 41 and a Y-address minimum register 47B corresponding to the constant ROM 47 are respectively provided within the control computer interface 74B.

Therefore, according to this embodiment, it is possible to arbitrarily determine the X and Y address minimum values of the reference image and the X and Y address minimum values of the search image by setting each of the registers 56B, 62B, 41B and 47B within the control computer interface 74B from the control computer 70. In addition, although the illustration thereof will be omitted, it is possible to omit the constant ROMs 58 and 64 within the reference image address generator 20B by providing corresponding registers in the control computer interface 74B, so that the X and Y sizes of the reference image can be set arbitrarily in a similar manner from the control computer 70. Furthermore, it is possible to omit the constant ROMs 43 and 49 within the search image address generator 21B by providing corresponding registers in the control computer interface 74B, so that the X and Y sizes of the search image can be set arbitrarily in a similar manner from the control computer 70.

Next, a description will be given of a seventh embodiment of the local region image tracking apparatus according to the present invention, by referring to FIGS. 30 through 36. This embodiment also employs the basic construction of the fifth embodiment shown in FIG. 24.

Figure 30:
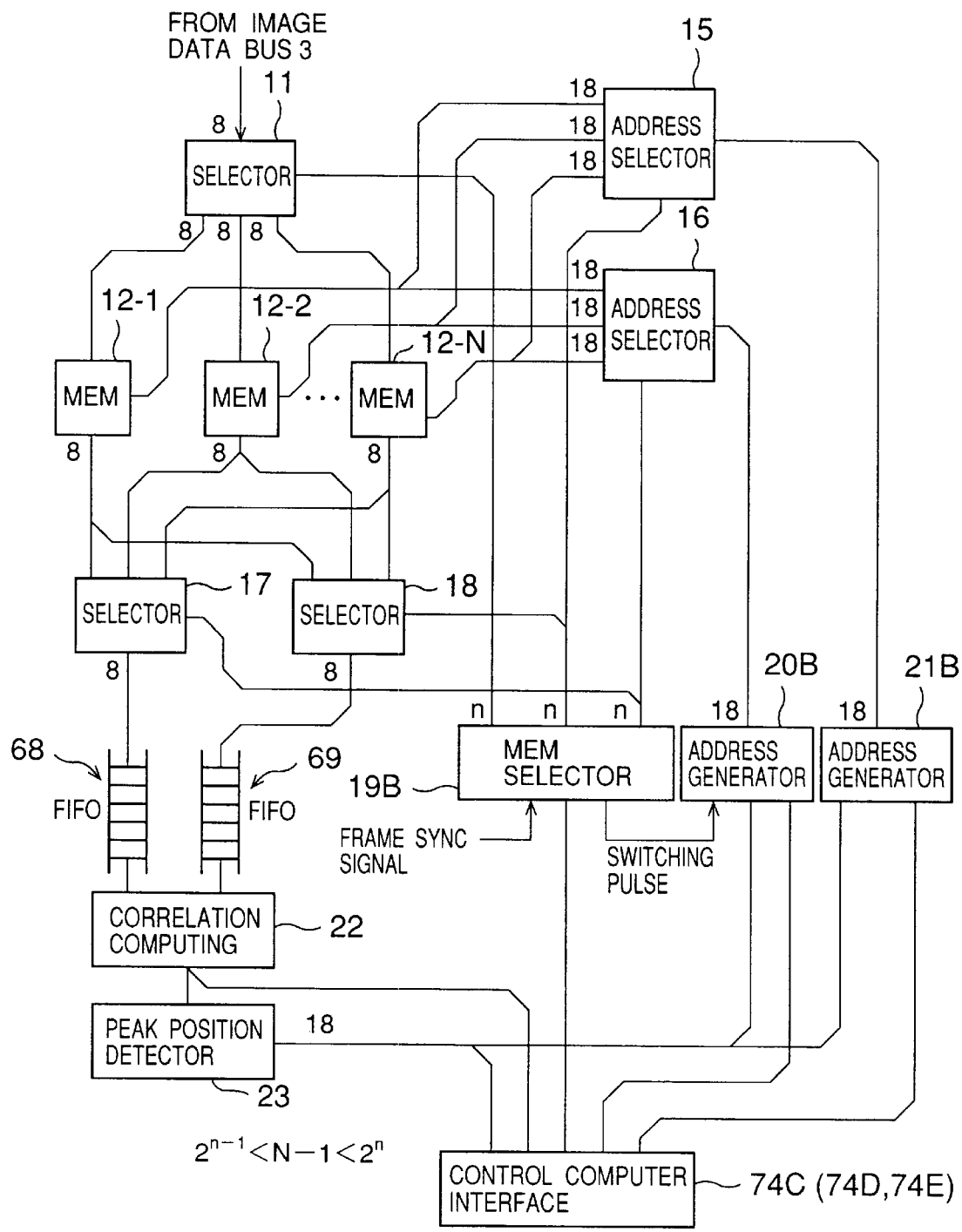
FIG. 30 is a system block diagram showing the construction of the correlation tracking processor of a seventh embodiment of the local region image tracking apparatus according to the present invention.

FIG. 30 is a system block diagram showing the construction of the correlation tracking processor 4 of this embodiment. In FIG. 30, those parts which are the same as those corresponding parts in FIG. 28 are designated by the same reference numerals, and a description thereof will be omitted.

In this embodiment, a control computer interface 74C is connected to the correlation computing unit 22, the peak position detector 23, the memory selector 19B, the reference image address generator 20B and the search image address generator 21B.

Figure 31:
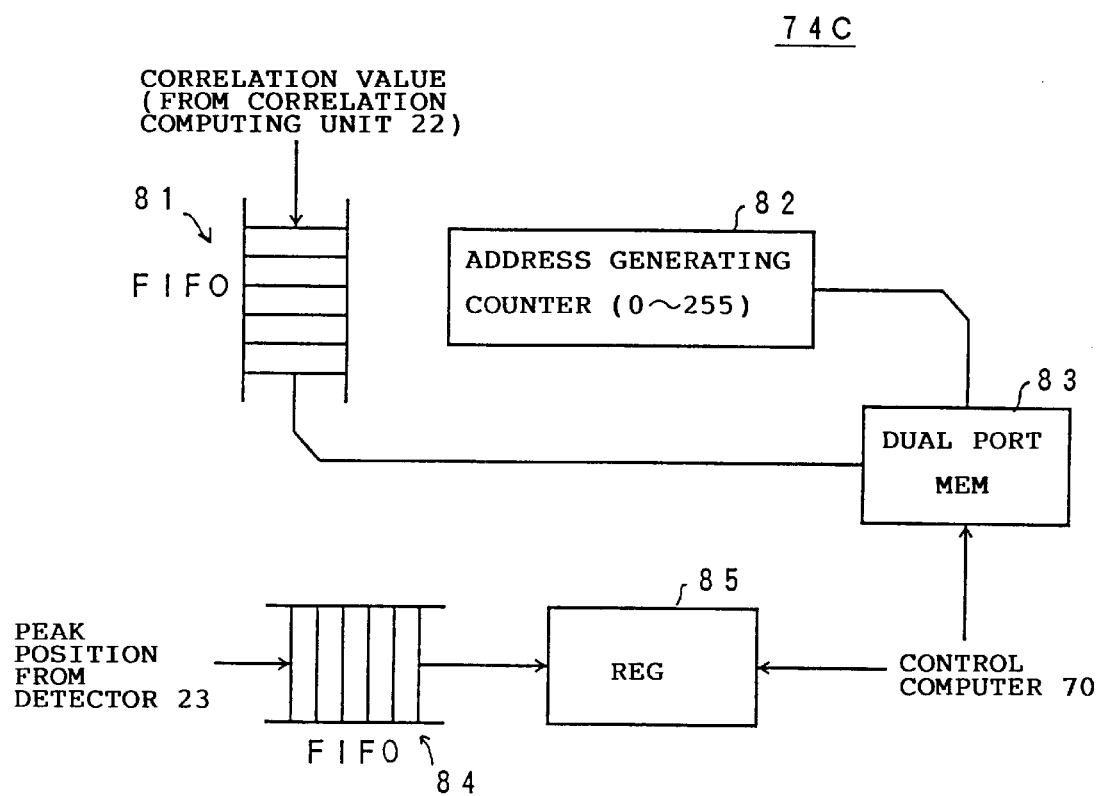
FIG. 31 is a system block diagram showing a part of a first embodiment of the control computer interface shown in FIG. 30.

FIG. 31 is a system block diagram showing a part of a first embodiment of the control computer interface 74C shown in FIG. 30. The control computer interface 74C includes FIFOs 81 and 84, an address generating counter 82, a dual port memory 83, and a register 85. The FIFO 81 successively stores the correlation values output from the correlation computing unit 22, and each correlation value output from the FIFO 81 is stored in the dual port memory 83 at the address generated from the address generating counter 82. If it is assumed that the correlation computing unit 22 computes the correlation values for the reference image and the 256 partial region images within the search image, the address generating counter 82 repeatedly generates addresses "0" through "256". The control computer 70 can make a reference to the correlation values stored in the dual port memory 83 via the control computer bus 71. On the other hand, the FIFO 84 successively stores the peak positions obtained from the peak position detector 23, and for example, 1 peak position is stored in the register 85 with respect to 256 correlation values. The control computer 70 can also make a reference to the peak position within the register 85 via the control computer bus 71.

Figure 32:
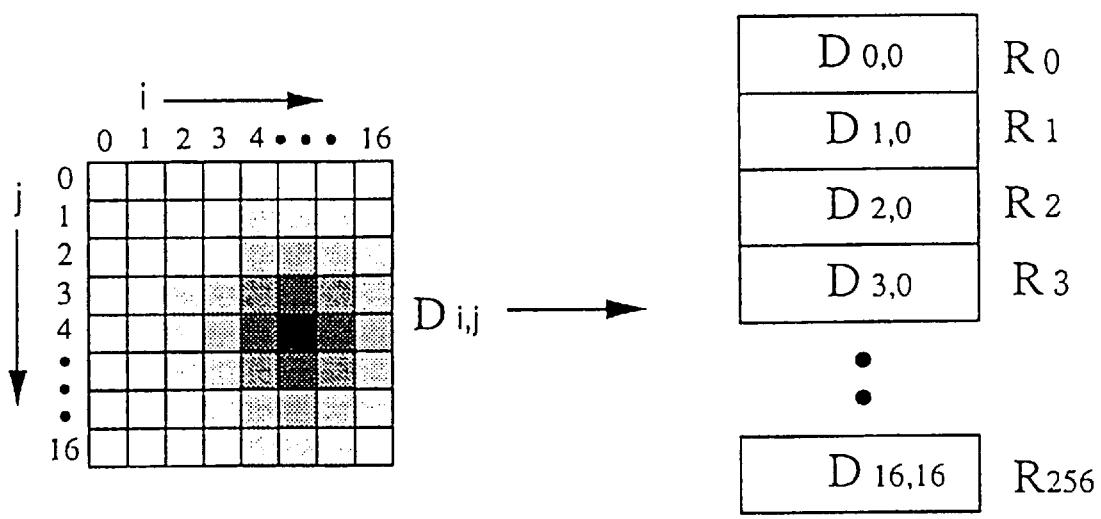
FIG. 32 is a diagram for explaining the storage of 256 correlation values to a dual port memory.

FIG. 32 is a diagram for explaining the storage of 256 correlation values into the dual port memory 83. In FIG. 32, the left portion shows the search image, and the right portion shows the correlation value $D_{i,j}$ stored in the dual port memory 83.

Figure 33:
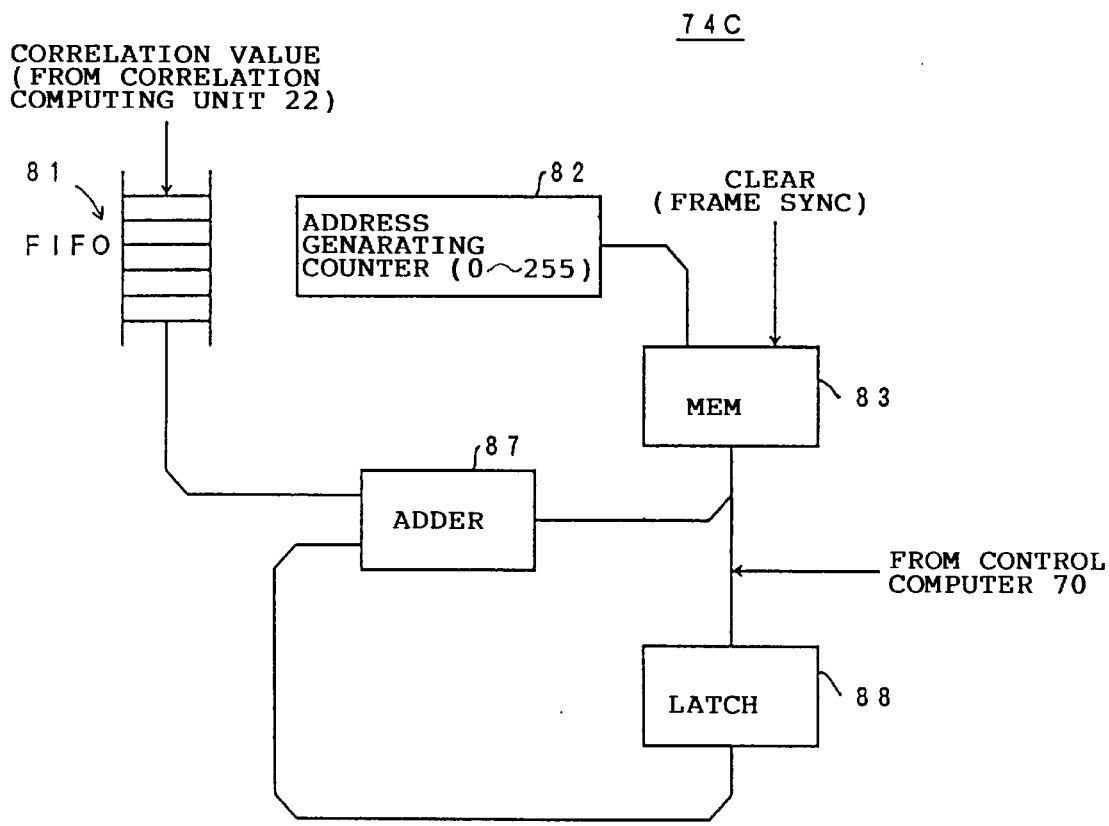
FIG. 33 is a system block diagram showing a part of a second embodiment of the control computer interface shown in FIG. 30.

FIG. 33 is a system block diagram showing a part of a second embodiment of the control computer interface 74C shown in FIG. 30. In FIG. 33, those parts which are the same as those corresponding parts in FIG. 31 are designated by the same reference numerals, and a description thereof will be omitted.

In FIG. 33, the control computer interface 74C includes the FIFO 81, the address generating counter 82, the dual port memory 83, an adder 87, and a latch circuit 88. The dual port memory 83 is cleared in response to a rising edge of the frame synchronizing signal at the start of the first 1 frame. Thereafter, the correlation value read from the dual port memory 83 is supplied to the adder 87 via the latch circuit 88. Hence, an added value of the previous correlation value and the present correlation value is supplied to the dual port memory 83 from the adder 87 and stored in the dual port memory 87.

Figure 34:
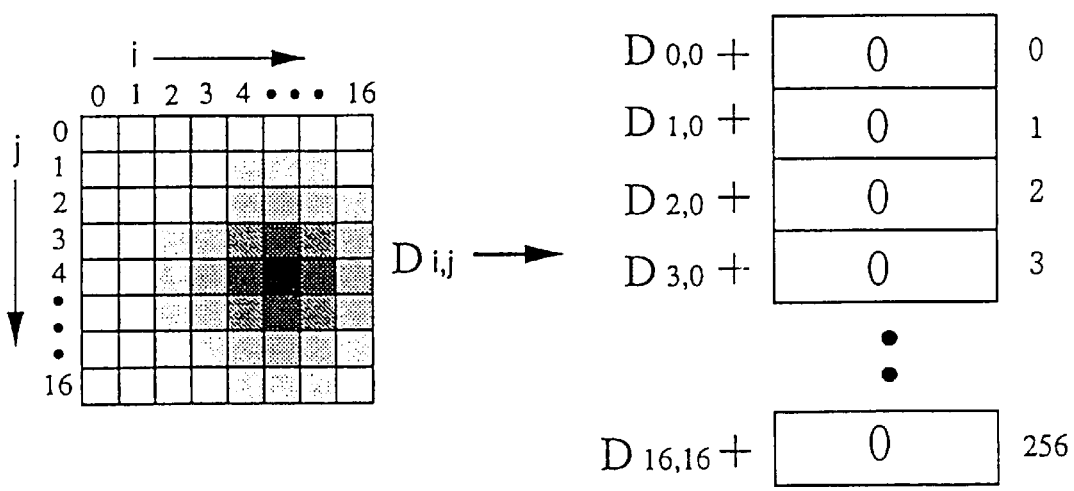
FIG. 34 is a diagram for explaining the storage of 256 correlation values to a cleared dual port memory.
Figure 35:
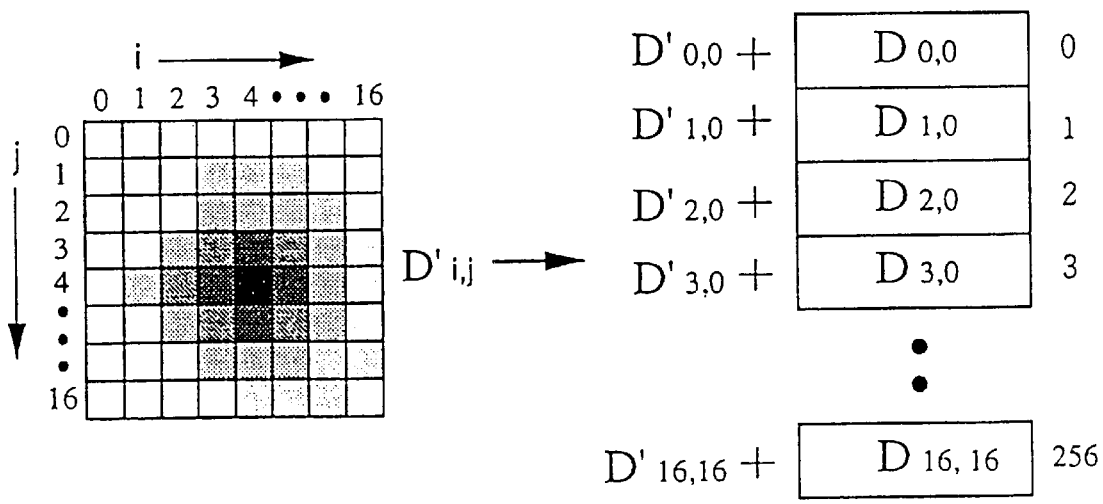
FIG. 35 is a diagram for explaining the storage of 256 correlation values to the dual port memory after the state shown in FIG. 34.

FIG. 34 is a diagram for explaining the storage of 256 correlation values into the dual port memory 83 that is cleared. In FIG. 35, the left portion shows the search image, and the right portion shows the correlation value $D_{i,j}$ that is added with "0" and stored in the dual port memory 83.

FIG. 35 is a diagram for explaining the storage of 256 correlation values into the dual port memory 83 after the state shown in FIG. 34. In FIG. 35, the left portion shows the search image, and the right portion shows correlation values $D'_{i,j}$ which is added with the previous correlation value $D_{i,j}$ and stored in the dual port memory 83.

Therefore, according to the second embodiment of the control computer interface 74C, the correlation value distributions that are obtained by each of the plurality of tracking processes are successively added and stored in the dual port memory 83.

Figure 36:
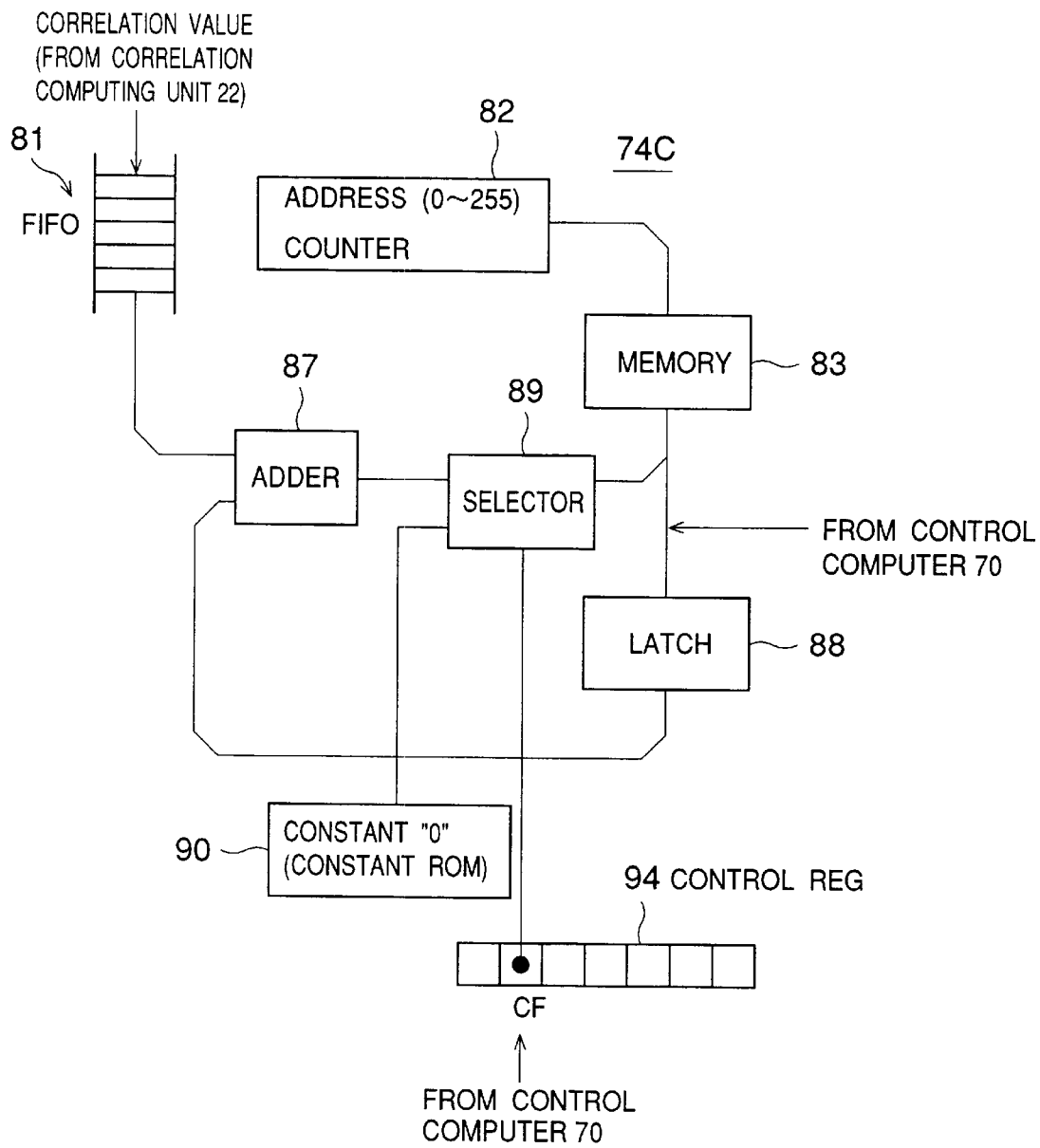
FIG. 36 is a system block diagram showing a part of a third embodiment of the control computer interface shown in FIG. 30.

FIG. 36 is a system block diagram showing a part of a third embodiment of the control computer interface 74C shown in FIG. 30. In FIG. 36, those parts which are the same as those corresponding parts in FIG. 33 are designated by the same reference numerals, and a description thereof will be omitted.

In FIG. 36, the control computer interface 74C includes the FIFO 81, the address generating counter 82, the dual port memory 83, the adder 87, the latch circuit 88, a selector 89, a constant ROM 90, and a control register 91. The selector 89 receives the added value from the adder 87 and a value "0" read from the constant ROM 90. When a clear flag CF within the control register 91 is set, the value "0" is supplied to the dual port memory 83 and stored in the dual port memory 83 to clear the same. On the other hand, when the clear flag CF is not set, the selector 89 supplies the added value from the adder 87 to the dual port memory 83 and stores the added value in the dual port memory 83.

Hence, according to the third embodiment of the control computer interface 74C, whether or not to add and store the correlation value distributions obtained by each of the plurality of tracking processes in the dual port memory 83 can be instructed by setting or resetting the clear flag CF within the control register 91 from the control computer 70.

Next, a description will be given of an eighth embodiment of the local region image tracking apparatus according to the present invention, by referring to FIG. 37. This embodiment also employs the basic construction of the fifth embodiment shown in FIG. 24.

Figure 37:
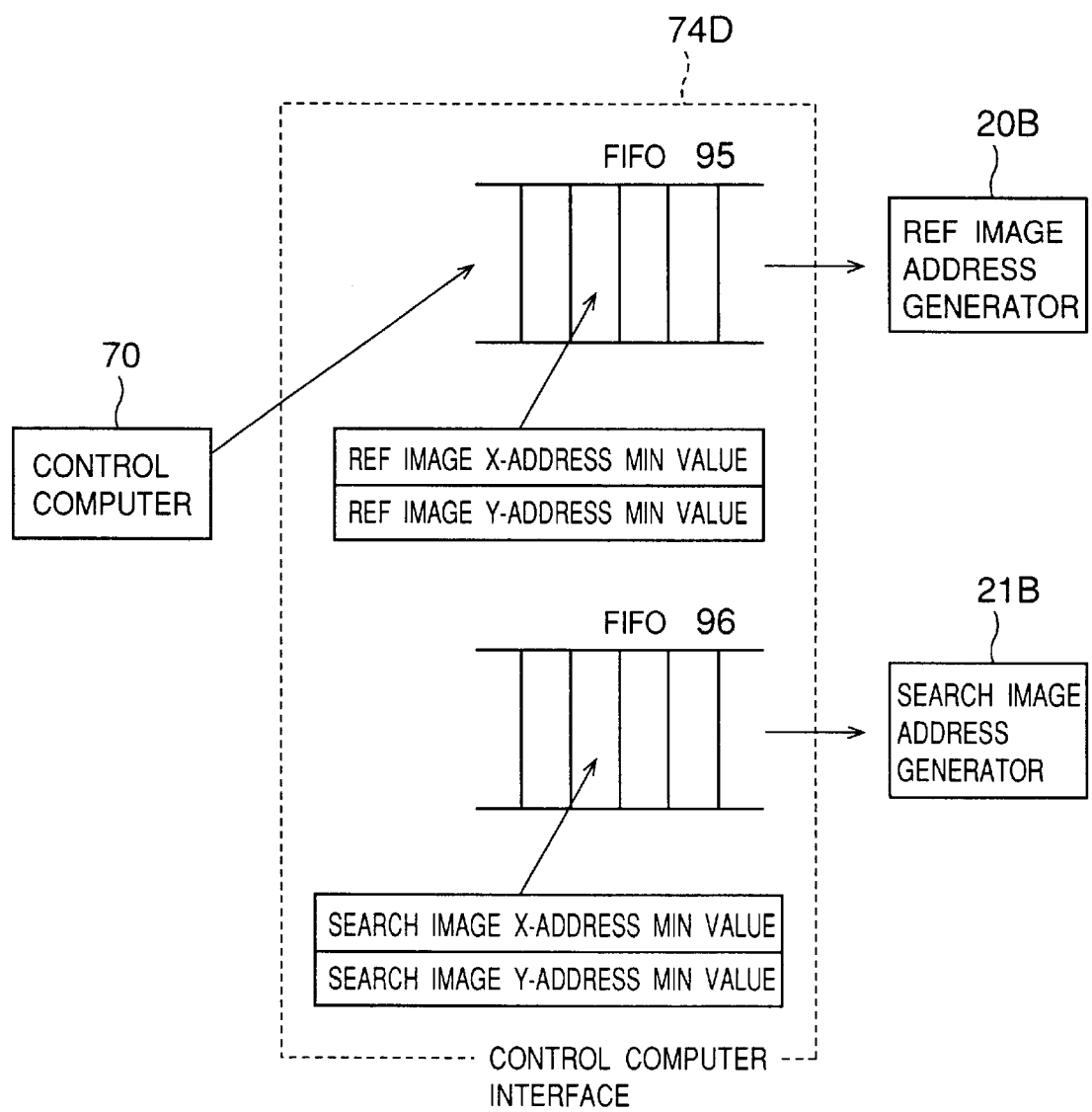
FIG. 37 is a system block diagram showing the construction of a part of an eighth embodiment of the local region image tracking apparatus according to the present invention together with a control computer.

FIG. 37 is a system block diagram showing a part of the construction of the correlation tracking processor 4 together with the control computer 70. In FIG. 37, those parts which are the same as those corresponding parts in FIG. 30 are designated by the same reference numerals, and a description thereof will be omitted.

In this embodiment, the control computer 70 successively writes the data blocks of the addresses indicating positions of the reference image and the search image into FIFOs 95 and 96 within a control computer interface 74D via the control computer bus 71. In other words, the control computer 70 writes in advance the X-address minimum value and the Y-address minimum value of the reference image to be supplied to the reference image address generator 20B into the FIFO 95. In addition, the control computer 70 writes in advance the X-address minimum value and the Y-address minimum value of the search image to be supplied to the search image address generator 21B into the FIFO 96. Accordingly, this embodiment is basically the same as the sixth embodiment described above in conjunction with FIGS. 28 and 29, except that this embodiment uses the FIFOs 95 and 96 in place of the registers.

According to this embodiment, by writing the plurality of data blocks into the FIFOs 95 and 96 in advance, it is possible to carry out a plurality of tracking processes in one operation without the intervention of the control computer 70.

Next, a description will be given of a ninth embodiment of the local region image tracking apparatus according to the present invention, by referring to FIG. 38. This embodiment also employs the basic construction of the fifth embodiment shown in FIG. 24.

Figure 38:
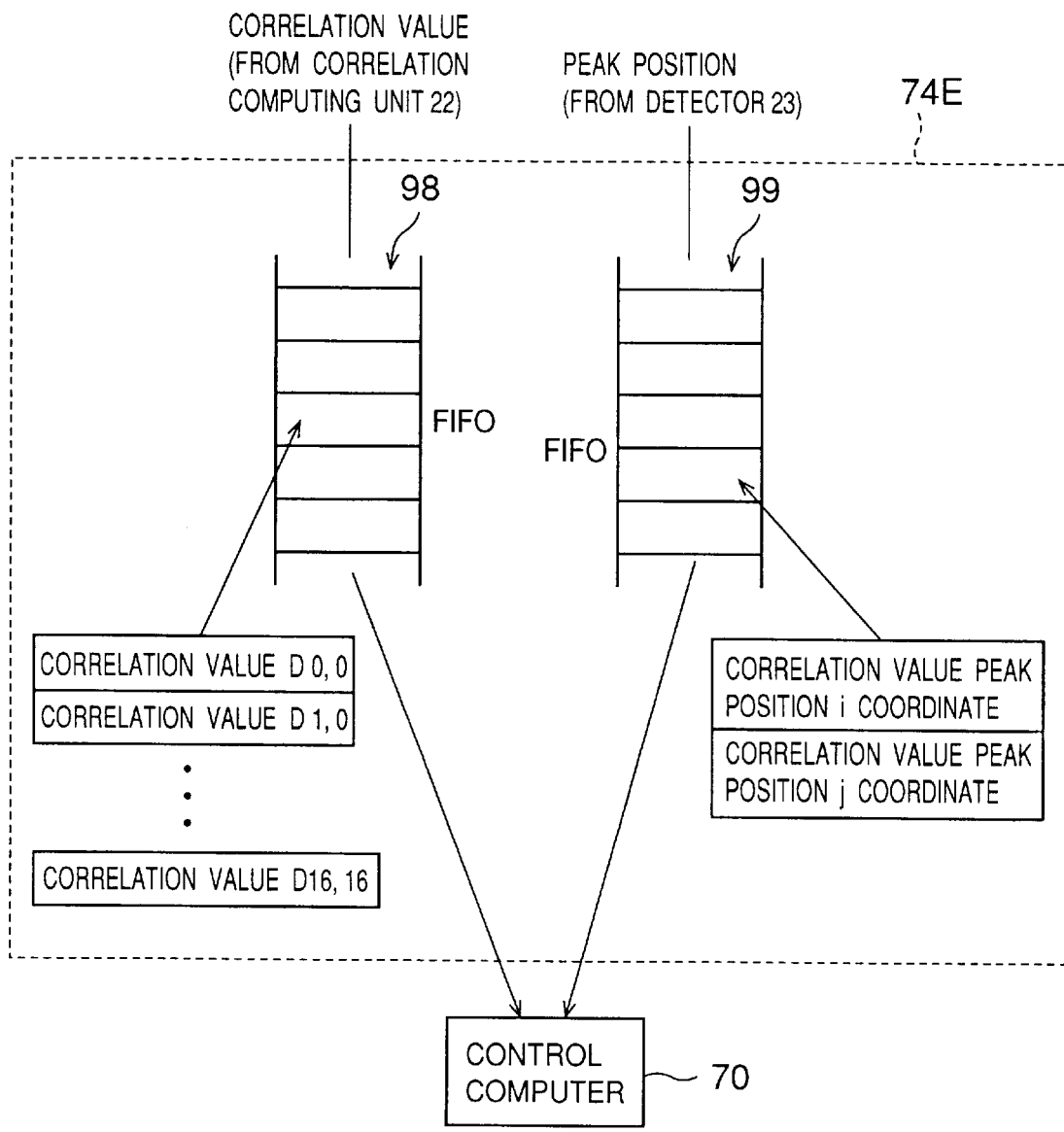
FIG. 38 is a system block diagram showing the construction of a part of a ninth embodiment of the local region image tracking apparatus according to the present invention together with a control computer.

FIG. 38 is a system block diagram showing a part of the construction of the correlation tracking processor 4 of this embodiment together with the control computer 70.

In this embodiment, the correlation values output from the correlation computing unit 22 are successively written into a FIFO 98 within a control computer interface 74E, and the peak positions output from the peak position detector 23 are successively written into a FIFO 99 within the control computer interface 74E. The construction and operation of this embodiment are basically the same as those of the seventh embodiment described above, except that this embodiment does not use a dual port memory nor registers.

According to this embodiment, the control computer 70 can make a reference to the FIFOs 98 and 99 within the control computer interface 74E at an arbitrary time, to read out the written correlation values and peak positions if any.

Of course, the construction shown in FIG. 37 and the construction shown in FIG. 38 may be provided within 1 control computer interface.

Next, a description will be given of a tenth embodiment of the local region image tracking apparatus according to the present invention, by referring to FIGS. 39 through 42. This embodiment also employs the basic construction of the fifth embodiment shown in FIG. 24. In addition, a part of the correlation tracking processor 4 has the construction shown in FIG. 30, for example, and the control computer interface 74C has the construction shown in FIGS. 36 and 37, for example.

Figure 39:
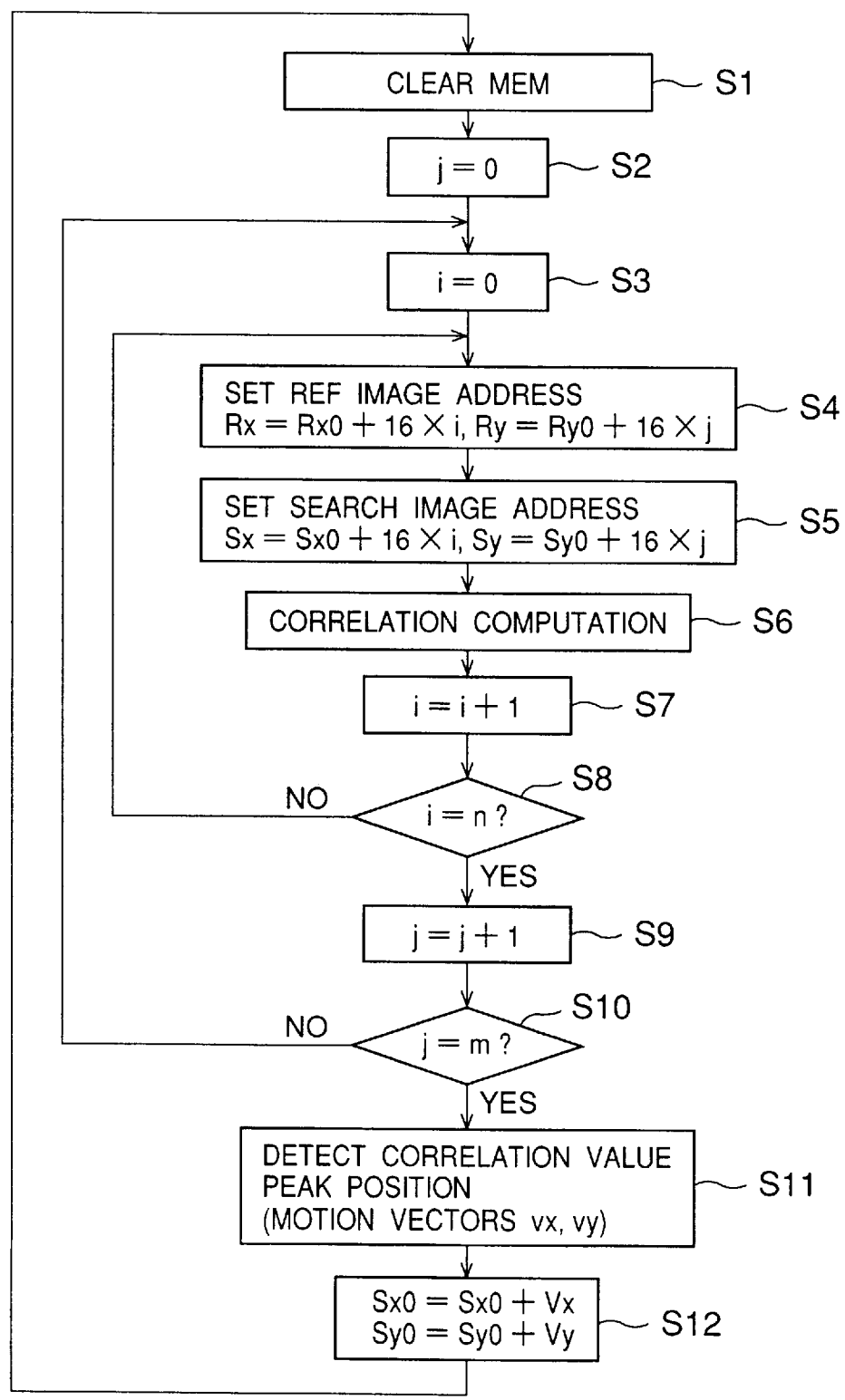
FIG. 39 is a flow chart for explaining the operation of a tenth embodiment of the local region image tracking apparatus according to the present invention.

FIG. 39 is a flow chart for explaining the operation of this embodiment. For the sake of convenience, it will be assumed that the tracking process is carried out with respect to a reference image having 16 n pixels×16 m pixels. In FIG. 39, the control computer 70 clears the contents of the dual port memory 83 within the control computer interface 74C in a step S1, and sets j and i to "0" in respective steps S2 and S3. In addition, the control computer 70 sets reference image addresses Rx and Ry in the FIFO 95 within the control computer interface 74C in a step S4, and sets search image addresses Sx and Sy in the FIFO 96 within the control computer interface 74C in a step S5. Rx is the X-address minimum value of the reference image described by Rx0+16xi, and Ry is the Y-address minimum value of the reference image described by Ry0+16xj. In addition, Sx is the X-address minimum value of the search image described by Sx0+16xi, and Sy is the Y-address minimum value of the search image described by Sy0+16xj.

The correlation computing unit 22 carries out the correlation computation in a step S6. Thereafter, the control computer 70 increments i in a step S7, and decides whether or not i=n in a step S8. If the decision result in the step S8 is NO, the process returns to the step S4. On the other hand, if the decision result in the step S8 is YES, the control computer 70 increments j in a step S9, and decides whether or not j=m in a step S10. If the decision result in the step S10 is NO, the process returns to the step S3. On the other hand, if the decision result in the step S10 is YES, the peak position detector 23 detects the peak position of the correlation value in a step S11. When moving vectors are denoted by vx and vy, the control computer 70 adds vx to Sx0 and adds vy to Sy0 in a step S12, and the process returns to the step S1.

FIG. 40A shows one of the adjacent reference images, FIG. 40B shows the search image corresponding to the reference image shown in FIG. 40A, and FIG. 40C shows the correlation value distribution obtained from the reference and search images shown in FIGS. 40A and 40B.

FIG. 41A shows the other of the adjacent reference images, FIG. 41B shows the search image corresponding to the reference image shown in FIG. 41A, and FIG. 41C shows the correlation value distribution obtained from the reference and search images shown in FIGS. 41A and 41B.

Further, FIG. 42A shows the reference image which is made up of the adjacent reference images shown in FIGS. 40A and 40B, FIG. 42B shows the search image corresponding to the reference image shown in FIG. 42B, and FIG. 42C shows the correlation value distribution that is obtained by adding the correlation value distributions shown in FIGS. 40C and 41C. In other words, the adder 87 within the control computer interface 74C adds the correlation value distributions shown in FIGS. 40C and 41C, and the correlation value distribution shown in FIG. 42C is stored in the dual port memory 83.

According to this embodiment, the correlation value distributions which are results of the tracking processes with respect to the adjacent reference images are all added, and the peak position is obtained for the added correlation value distribution. For this reason, it is possible to carry out the tracking process with respect to the reference image having 16 n pixels×16 m pixels, that is, an arbitrary magnification of 16 pixels×16 pixels.

Next, a description will be given of an eleventh embodiment of the local region image tracking apparatus according to the present invention, by referring to FIG. 43. This embodiment may employ the basic construction of the first embodiment shown in FIG. 2 or, the basic construction of the fifth embodiment shown in FIG. 24. In addition, a part of the correlation tracking processor 4 may have the same construction as that of any of the embodiments described above.

In each of the second through tenth embodiments described above, the image data output from the image input unit 2 are 8-bit monochrome or color information, and thus, each of the correlation tracking processors 4-1 through 4-M has an 8-bit construction. In other words, existing 8-bit LSIs or the like on the market may be used for the correlation computing unit 22 and the like, making it very convenient to produce the local region image tracking apparatus. However, if the image data output from the image input unit 2 are 24 bit color information, for example, the construction of each of the correlation tracking processors 4-1 through 4-M must be modified to the 24-bit construction to conform to the 24-bit color information.

Figure 43:
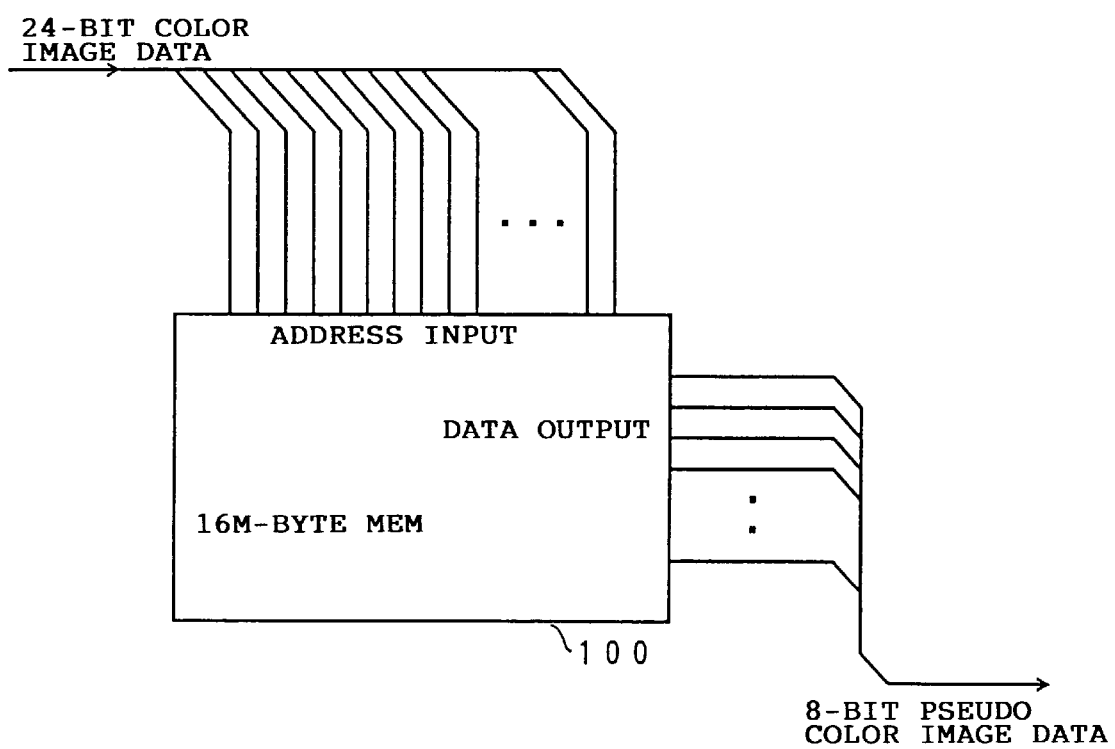
FIG. 43 is a system block diagram showing a part of an eleventh embodiment of the local region image tracking apparatus according to the present invention.

FIG. 43 is a system block diagram showing a part of this embodiment. In FIG. 43, a 16-Mbyte memory (ROM) 100 prestores a conversion table for converting the 24-bit color image data from the image input unit 2 into an 8-bit pseudo color image data. More particularly, the 24-bit color image data are input to the memory 100 as the address, and the 8-bit pseudo color image data are output from the input address of the memory 100.

The memory 100 may be provided within the image input unit 2, between the image input unit 2 and the image data bus 3 or, within each of the correlation tracking processors 4-1 through 4-M.

According to this embodiment, even if the number of bits of the image data output from the image input unit 2 and the number of bits processed by each of the correlation tracking processors 4-1 through 4-M are different, each of the correlation tracking processors 4-1 through 4-M can be constructed to process a fixed number of bits by making the necessary conversion in the memory 100. The number of input bits and the number of output bits of the memory 100 are of course not limited to 24 bits and 8 bits, respectively.

It is conceivable to unconditionally update the reference image for each frame into the image of the region at the peak position of the correlation value distribution within the search image.

Figure 1:
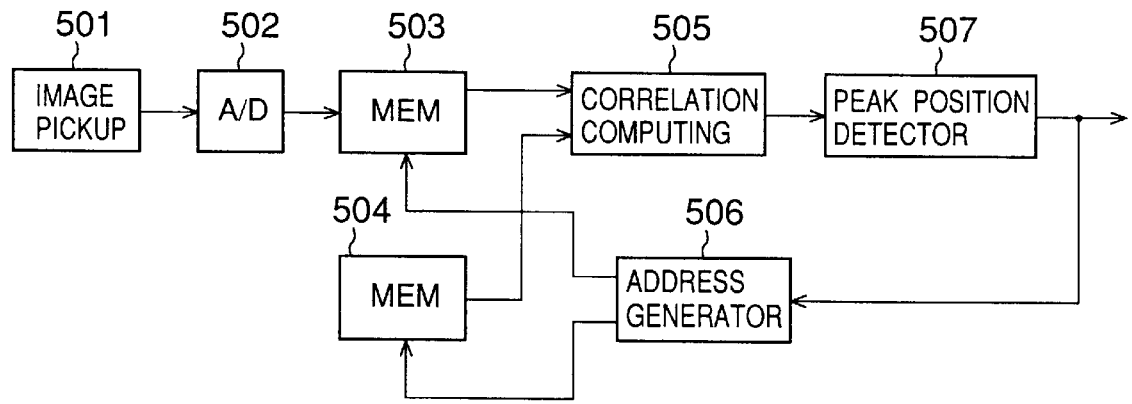
FIG. 1 is a system block diagram showing a part of an example of a conventional local region image tracking apparatus.
Figure 44:
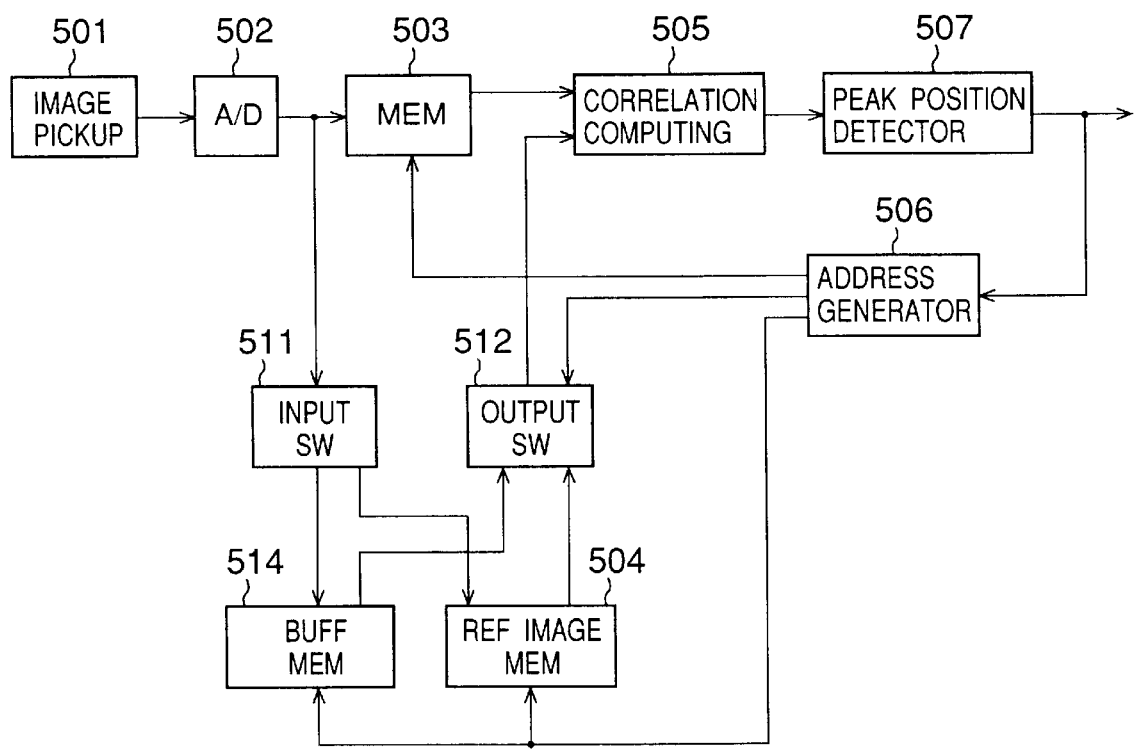
FIG. 44 is a system block diagram showing a conceivable local region image tracking apparatus.

FIG. 44 is a system block diagram showing a local region image tracking apparatus which makes this conceivable updating of the reference image. In FIG. 44, those parts which are the same as those corresponding parts in FIG. 1 are designated by the same reference numerals, and a description thereof will be omitted.

In FIG. 44, it is assumed that the reference image memory 504 prestores the reference image data. First, in the first 1 frame, an input switch 511 is switched to a state so as to supply and store the image data from the A/D converter 502 into a buffer memory 514. In addition, an output switch 512 is switched to a state so as to supply the reference image data read from the reference image memory 504 to the correlation computing unit 505.

When the peak position of the correlation value for the first 1 frame is detected and this peak position is fed back from the correlation value peak position detector 507 to the address generator 506, the input switch 511 and the output switch 512 are switched from the above states, and the image data from the A/D converter 502 are stored in the reference image memory 504 and the image data read from the buffer memory 514 are supplied to the correlation value computing unit 505 as the reference image data. As a result, the reference image is unconditionally updated to the image of the region at the peak position of the correlation value distribution within the search image for each frame.

However, if this method is employed to update the reference image for each frame, there is a possibility that the tracking process will be carried out using as a new reference image an image of region having a low correlation value with respect to the reference image, and the errors of the tracking process are more easily accumulated. In addition, if an image of a region which includes noise is used as the new reference image, the error of the tracking process becomes large, and the local region image tracking apparatus becomes easily affected by the noise.

Accordingly, a description will now be given of a local region image tracking apparatus which can eliminate the inconveniences of the conceivable local region image tracking apparatus described above.

Figure 45:
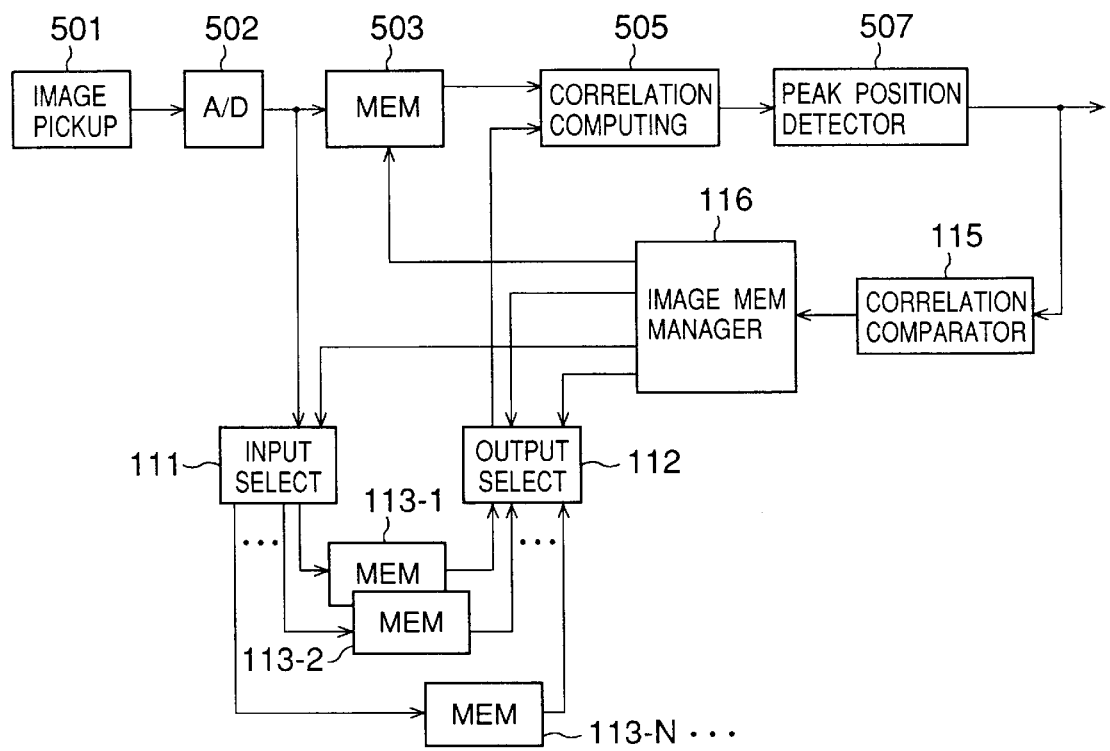
FIG. 45 is a system block diagram showing the construction of a twelfth embodiment of the local region image tracking apparatus according to the present invention.

Next, a description will be given of a twelfth embodiment of the local region image tracking apparatus according to the present invention, by referring to FIGS. 45 through 49. FIG. 45 is a system block diagram showing a twelfth embodiment of the local region image tracking apparatus according to the present invention. In FIG. 45, those parts which are the same as those corresponding parts in FIG. 44 are designated by the same reference numerals, and a description thereof will be omitted.

In FIG. 45, the local region image tracking apparatus includes the image pickup device 501, the A/D converter 502, the search image memory 503, the correlation computing unit 505, the correlation value peak position detector 507, an input selector 111, an output selector 112, image memories 113-1 through 113-N, a correlation comparator 115, and an image memory manager 116, where N is an integer greater than or equal to 3. In this embodiment, at least 2 of the N image memories 113-1 through 113-N are used as the reference image memories, and 1 of the N image memories 113-1 through 113-N are used as the input image memory.

The analog image data related to the image picked up by the image pickup device 501 are converted into digital image data by the A/D converter 502, and are successively stored in the search image memory 503 on one hand and are supplied to the input selector 111 on the other. The image memories 113-1 through 113-N are provided to store the past input image data. The correlation computing unit 505 carries out the correlation computation, so as to obtain the correlation value indicating the correlation between the image data within the search image memory 503 and the reference image data within 1 of the image memories 113-1 through 113-N that is used as the reference image memory. The peak position of the correlation value, that is, the position having the highest correlation within the picked up image, is detected by the correlation value peak position detector 507. Hence, the peak position of the correlation value is always obtained from the correlation value peak position detector 507, and it is possible to track a predetermined object within the picked up image in real-time based on the peak position.

The correlation computing unit 505 carries out the following operation with respect to the image data within the search image memory 503 and the reference image data within the reference image memory. For the sake of convenience, it will be assumed that the reference image is made up of 8 pixels×8 pixels as shown in FIG. 5, and a pixel value within this reference image is denoted by $X_{i,j}$. In this case, with respect to the search image which is made up of 16 pixels×16 pixels as shown in FIG. 6, the correlation computing unit 505 carries out an operation described by the following formula with a partial region image having the same size as the reference image within the search image as shown in FIG. 7. In the following formula, $Y_{i,j}$ denotes a pixel value within the search image, $D_{m,n}$ denotes a correlation value indicating how similar the two images are by a numerical value, m=0 , . . . , 7, and n=0 , . . . , 7.

$$D_{m,n} = \sum_{i=0}^{7} \sum_{j=0}^{7} |X_{i,j} - Y_{i+m,j+n}|$$

In the formula described above, the value of $D_{m,n}$ becomes smaller as the two images become more similar to each other.

FIG. 8 shows an example of the actual reference image, and FIG. 9 shows an example of the actual search image. In addition, FIG. 10 shows a result which is obtained by carrying out the correlation computation in the correlation computing unit 505 with respect to the reference image shown in FIG. 8 and the search image shown in FIG. 9. In this particular case, $D_{m,n}$ has a minimum value when n=5 and n=4, and it is indicated that the partial region image at this position is most similar to, that is, most closely resembles, the reference image.

The correlation computation carried out with respect to the image can find an image portion which most closely resembles the reference image. Hence, by carrying out this correlation computation process with respect to a moving image for each frame, it is possible to track the moving object within the image.

If the correlation computation process that is described by the formula described above and is carried out by the correlation computing unit 505 is only to an extent such that the correlation values are obtained by carrying out the correlation computation with respect to the reference image made up of 16 pixels×16 pixels for 256 partial region images within the search image made up of 32 pixels×32 pixels, for example, a LSI of the correlation computing unit has already been developed including the correlation value peak position detector which detects the peak position of the correlation value. In such a LSI, the calculation time required for the above correlation computation process is only 500 μs or less. For example, the LSI STI3220 manufactured by S.G.S. Thomson may be used for the correlation computing unit 505. Hence, by setting the size of the reference image to 16 pixels×16 pixels as in this embodiment, it is possible to realize a high-speed local region image tracking apparatus which is compact and can carry out 50 to 70 correlation computations within the time of 1 frame.

The correlation value peak position detector 507 detects the peak position of the correlation value from the correlation value distribution shown in FIG. 10, and supplies the peak position to the image memory manager 116 via the correlation comparator 115. The peak position is used when the image memory manager 116 generates the addresses of the image memories. In addition, the image memory manager 116 stores the pair formed by the identification (or memory) number of the image member used as the input image memory and the peak position of the correlation value, and determines the image memories that are to be used as the reference image memory and the input image memory for each frame. Switching signals dependent on this determination of the image memories made by the image memory manager 116 are supplied to the input selector 111 and the output selector 112. During the tracking process in each frame, the image memories which are to be used as the input image memory and the reference image memory out of the image memories 113-1 through 113-N are switched, the history of the images of the regions at the peak positions of the correlation distribution within the search image are stored, and the reference image is updated to the image that is selected from the history of the images.

The correlation comparator 115 compares the peak positions of each of the correlation value distributions obtained from the correlation value peak position detector 507, and determines the image memory (reference image memory) that stores the reference image having the highest correlation value and the image memory (reference image memory) that stores the reference image having the smallest correlation value. The correlation comparator 115 notifies the result of this determination to the image memory manager 116. The determination and notification of the image memories (reference image memories) made by the correlation comparator 115 are carried out within the time of 1 frame when carrying out N−1 tracking processes by sequentially using those image memories not used as the input image memory as the reference image memories.

Hence, the image memory manager 116 stores the pair formed by the peak position with respect to the maximum correlation value and the identification number of the image memory that is presently used as the input image memory, and uses the image memory which stores the reference image having the maximum correlation value as the reference image memory. In addition, if an available or unused image memory exists, this unused image memory is used as the input image memory for the next frame. On the other hand, if no unused image memory exists, the image memory which stores the reference image having the minimum correlation value is used as the input image memory for the next frame. The selection of the image memory that is to be used as the input image memory for the next frame is made by supplying the switching signals to the input selector 111 and the output selector 112 from the image memory manager 116.

Of course, the correlation comparator 115 may be a part of the image memory manager 116.

According to this embodiment, the reference image is successively updated to the image having the highest correlation value with respect to the input image that is stored in the input image memory out of the history of the images. For this reason, even if the tracking is made with respect to an object whose appearance changes during the tracking depending on the view of the object, it is possible to improve the reliability of the tracking process.

Figure 46:
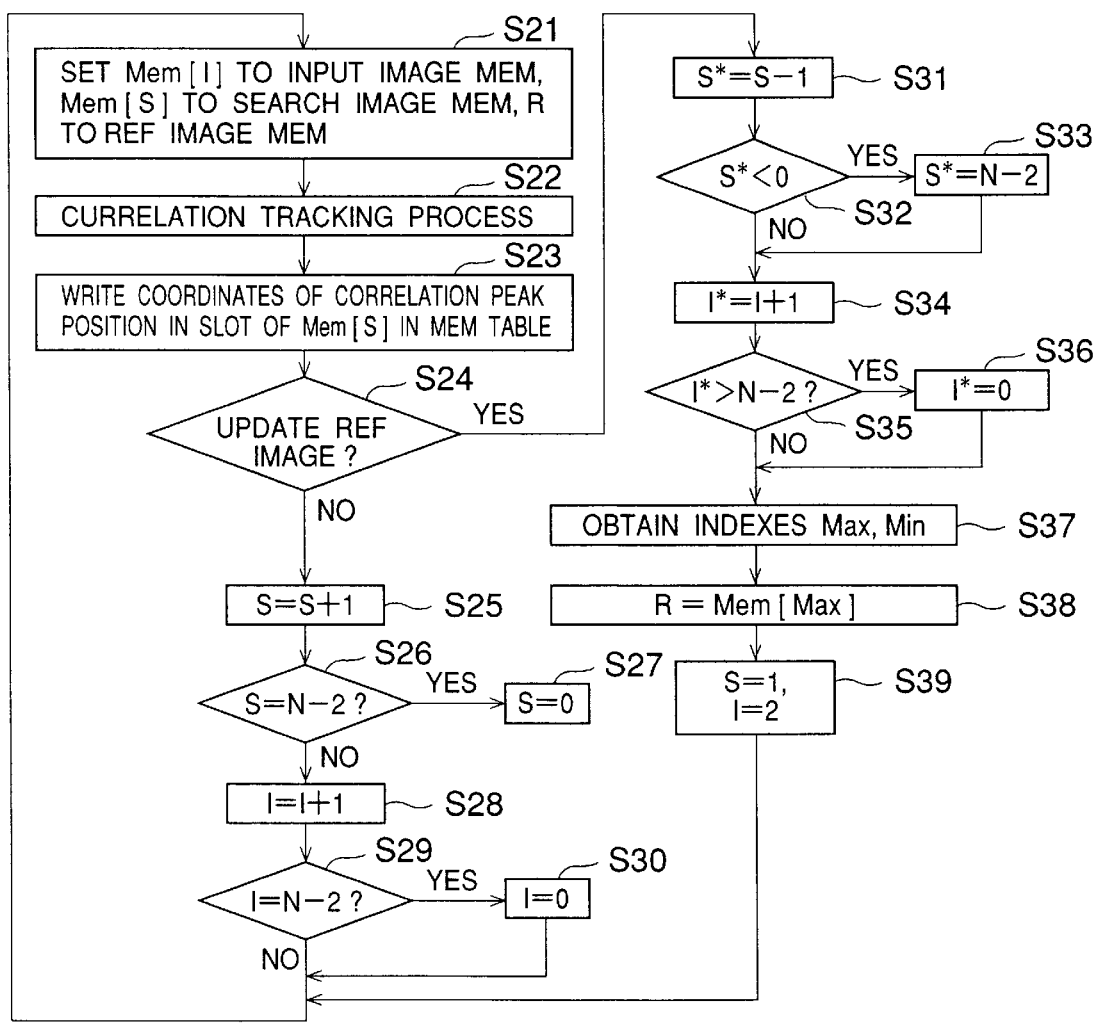
FIG. 46 is a flow chart for explaining the operation of a central processing unit when an image memory manager is formed by the central processing unit.

Next, a description will be given of the operation of this embodiment, by referring to FIG. 46. FIG. 46 is a flow chart showing the operation of a central processing unit (CPU) for a case where the image memory manager 116 is formed by the CPU.

Figure 47:
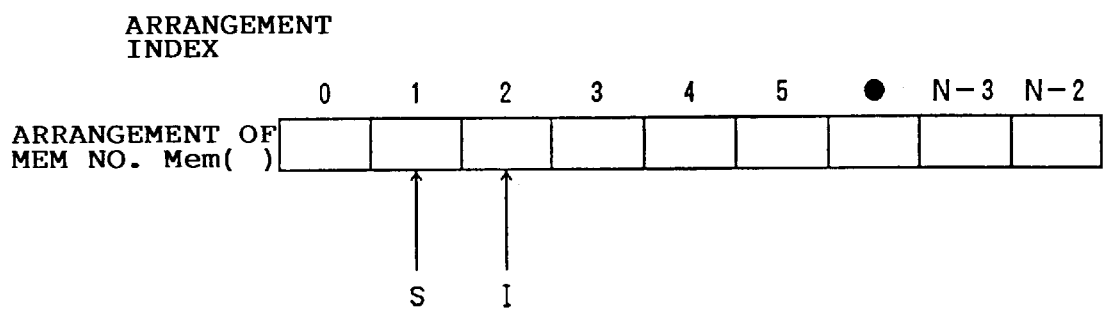
FIG. 47 is a diagram for explaining the arrangement of image memory numbers.
Figure 48:
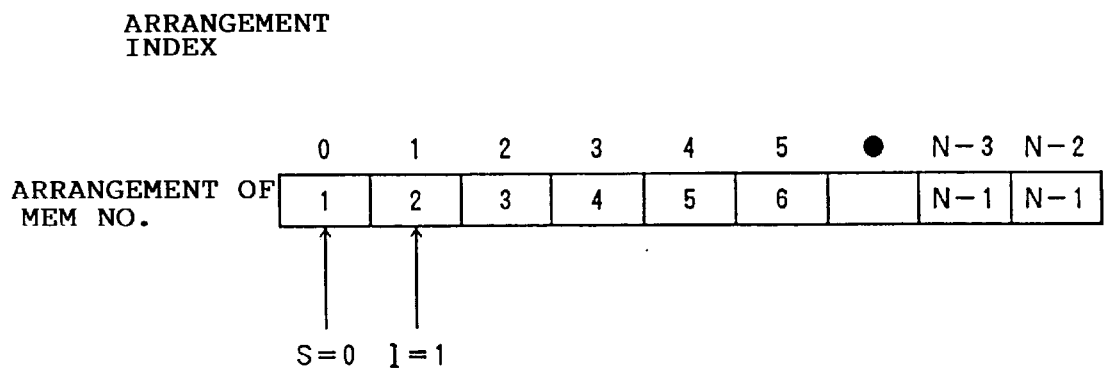
FIG. 48 is a diagram showing an initial state of the arrangement of the image memory numbers.

In FIG. 46, a step S21 sets an image memory having a memory number Mem[I] as the input image memory, an image memory having a memory number Mem[S] as the search image memory, and an image memory having a memory number R as the reference image memory. In this embodiment, the memory numbers are arranged as shown in FIG. 47. In FIG. 47, S indicates an arrangement index for the search image memory, and I indicates an arrangement index for the input image memory. In addition, FIG. 48 shows an initial state of the arrangement of the memory numbers, where the memory number R of the reference image memory is set to "0".

A step S22 supplies the reference image data to the correlation computing unit 22 and starts the correlation computation process, that is, the tracking process. A step S23 writes the coordinates of the peak position of the correlation value in a slot of the memory number Mem[S] of the memory table shown in FIG. 49. A step S24 decides whether or not to update the reference image. In the memory table shown in FIG. 49, "0" through "N−1" denote the memory numbers, "X0" through "X6" denote the X-coordinates of the peak positions of the correlation values, "Y0" through "Y6" denote the Y-coordinates of the peak positions of the correlation values, and "−1" indicates that the coordinate has not be written at this position.

If the decision result in the step S24 is NO, a step S25 increments the arrangement index S of the search image memory. A step S26 decides whether or not the arrangement index S of the search image memory is N−2, and a step S27 sets the arrangement index S of the search image memory to "0" if the decision result in the step S26 is YES. After the step S27 or if the decision result in the step S26 is NO, a step S28 increments the arrangement index I of the input image memory. A step S29 decides whether or not the arrangement index I of the input image memory is N−2, and a step S30 sets the arrangement index I of the input image memory to "0" if the decision result in the step S29 is YES. After the step S30 or if the decision result in the step S29 is NO, the process returns to the step S21.

On the other hand, if the decision result in the step S24 is YES, a step S31 sets an arrangement index S* of the search image memory after the updating to S−1. A step S32 decides whether or not the arrangement index S* of the search image memory after the updating is smaller than "0", and if the decision result is YES, a step S33 sets the arrangement index S* of the search image memory after the updating to N−2. After the step S33 or if the decision result in the step S32 is NO, a step S34 sets an arrangement index I* of the input image memory after the updating to I+1. A step S35 decides whether or not the arrangement index I* of the input image memory after the updating is greater than N−2, and if the decision result is YES, a step S36 sets the arrangement index I* of the input image memory after the updating to "0". After the step S36 or if the decision result in the step S35 is NO, the process advances to a step S37.

The step S37 carries out the tracking process by sequentially using as the reference image memory the image memories excluding those having no inputs out of the image memory having the memory number Mem[I*] when I*=S*, the image memories having the memory numbers Mem[I*] through Mem[S*] when U*<S* and the image memories having the memory numbers Mem[I*] through Mem[N−2] and Mem[0] through Mem[S*] otherwise, and by using as the search image memory the image memory having the memory number Mem[S]. The step S37 also obtains an index Max of the reference image memory which stores the reference image data having the highest (maximum) correlation value, and an index Min of the reference image memory which stores the reference image data having the lowest (minimum) correlation value. However, if an image memory having no input exists, the index of this image memory is regarded as the index Min.

Next, a step S38 sequentially sets the memory numbers of the image memories having the memory number Mem[N−2] to R, Mem[0] to Mem[S], Mem[1] to Mem[I], Mem[2] to Mem[Min], and Mem[3] through Mem[N−3] to Mem[I*] through Mem[S*] if I*<S* and to Mem[I*] through Mem[N−2] and Mem[0] through Mem[S*] if I*>S* and having indexes other than Max and Min, and sets R to R=Mem[Max].

A step S39 sets the arrangement index S of the search image memory to "1", and sets the arrangement index I of the input image memory to "2". The process returns to the step S21 after the step S39.

Next, a description will be given of a thirteenth embodiment of the local region image tracking apparatus according to the present invention, by referring to FIGS. 50 and 51.

Figure 50:
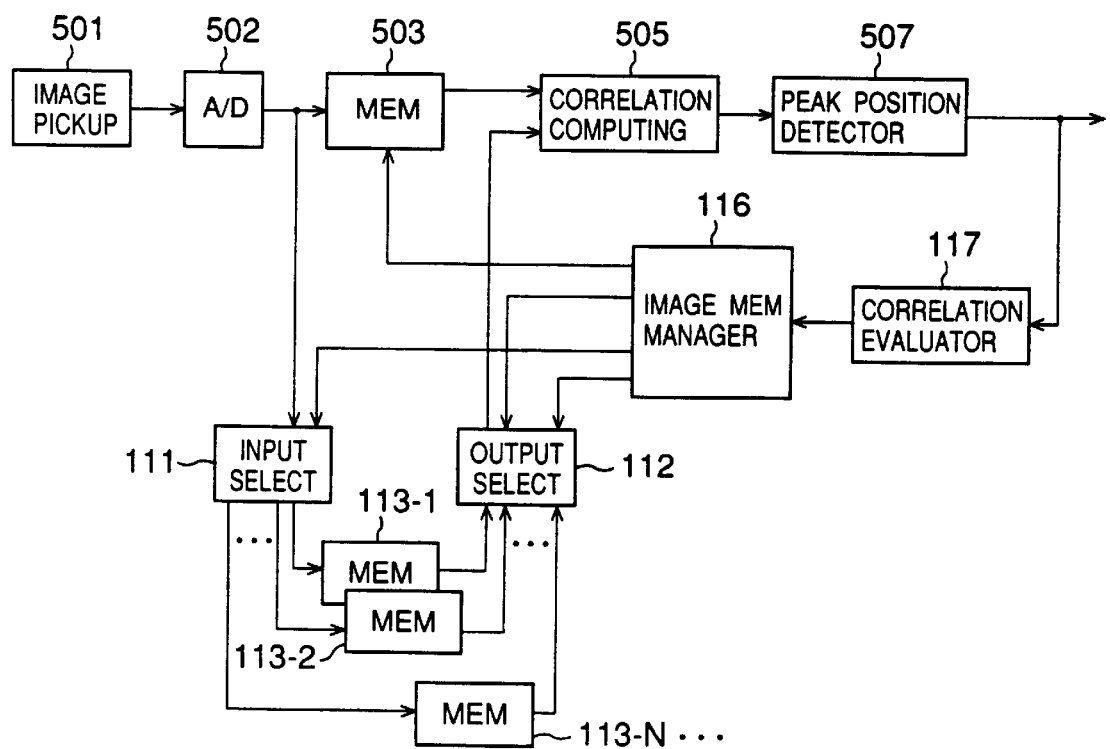
FIG. 50 is a system block diagram showing the construction of a thirteenth embodiment of the local region image tracking apparatus according to the present invention.

FIG. 50 is a system block diagram showing the construction of this thirteenth embodiment of the local region image tracking apparatus. In FIG. 50, those parts which are the same as those corresponding parts in FIG. 45 are designated by the same reference numerals, and a description thereof will be omitted.

In this embodiment, a correlation evaluator 117 shown in FIG. 50 is provided in place of the correlation comparator 115 shown in FIG. 45. This correlation evaluator 117 compares the correlation value at the peak position of the correlation value distribution that is obtained by the tracking process in each frame with respect to a predetermined threshold value, and updates the reference image by switching the reference image memory only when the correlation value is less than or equal to the threshold value. In other words, the tracking process is carried out by making the correlation computation between the image data stored in the reference image memory and the search image memory, and in this process, the correlation evaluator 117 compares the peak value of the correlation value and the predetermined threshold value.

If the peak value of the correlation value is greater than the threshold value as a result of this comparison, the pair formed by the memory number of the present input image memory and the peak position of the correlation value is recorded. If an unused image memory exists, this unused image memory is used as the next input image memory. On the other hand, if no unused image memory exists, the image memory having the oldest input is used as the next input image memory.

If the peak value of the correlation value is less than or equal to the threshold value, the image memory having the most recent input is used as the reference image memory and the tracking process is carried out again with respect to the present input image data. In this case, the pair formed by the peak position of the correlation value and the memory number of the present input image memory is recorded. If an unused image memory exists, this unused image memory is used as the next input image memory. On the other hand, if no unused image memory exists, the image memory having the oldest input is used as the next input image memory.

Of course, the correlation evaluator 117 may be a part of the image memory manager 116.

According to this embodiment, the reference image is successively updated to the image having the highest correlation value with respect to the input image that is stored in the input image memory out of the history of the images. For this reason, even if the tracking is made with respect to an object whose appearance changes during the tracking depending on the view of the object, it is possible to improve the reliability of the tracking process. Furthermore, it is possible to update the reference image to the most recent image within the image memory if the correlation value becomes less than or equal to a predetermined threshold value during the tracking process.

Next, a description will be given of the operation of this embodiment, by referring to FIG. 51. FIG. 51 is a flow chart showing the operation of the CPU for a case where the image memory manager 116 is formed by the CPU. In FIG. 51, those steps which are the same as those corresponding steps in FIG. 46 are designated by the same reference numerals, and a description thereof will be omitted.

Figure 51:
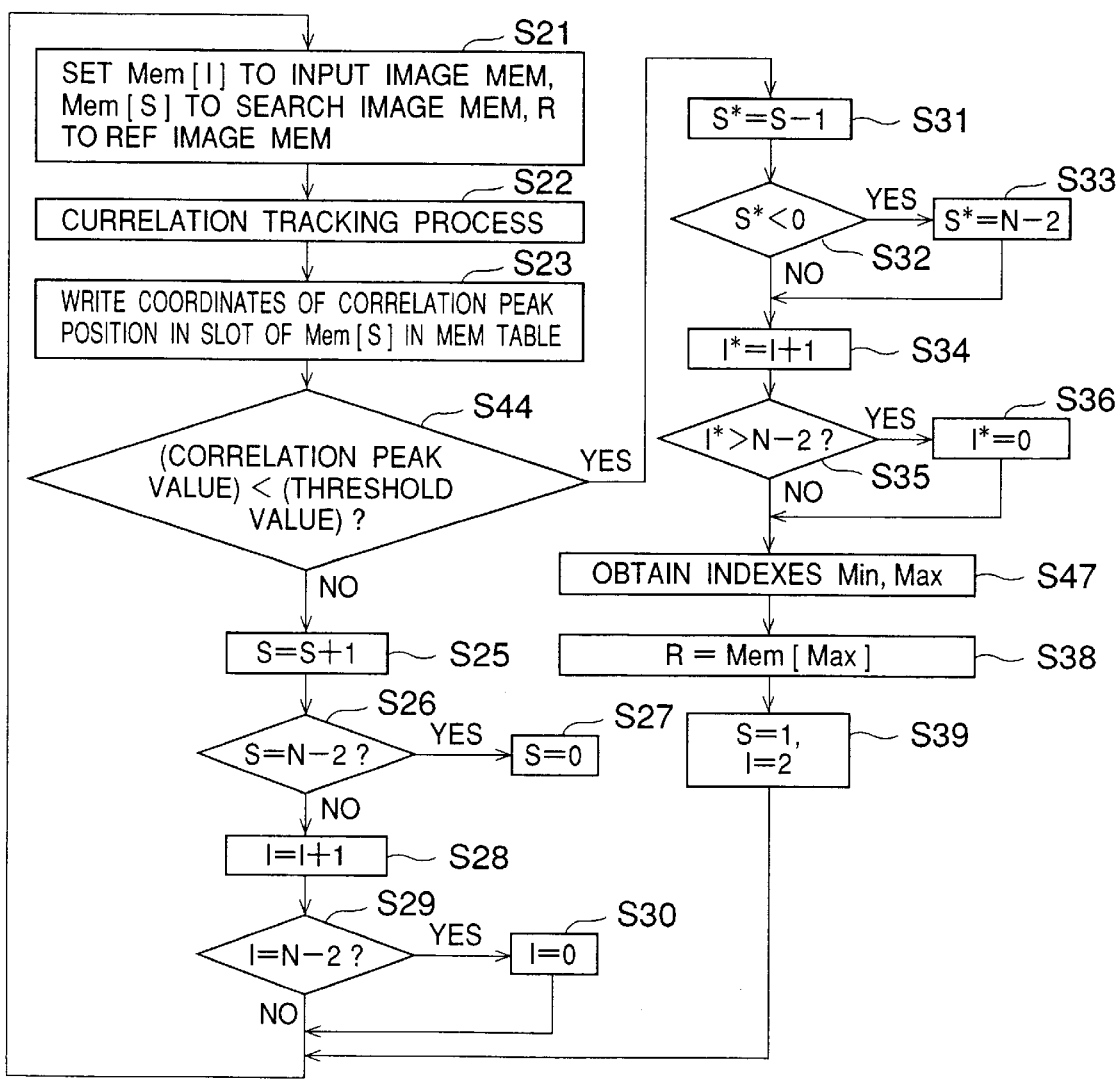
FIG. 51 is a flow chart for explaining the operation of the central processing unit when the image memory manager is formed by the central processing unit.

In FIG. 51, a step S44 decides whether or not the peak value of the correlation value is less than a threshold value. If the decision result in the step S44 is NO, the process advances to the step S25. On the other hand, the process advances to the step S31 if the decision result in the step S44 is YES. A step S47 sets the index of the first image memory excluding the image memory having no input to Min out of the image memories having the memory number Mem[I*] if I*=S*, the memory numbers Men[I*] through Mem[S*] if I*<S*, and the memory numbers Mem[I*] through Mem[N−2] and Mem[0] through Mem[S*] otherwise.

Figure 52:
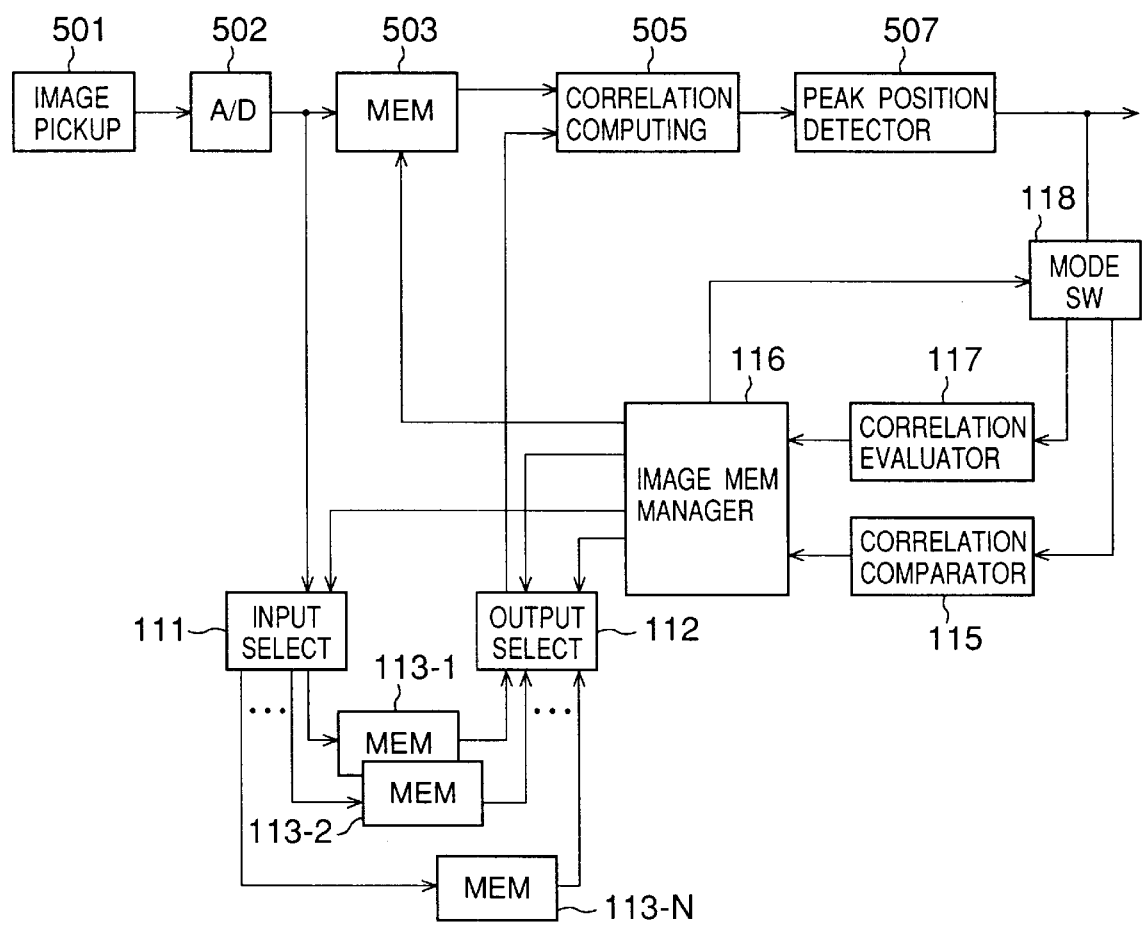
FIG. 52 is a system block diagram showing the construction of a fourteenth embodiment of the local region image tracking apparatus according to the present invention.

Next, a description will be given of a fourteenth embodiment of the local region image tracking apparatus according to the present invention, by referring to FIGS. 52 and 53. FIG. 52 is a system block diagram showing the construction of the fourteenth embodiment of the local region image tracking apparatus. In FIG. 52, those parts which are the same as those corresponding parts in FIGS. 45 and 50 are designated by the same reference numerals, and a description thereof will be omitted.

In this embodiment, a mode switch 118 is provided in addition to the correlation comparator 115 and the correlation evaluator 117, as shown in FIG. 52. The operations of the correlation comparator 115 and the correlation evaluator 117 are similar to those of the twelfth and thirteenth embodiments described above. The mode switch 118 switches the mode, so that it is possible to selectively carry out the operation of the twelfth embodiment or the operation of the thirteenth embodiment.

The tracking process is carried out by making the correlation computation between the image data stored in the reference image memory and the search image memory, and in this process, the correlation evaluator 117 compares the peak value of the correlation value and the predetermined threshold value.

If the peak value of the correlation value is greater than the threshold value as a result of this comparison, the pair formed by the memory number of the present input image memory and the peak position of the correlation value is recorded. If an unused image memory exists, this unused image memory is used as the next input image memory. On the other hand, if no unused image memory exists, the image memory having the oldest input is used as the next input image memory.

If the peak value of the correlation value is less than or equal to the threshold value, the reference image memory is updated in the following manner. That is, if the peak value of the correlation value is less than or equal to the threshold value, the correlation comparator 115 compares the peak positions in each of the correlation value distributions obtained from the correlation value peak position detector 507, and determines the image memory (reference image memory) which stores the reference image having the maximum correlation value and the image memory (reference image memory) which stores the reference image having the minimum correlation value. The determined reference image memories are notified from the correlation comparator 115 to the image memory manager 116.

The determination and notification of the image memories (reference image memories) made by the correlation comparator 115 are carried out within the time of 1 frame when carrying out N−1 tracking processes by sequentially using those image memories not used as the input image memory as the reference image memories. Hence, the image memory manager 116 stores the pair formed by the peak position with respect to the maximum correlation value and the identification number of the image memory that is presently used as the input image memory, and uses the image memory which stores the reference image having the maximum correlation value as the reference image memory. In addition, if an unused image memory exists, this unused image memory is used as the input image memory for the next frame. On the other hand, if no unused image memory exists, the image memory which stores the reference image having the minimum correlation value is used as the input image memory for the next frame. The selection of the image memory that is to be used as the input image memory for the next frame is made by supplying the switching signals to the input selector 111 and the output selector 112 from the image memory manager 116.

Of course, the correlation comparator 115, the correlation evaluator 117 and the mode switch 118 may be a part of the image memory manager 116.

Next, a description will be given of the operation of this embodiment, by referring to FIG. 53. FIG. 53 is a flow chart showing the operation of the CPU for a case where the image memory manager 116 is formed by the CPU. In FIG. 53, those steps which are the same as those corresponding steps in FIGS. 46 and 51 are designated by the same reference numerals, and a description thereof will be omitted.

Figure 53:
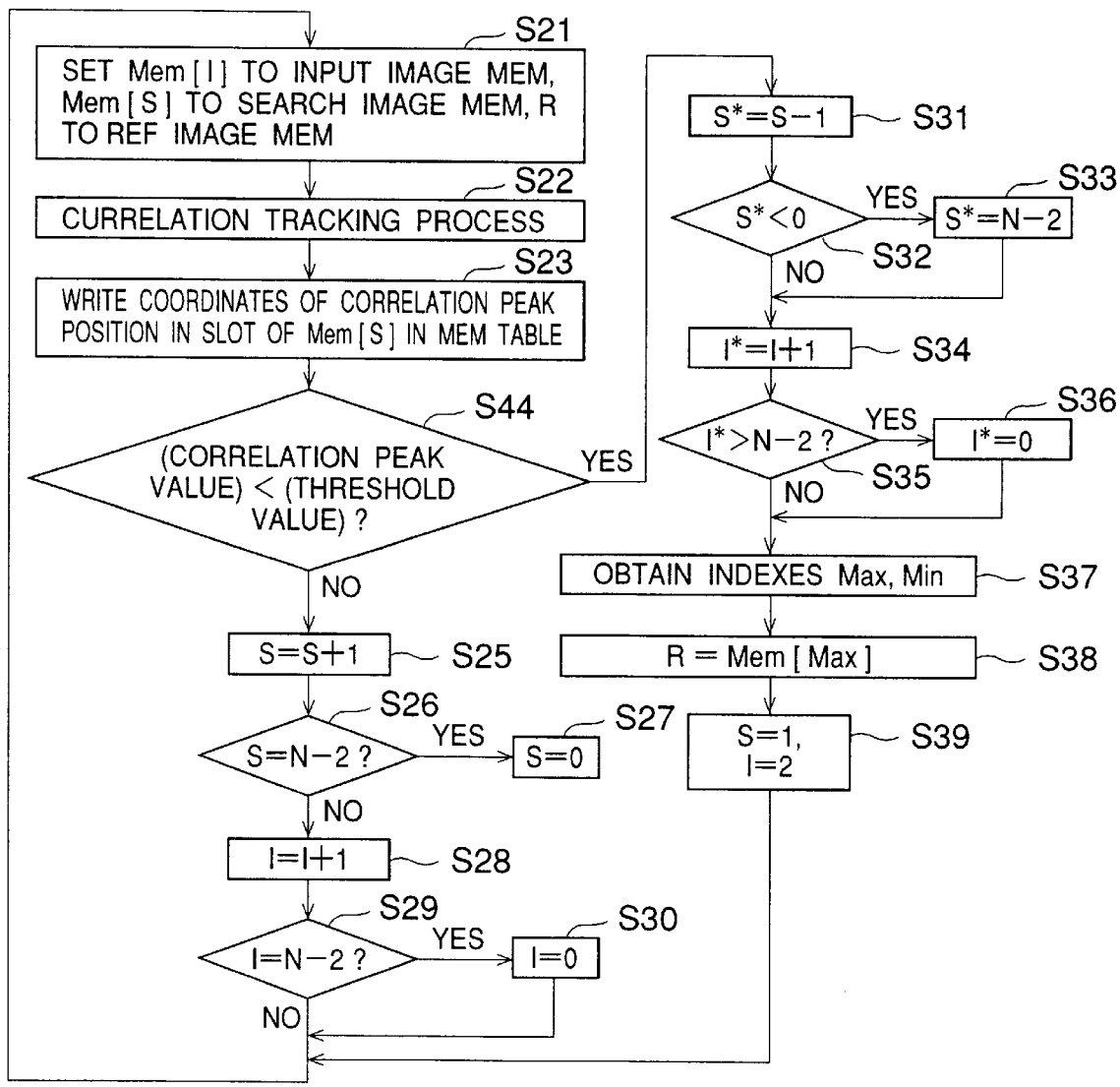
FIG. 53 is a flow chart for explaining the operation of the central processing unit when the image memory manager is formed by the central processing unit.

In FIG. 53, the step S44 is the same as the step S44 shown in FIG. 51, and the steps S37 and S38 are the same as the steps S37 and S38 shown in FIG. 46.

Of course, the twelfth through fourteenth embodiments may be applied to the basic construction shown in FIG. 2 or FIG. 24.

When applying the above described embodiments of the local region image tracking apparatus to automatic security systems or alarm systems which automatically track and pick up the image of an intruder or, to automatic image pickup systems which automatically track and pickup the image of a baseball or golf ball by a television camera, the reference image data is not known beforehand, and the reference image data must be set every time the tracking operation is to be carried out. Hence, a description will now be given of an embodiment which can automatically detect and set the reference image data.

FIG. 54 is a system block diagram showing the construction of a fifteenth embodiment of the local region image tracking apparatus according to the present invention. In FIG. 54, those parts which are the same as those corresponding parts in FIG. 45 are designated by the same reference numerals, and a description thereof will be omitted.

In FIG. 54, the local region image tracking apparatus includes the image pickup device (television camera) 501, the A/D converter 502, a video recorder 201, an input image memory 202, a motion detector 203, a background image memory 204, an alarm unit 205, an input switch 206, the search image memory 503, the reference image memory 207, the correlation computing unit 505, an address generator 506A, the correlation value peak position detector 507, a camera base controller 208, and a camera base 209 which are connected as shown. The camera base 209 includes a motor and the like for moving the camera 501.

Figure 55C:
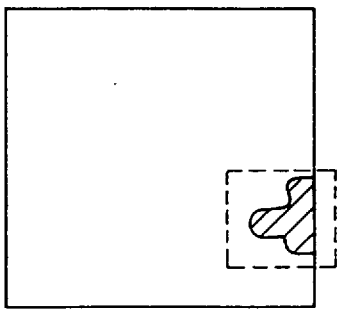
FIGS. 55A, 55B, 55C and 55D respectively are diagrams for explaining the operation of the fifteenth embodiment.
Figure 55B:
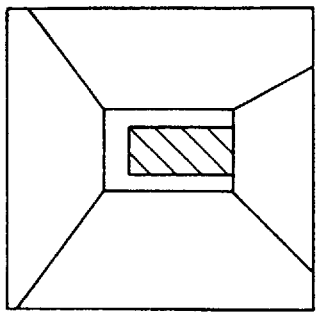
Figure 55A:
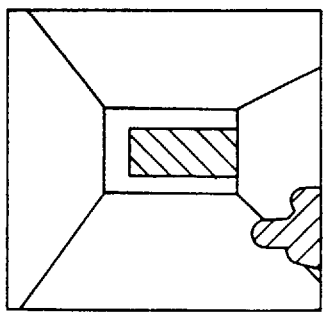

For example, the camera 501 picks up an input image shown in FIG. 55A, and corresponding input image data are supplied to the A/D converter 502. The A/D converter 502 supplies corresponding digital input image data to the input image memory 503, and the digital input image data are stored in the input image memory 503. The digital input image data are also supplied to and stored in the reference image memory 207 via the input switch 206. On the other hand, background image data related to a background image shown in FIG. 55B, for example, are prestored in the background image memory 204. Hence, the motion detector 203 obtains difference image data related to a difference image shown in FIG. 55C by subtracting the background image data read from the background image memory 204 from the input image data read from the input image memory 202.

In this embodiment and each of the embodiments which follow, it will be assumed for the sake of convenience that the local region image tracking apparatus is applied to an alarm system. Thus, the background image data related to the background image shown in FIG. 55B relate to a room which is being monitored and are fixed. The motion detector 203 judges that an intruding object exists within the room if the difference image data is greater than or equal to a predetermined value, and supplies a detection signal to the alarm unit, 205 and the input switch 206 if the intruding object is detected. As a result, the alarm unit 205 generates an alarm in response to the detection signal from the motion detector 203.

The input image data from the camera 501 are also supplied to the video recorder 201 and recorded on a recording medium. This video recorder 201 is also connected to the alarm unit 205. Hence, it is possible to specify the input image data at the time when the alarm is generated from the alarm unit 205 from the recorded input image data on the recording medium. Alternatively, the video recorder 201 may record the input image data from the time when the alarm unit 205 generates the alarm in the latter case, it is possible to reduce the storage capacity of the recording medium that is used in the video recorder 201.

The input switch 206 is switched in response to the detection signal from the motion detector 203 so as to supply the input image data from the A/D converter 502 to the search image memory 503. Hence, the input image data received after the difference image data becomes greater than or equal to the predetermined value are stored in the search image memory 503.

Figure 55D:
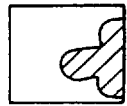

The motion detector 203 obtains the position of the reference image for use in the tracking process based on the difference image data, and sets this position to the address generator 506A. As a result, the search image data related to the image shown in FIG. 55A and the reference image data related to the image shown in FIG. 55D are obtained from the search image memory 503 and the reference image memory 207 and supplied to the correlation computing unit 505. The correlation computing unit 505 obtains the correlation values using the method described above, and the correlation value peak position detector 507 obtains the peak positions of the correlation values using the method described above. Accordingly, the correlation value peak position detector 507 obtains as a result the moving quantity of the intruding object, and this moving quantity is supplied to the address generator 506A and added to the search image address. In addition, the correlation value peak position detector 507 supplies the moving quantity of the intruding object to the camera base controller 208. The camera base controller 208 controls the image pickup position of the camera 501 by moving the camera base 209 so that the intruding object is located at the central portion of the picked up image, that is, the screen.

Once the reference image data are stored in the reference image memory 207, the local region image tracking process itself may of course employ the method employed in any of the embodiments described above.

Figure 56:
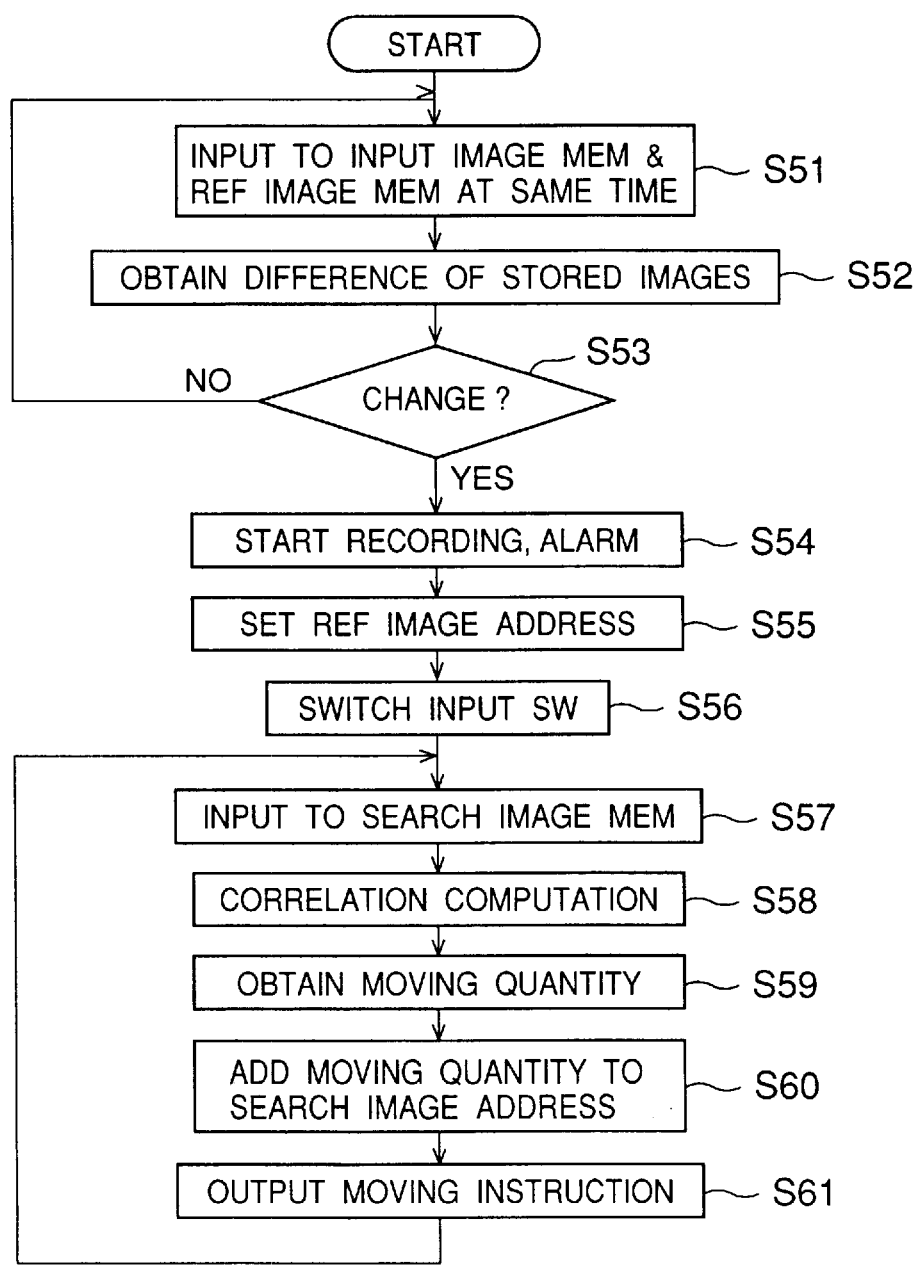
FIG. 56 is a flow chart for explaining the operation of the fifteenth embodiment.

FIG. 56 is a flow chart for explaining the operation of the fifteenth embodiment. In FIG. 56, a step S51 simultaneously inputs and stores the input image data into the input image memory 202 and the reference image memory 207. A step S52 obtains the difference image data between the input image data stored in the input image memory 202 and the background image data stored in the background image memory 204. A step S53 decides whether or not a change exists in the input image data as compared to the background image data. More particularly, the step S53 decides that the change exists if the difference image data is greater than or equal to the predetermined value, so that the apparatus will not become too sensitive and react to noise or the like. If the decision result in the step S53 is NO, the process returns to the step S51. On the other hand, if the decision result in the step S53 is YES, a step S54 starts recording the input image data by the video recorder 201, and generates the alarm by the alarm unit 205. A step S55 sets the position of the reference image (template image) for use in the tracking process in the address generator 506A as the search image address and the reference image address by the motion detector 203.

A step S56 switches the input switch 206 by the motion detector 203 so that the input image data are supplied to the search image memory 503. As a result, a step S57 stores the input image data into the search image memory 503. A step S58 reads the search image data and the reference image data from the respective search image memory 503 and the reference image memory 207 based on the address generated from the address generator 506A, and supply the search image data and the reference image data to the correlation computing unit 505 so as to obtain the correlation value. A step S59 obtains the moving quantity of the intruding object by the correlation value peak position detector 507 based on the correlation value obtained in the correlation computing unit 505. A step S60 supplies the obtained moving quantity to the address generator 506A and adds the moving quantity to the search image address. In addition, a step S61 supplies to the camera base 209 a moving instruction for moving the camera base 209 so that the intruding object is located at the central portion of the image that is picked up by the camera 501 depending on the moving quantity, and the process thereafter returns to the step S57.

Figure 57:
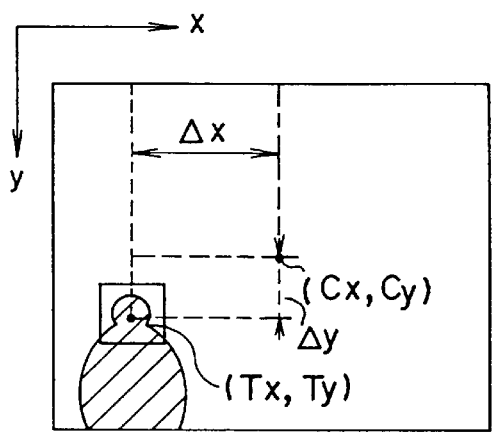
FIG. 57 is a diagram for explaining the control of a camera base.

FIG. 57 is a diagram for explaining the control of the camera base 209. FIG. 57 shows the input image picked up by the camera 501, and center coordinates of the screen are denoted by (Cx, Cy) and center coordinates of the intruding object are denoted by (Tx, Ty). In this case, the center coordinates (Tx, Ty) of the intruding object are separated by a distance $\Delta x$ from the center coordinates (Cx, Cy) of the screen along the x-axis, and separated by a distance $\Delta y$ from the center coordinates (Cx, Cy) of the screen along the y-axis. Hence, in this case, the camera base controller 208 controls the movement of the camera base 209 so that the center coordinates (Tx, Ty) of the intruding object approximately match the center coordinates (Cx, Cy) of the screen and the tracking of the intruding object is facilitated. More particularly, the moving instruction supplied to the camera base 209 is made up of an instruction $\Delta pan = Kp \cdot \Delta x$ which indicates the moving quantity along the x-axis and $\Delta tilt = Kt \cdot \Delta y$ which indicates the moving quantity along the y-axis, where Kp and Kt respectively are constants that are set depending on the motor and the like used in the camera base 209. The moving instruction is supplied from the camera base controller 208 to the camera base 209 at predetermined time intervals such as 1/30 second.

Therefore, according to this embodiment, it is possible to automatically detect and set the reference image data.

Figure 58:
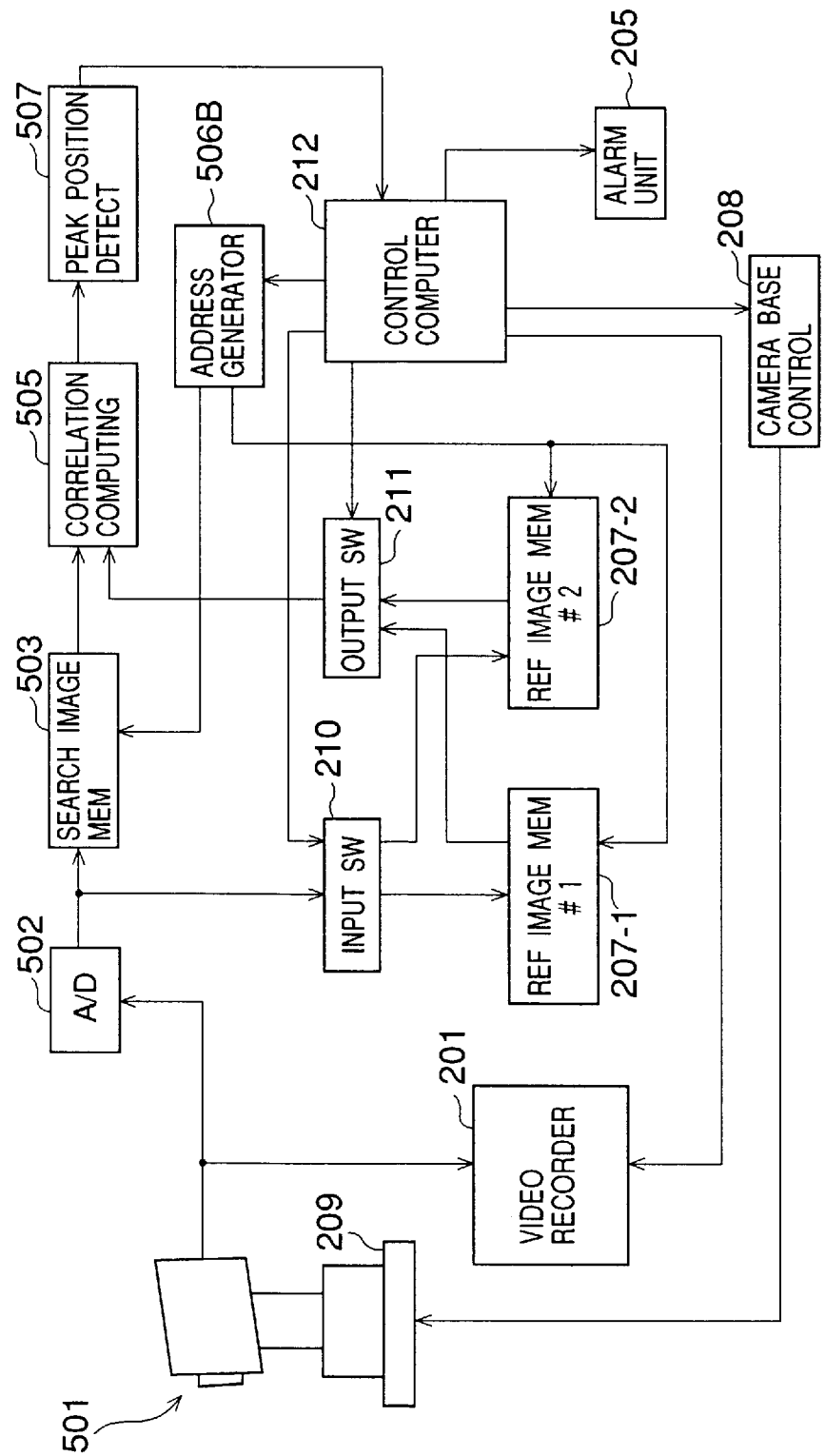
FIG. 58 is a system block diagram showing the construction of a sixteenth embodiment of the local region image tracking apparatus according to the present invention.

FIG. 58 is a system block diagram showing the construction of a sixteenth embodiment of the local region image tracking apparatus according to the present invention. In FIG. 58, those parts which are the same as those corresponding parts in FIG. 54 are designated by the same reference numerals, and a description thereof will be omitted. In this embodiment, the motion in the input image is also obtained by the correlation computing unit.

In FIG. 58, the local region image tracking apparatus includes the camera 501, the A/D converter 502, the video recorder 201, the alarm unit 205, the search image memory 503, reference image memories 207-1 and 207-2, the correlation computing unit 505, an address generator 506B, the correlation value peak position detector 507, an input switch 210, an output switch 211, a control computer 212, the camera base controller 208, and the camera base 209 which are connected as shown.

Figure 59:
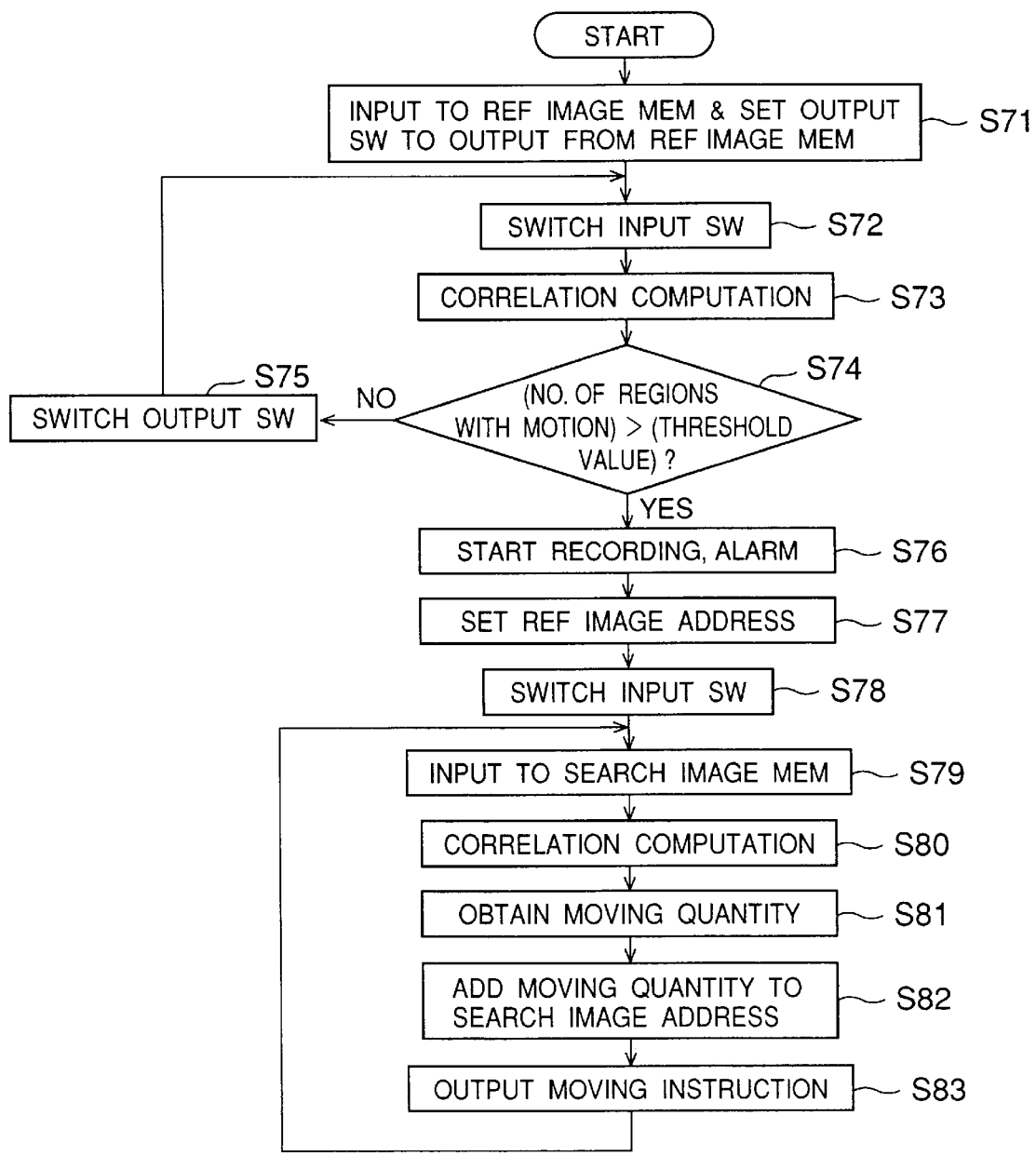
FIG. 59 is a flow chart for explaining the operation of the sixteenth embodiment.

FIG. 59 is a flow chart for explaining the operation of the sixteenth embodiment. A description will now be given of the operation of this embodiment, by referring to FIG. 59.

In this embodiment, the input image data output from the camera 501 are supplied to the search image memory 503 and the input switch 210 via the A/D converter 502, and are also supplied to the video recorder 201. In FIG. 59, a step S71 switches and controls the input switch 210 and the output switch 211 from the control computer 212 so that the input switch 210 supplies the input image data to the reference image memory 207-1 and the output switch 211 outputs the input image data read from this reference image memory 207-1. A step S72 switches the input switch 210 from the control computer 212, so that the input image data are input to the other reference image memory 207-2. In other words, the control computer 212 controls the access to the reference image memories 207-1 and 207-2 so that a read is made from one of the reference image memories 207-1 and 207-2 while making a write to the other, and a write is made to one of the reference image memories 207-1 and 207-2 while making a read from the other.

Figure 60:
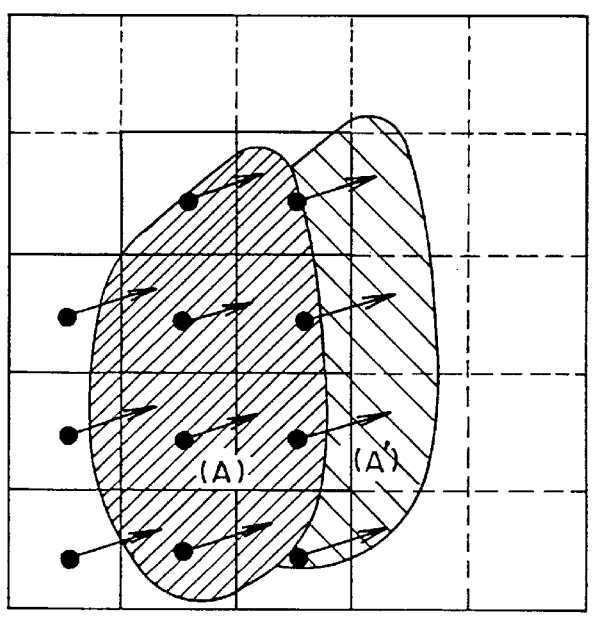
FIG. 60 is a diagram for explaining the operation of the sixteenth embodiment.

A step S73 controls the address generator 506B from the control computer 212 so that the search image data and the reference image data are respectively read from the search image memory 503 and the reference image memory 207-1 based on the address generated from the address generator 506B. The read image data correspond to the input image data at predetermined time intervals, and since the read image data are supplied to the correlation computing unit 505 in a state divided into a plurality of small regions within the screen as shown in FIG. 60, the correlation computing unit 505 carries out the above described correlation computation for each of the small regions. In FIG. 60, 1 screen is divided into 25 square small regions, however, the number and shape of the small regions are of course not limited to those shown in FIG. 60. FIG. 60 shows a case where the intruding object moves from a position A to a position A'. The correlation computing unit 505 obtains the correlation values of each of the small regions between the search image data and the reference image data, and the output of the correlation computing unit 505 is supplied to the control computer 212 via the correlation value peak position detector 507. Hence, the control computer 212 can detect the motion within the input image based on the change in the correlation values for each of the small regions.

A step S74 decides whether or not the number of the small regions in which the motion is detected by the control computer 212 is greater than a threshold value. If the decision result in the step S74 is NO, a step S75 switches and controls the output switch 211 so that the output switch 211 outputs the reference image data read from the reference image memory 207-2, and the process thereafter returns to the step S72. On the other hand, if the decision result in the step S74 is YES, a step S76 controls the video recorder 201 and the alarm unit 205 from the control computer 212 so that the video recorder 201 records the input image data and the alarm unit 205 generates the alarm.

A step S77 sets the position of the reference image (template image) for use in the tracking process as the search image address and the reference image address in the address generator 506B from the control computer 212. A step S78 switches the input switch from the control computer 212 so that the input switch 210 supplies the input image data to one of the reference image memories 207-1 and 207-2 which is not storing the reference image memory, that is, to the reference image memory 207-1, for example. In addition, a step S79 stores the input image data in the search image memory 503. A step S80 reads the search image data and the reference image data from the respective search image memory 503 and the reference image memory 207-1 based on the address generated from the address generator 506B, and supplies the search image data and the reference image data to the correlation computing unit 505 so as, to obtain the correlation value. A step S81 obtains the moving quantity of the intruding object in the correlation value peak position detector 507 based on the correlation value obtained in the correlation computing unit 505. A step S82 supplies the obtained moving quantity to the address generator 506B and adds the moving quantity to the search image address. In addition, a step S83 supplies to the camera base 209 the moving instruction for moving the camera base 209 depending on the moving quantity so that the intruding object is located at the central portion of the image that is picked up by the camera 501, and the process thereafter returns to the step S79.

In this embodiment, it is unnecessary to provide a motion detector or the like exclusively for detecting the motion within the input image. For this reason, it is possible to automatically detect and set the reference image data using a relatively simple construction.

Figure 61:
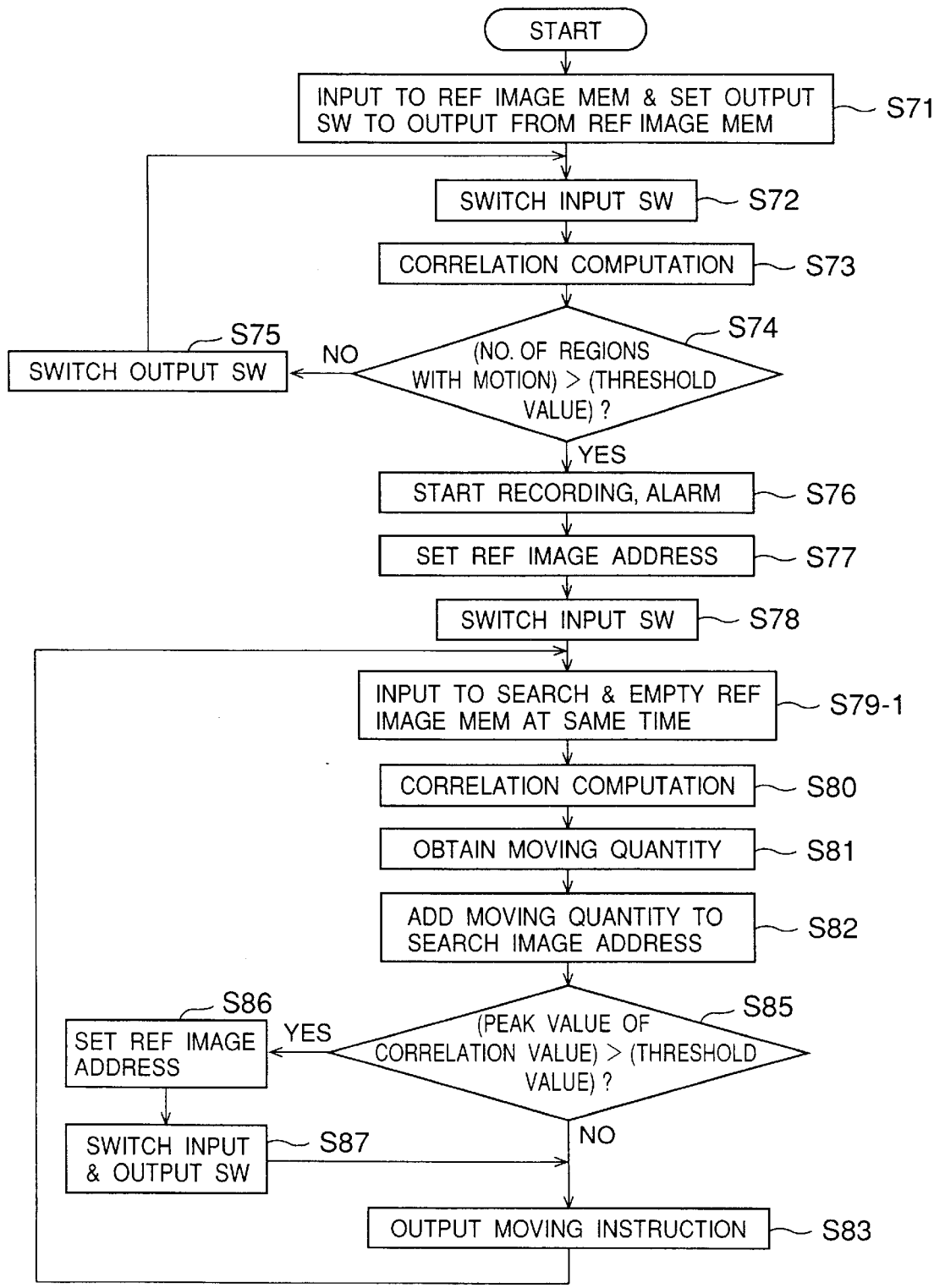
FIG. 61 is a flow chart for explaining the operation of a seventeenth embodiment of the local region image tracking apparatus according to the present invention.

FIG. 61 is a flow chart for explaining the operation of a seventeenth embodiment of the local region image tracking apparatus according to the present invention. In this embodiment, the construction of the local region image tracking apparatus is the same as that shown in FIG. 58, and an illustration and description thereof will be omitted. In FIG. 61, those parts which are the same as those corresponding steps in FIG. 59 are designated by the same reference numerals, and a description thereof will be omitted. In this embodiment, the reference image is updated to the input image when the peak value of the correlation value becomes less than or equal to a threshold value.

In FIG. 61, a step S79-1 stores the input image data into the search image memory 503 shown in FIG. 58, and at the same time, stores the input image data into the unused one of the reference image memories 207-1 and 207-2, that is, the reference image memory 207-2, for example. The step S80 reads she search image data and the reference image data from the respective search image memory 503 and the reference image memory 207-1 based on the address generated from the address generator 506B, and supplies the search image data and the reference image data to the correlation computing unit 505 so as to obtain the correlation value. The step S81 obtains the moving quantity of the intruding object in the correlation value peak position detector 507 based on the correlation value obtained in the correlation computing unit 505. The step S82 supplies the obtained moving quantity to the address generator 506B and adds the moving quantity to the search image address. A step S85 decides whether or not the peak value of the correlation value obtained in the correlation value peak position detector 507 is greater than a threshold value, and the process advances to the step S83 if the decision result in the step S85 is NO. The step S83 supplies to the camera base 209 the moving instruction for moving the camera base 209 depending on the moving quantity so that the intruding object is located at the central portion of the image that is picked up by the camera 501, and the process thereafter returns to the step S79-1.

On the other hand, if the decision result in the step S85 is YES, a step S86 sets the search image address into the address generator 506B as the reference image address from the control computer 212. In addition, a step S87 switches and controls the input switch 210 and the output switch 211 from the control computer 212, and the process advances to the step S83.

Therefore, the reference image data that are used for the local region image tracking process are updated to the input image data stored in the search image memory 503. For this reason, it is possible to carry out a stable tracking even if the appearance of the intruding object changes during the tracking, that is, the view of the intruding object changes on the screen due to the change in the angle at which the two-dimensional image is picked up.

Figure 62:
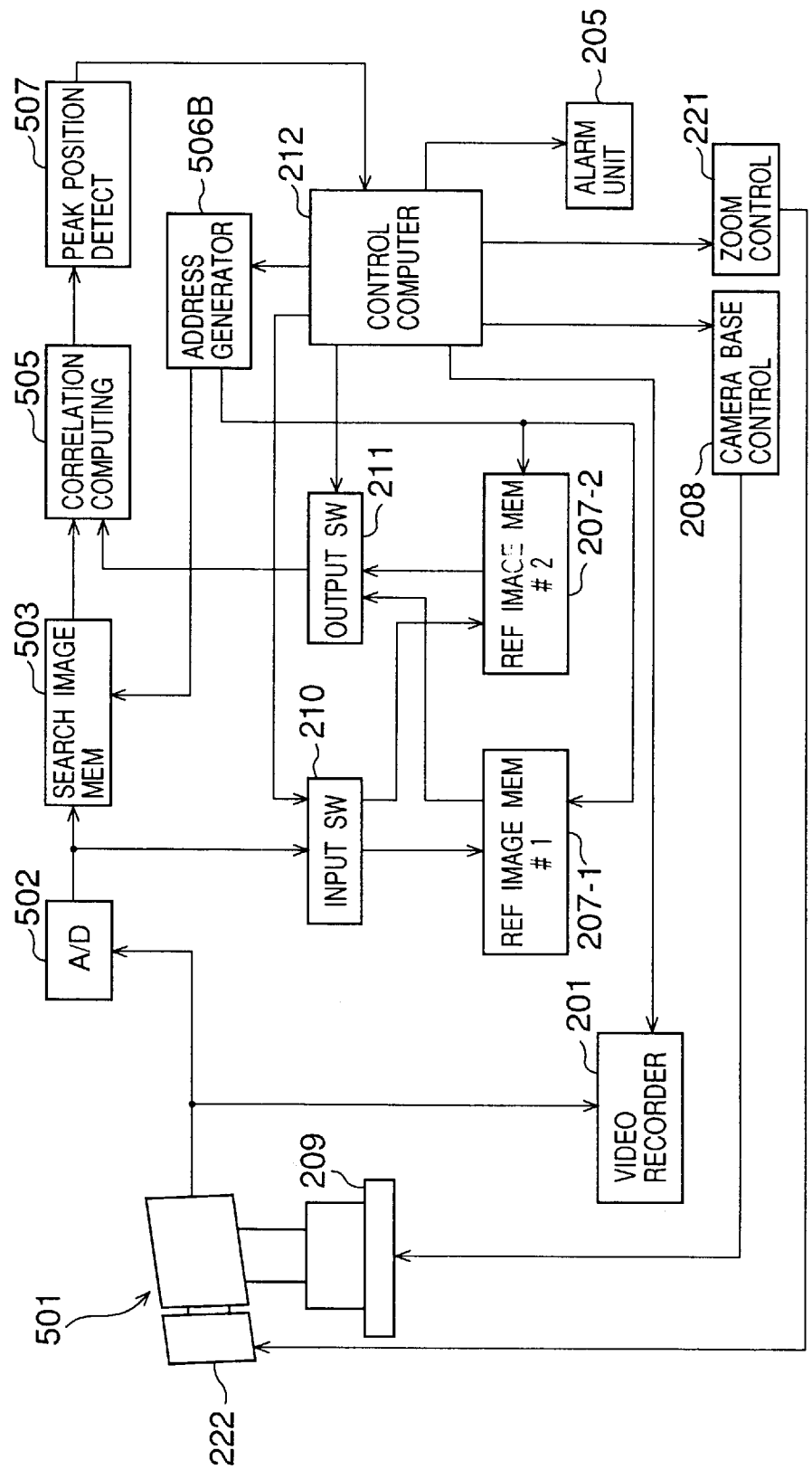
FIG. 62 is a system block diagram showing the construction of an eighteenth embodiment of the local region image tracking apparatus according to the present invention.

FIG. 62 is a system block diagram showing the construction of an eighteenth embodiment of the local region image tracking apparatus according to the present invention. In FIG. 62, those parts which are the same as those corresponding parts in FIG. 58 are designated by the same reference numerals, and a description thereof will be omitted. In this embodiment, a closeup image of the intruding object is recorded using a zoom mechanism.

In this embodiment, a zoom mechanism 222 is provided on the camera 501 as shown in FIG. 62. The control computer 212 makes the zoom setting with respect to the zoom mechanism 222 via a zoom controller 221. Parts of the local region image tracking apparatus excluding the zoom controller 221 and the zoom mechanism 222 are identical to those of the local region image tracking apparatus shown in FIG. 58.

Figure 63:
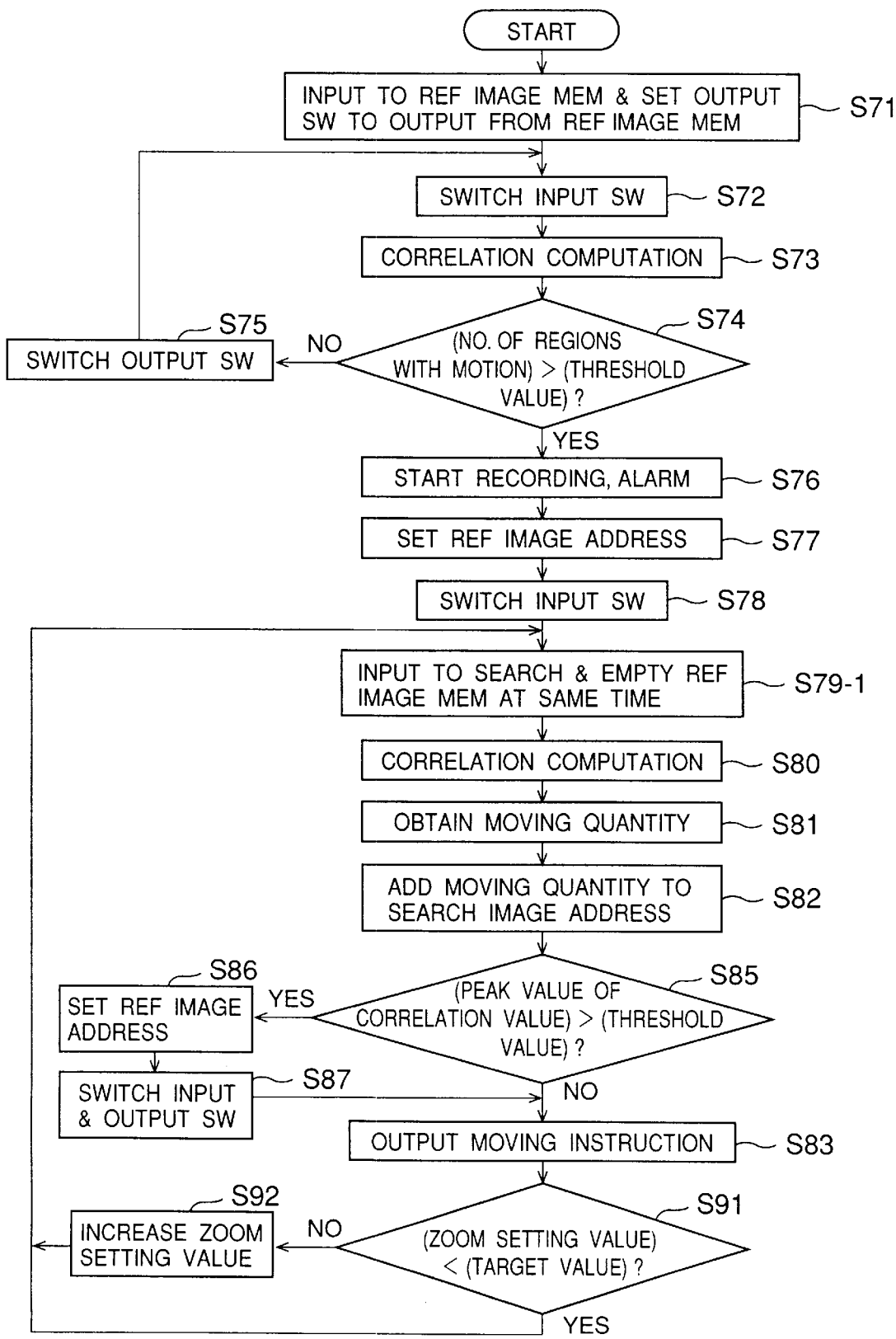
FIG. 63 is a flow chart for explaining the operation of the eighteenth embodiment.

FIG. 63 is a flow chart for explaining the operation of the eighteenth embodiment. In FIG. 63, those steps which are the same as those corresponding steps in FIG. 61 are designated by the same reference numerals, and a description thereof will be omitted.

In FIG. 63, the process from the step 571 up to the step S87 is the same as that shown in FIG. 61. However, in this embodiment, a step S91 is carried out after the step S83. The step S91 decides by the control computer 212 whether or not a zoom setting value of the zoom mechanism 222 is smaller than a preset target value, and the process returns to the step S79-1 if the decision result in the step S91 is YES. On the other hand, if the decision result in the step S91 is NO, a step S92 controls the zoom controller 221 by the control computer 212 so as to increase the zoom setting value. After the step S92, the process returns to the step S79-1.

Therefore, according to this embodiment, it is possible to record the closeup image of the intruding object on the video recorder 201 by zooming up to the intruding object while stably tracking the intruding object, by gradually making the zoom setting value closer to the target value while updating the reference image data similarly to the seventeenth embodiment. For this reason, when this embodiment is applied to the alarm system, it is possible to record the closeup image of the face of the intruder (intruding object), thereby improving the performance of the alarm system.

Figure 64:
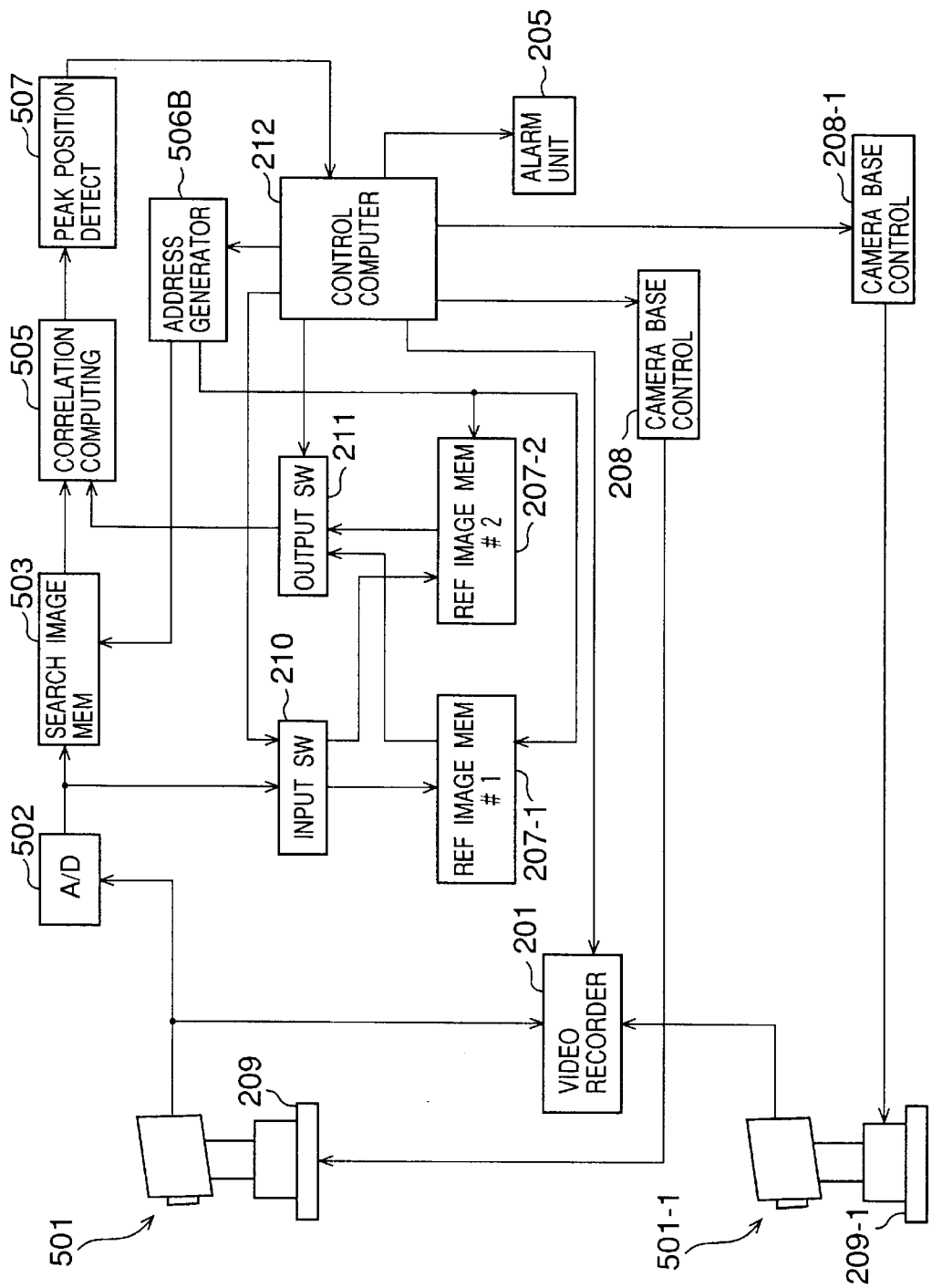
FIG. 64 is a system block diagram showing the construction of a nineteenth embodiment of the local region image tracking apparatus according to the present invention.

FIG. 64 is a system block diagram showing the construction of a nineteenth embodiment of the local region image tracking apparatus according to the present invention. In FIG. 64, those parts which are the same as those corresponding parts in FIG. 58 are designated by the same reference numerals, and a description thereof will be omitted. In this embodiment, the closeup image of the intruding object is recorded by using the zoom mechanism of one of 2 cameras.

In this embodiment, an image pickup device (zoom camera) 501-1 having a zoom mechanism is provided in addition to the camera 501 as shown in FIG. 64. This zoom camera 501-1 is supported on a camera base 209-1. The control computer 212 carries out the zoom setting and the positional control of the zoom camera 501-1 via a camera base controller 208-1. Parts of the local region image tracking apparatus excluding the camera base controller 208-1, the camera base 209-1 and the zoom camera 501-1 are identical to those of the local region image tracking apparatus shown in FIG. 58.

Figure 65:
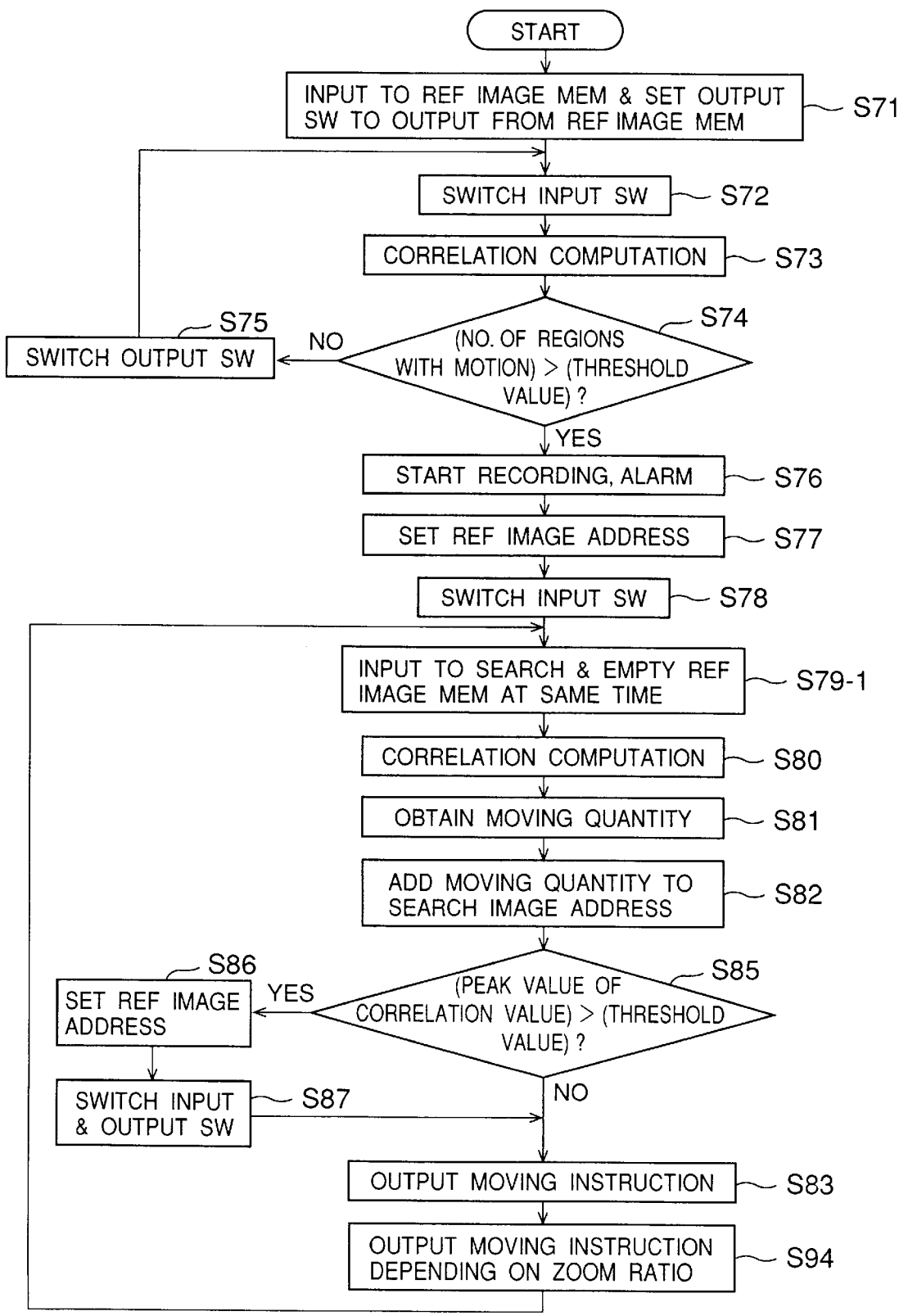
FIG. 65 is a flow chart for explaining the operation of the nineteenth embodiment.

FIG. 65 is a flow chart for explaining the operation of the nineteenth embodiment. In FIG. 65, those steps which are the same as those corresponding steps in FIG. 61 are designated by the same reference numerals, and a description thereof will be omitted.

In FIG. 65, process from the step S71 up to the step S87 is the same as that shown in FIG. 61. However, in this embodiment, a step S94 is carried out after the step S83. The step S94 controls the camera base controller 208-1 from the control computer 212 so that the camera base controller 208-1 outputs a moving instruction for controlling the camera base 209-1 of the zoom camera 501-1 depending on the zoom setting (zoom ratio). After the step S94, the process returns to the step S79-1.

Therefore, according to this embodiment, the position of the zoom camera 501-1 which zooms up on the intruding object can be controlled while making the tracking process with respect to the intruding object in the input image that is picked up on the camera 501 which is zoomed down. Hence, even if the moving speed of the intruding object is high, it is possible to stably track the intruding object without losing track. In addition, it is possible to record the closeup image of the intruding object by the video recorder 201. Consequently, when this embodiment is applied to the alarm system, it is possible to positively record the closeup image of the face of the intruder (intruding object), thereby further improving the performance of the alarm system.

Figure 66:
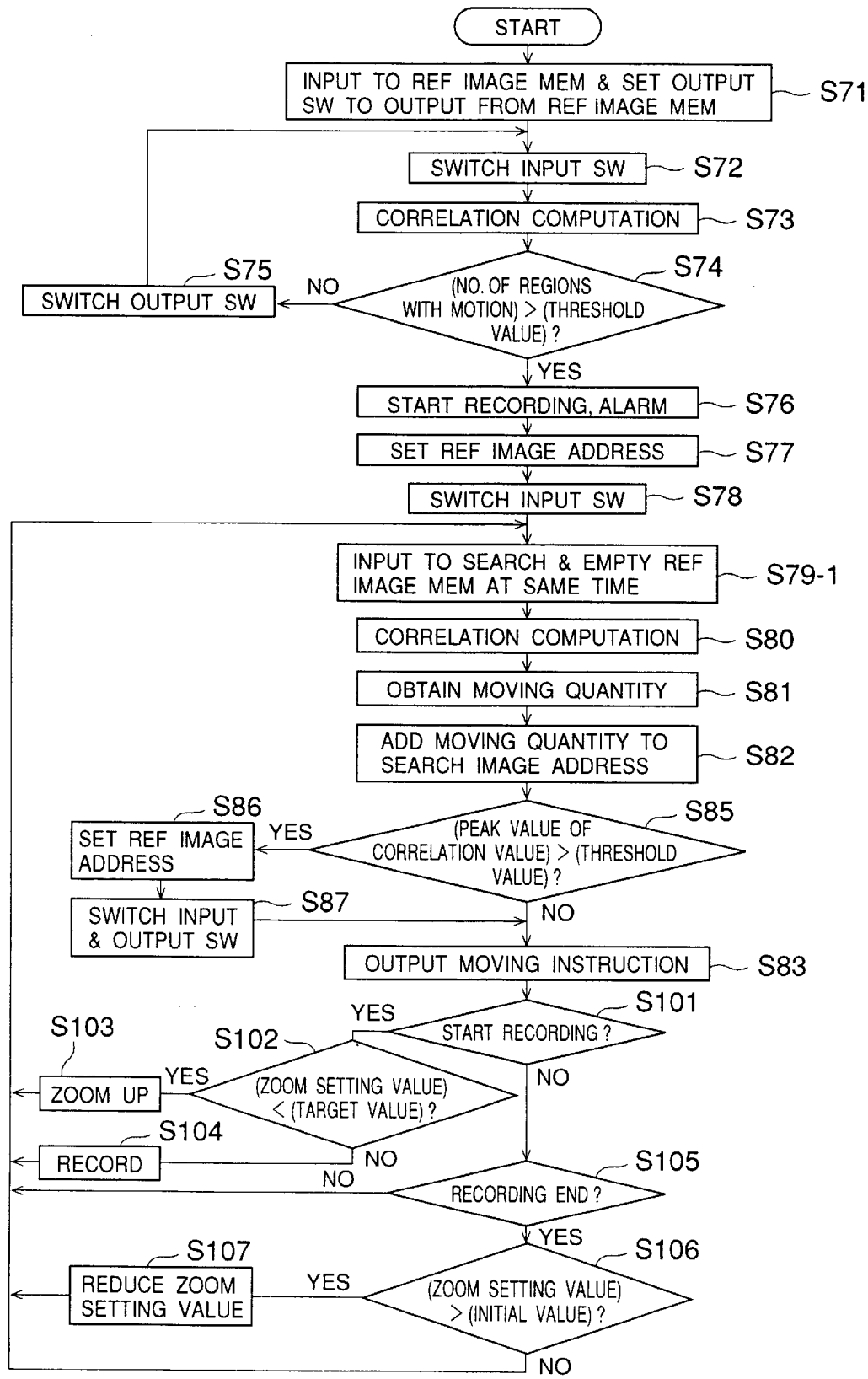
FIG. 66 is a flow chart for explaining the operation of a twentieth embodiment of the local region image tracking apparatus according to the present invention.

FIG. 66 is a flow chart for explaining the operation of a twentieth embodiment of the local region image tracking apparatus according to the present invention. In this embodiment, the construction of the local region image tracking apparatus is identical to that shown in FIG. 62, and an illustration and description thereof will be omitted. In FIG. 66, those steps which are the same as those corresponding steps in FIG. 63 are designated by the same reference numerals, and a description thereof will be omitted.

In FIG. 66, the process from the step S71 up to the step S87 is the same as that shown in FIG. 63. In this embodiment, the zoomed up image is obtained by restrictively controlling the zoom.

After the step S83 shown in FIG. 66, a step S101 decides by the control computer 212 whether or not the recording of the input image data has been started by the video recorder 201. If the decision result in the step S101 is YES, a step S102 decides in the control computer 212 whether or not the zoom setting value is smaller than a target value. If the decision result in the step S102 is YES, a step S103 controls the zoom controller 221 so as to zoom up, and the process returns to the step S79-1. On the other hand, if the decision result in the step S102 is NO, a step S104 starts recording the input image data by the video recorder 201, and the process returns to the step S79-1.

If the decision result in the step S101 is NO, a step S105 decides in the control computer 212 whether or not the recording of the input image data by the video recorder 201 has ended, and the process returns to the step S79-1 if the decision result in the step S105 is NO. If the decision result in the step S105 is YES, a step S106 decides in the control computer 212 whether or not the zoom setting value is greater than an initial value. If the decision result in the step S106 is YES, a step S107 controls the zoom controller 221 so as to reduce the zoom setting value, and the process returns to the step S79-1. On the other hand, the process returns to the step S79-1 if the decision result in the step S106 is NO.

The instructions related to the start and end of the recording of the input image data by the video recorder 201 are made at predetermined time intervals, for example. In this case, the input image data are recorded for predetermined times.

Next, a description will be given of a twenty-first embodiment of the local region image tracking apparatus according to the present invention, by referring to FIGS. 67 through 69. In this embodiment, the construction of the local region image tracking apparatus is identical to that shown in FIG. 58, and an illustration and description thereof will be omitted.

Figure 67A:
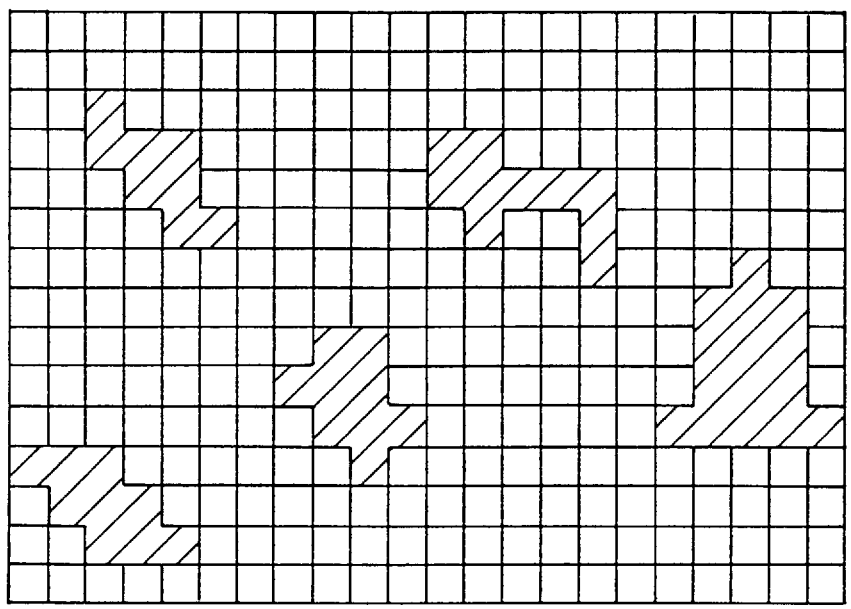
FIGS. 67A and 67B respectively are diagrams for explaining a labeling process when tracking a plurality of intruding objects.
Figure 67B:
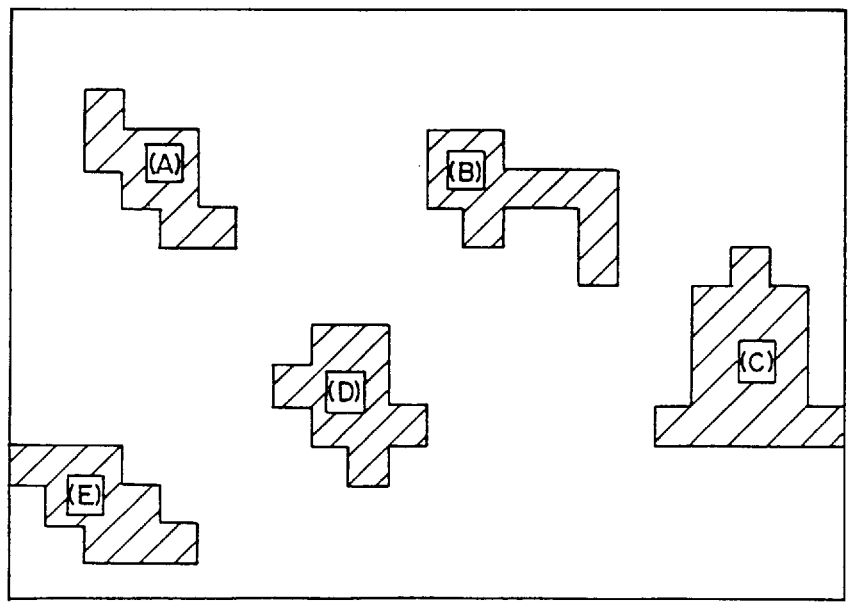
Figure 68:
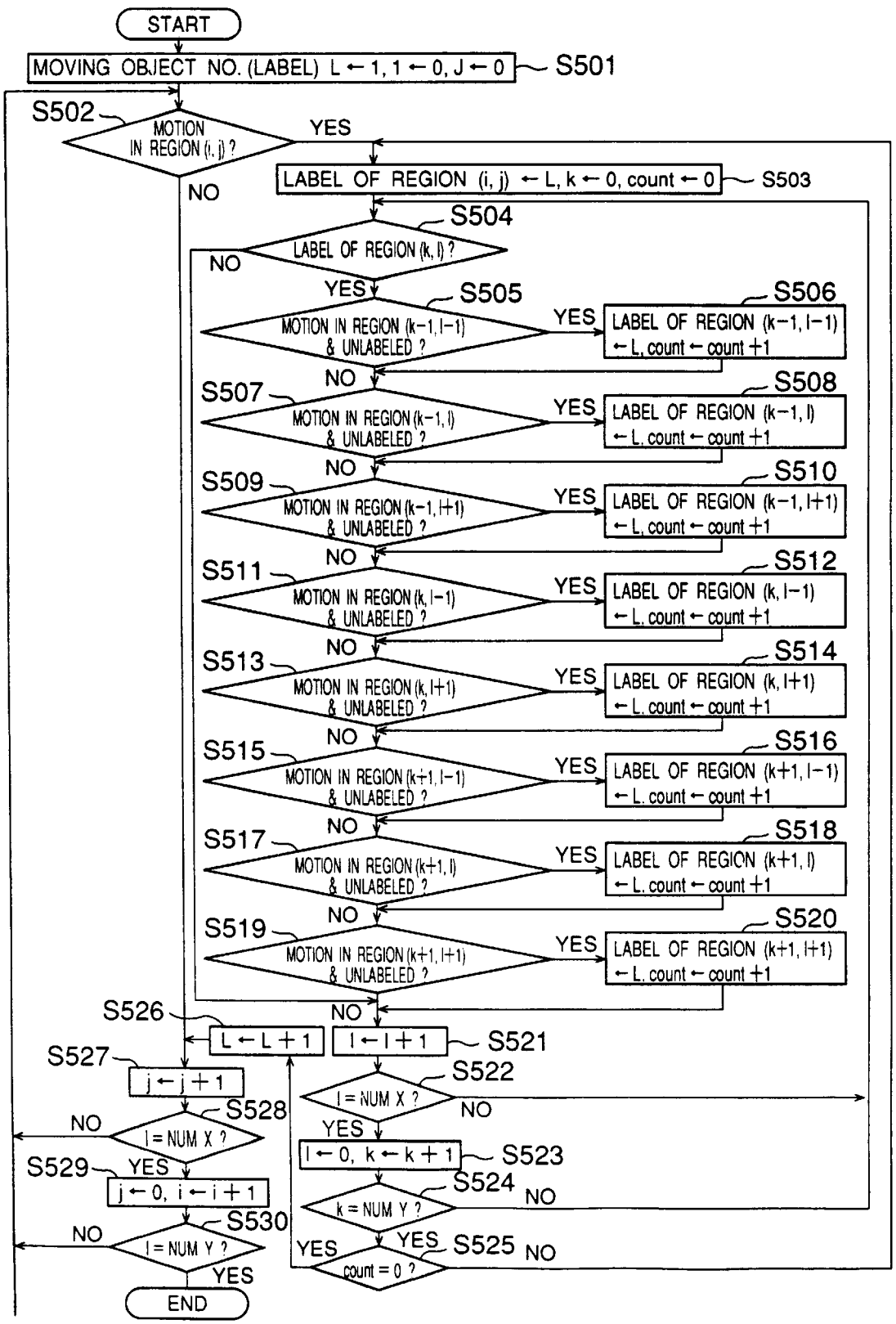
FIG. 68 is a flow chart for explaining the labeling process.

FIGS. 67A and 67B are diagrams for explaining a labeling process, and FIG. 68 is a flow chart for explaining the labeling process. In addition, FIG. 69 is a flow chart for explaining the operation of the twenty-first embodiment. In this embodiment, a plurality of intruding objects are detected and tracked.

First, a description will be given of the labeling process by referring to FIGS. 67A, 67B and 68. When a plurality of intruding objects exist, the labeling process is carried out with respect to each of the intruding objects so as to identify each of the intruding objects. In FIG. 67A, portions indicated by the hatching show portions where motion is generated in the input image, that is, the intruding objects. The labeling process is carried out by dividing the regions in which the motion is detected into independent regions, and separating each of the divided regions as independent intruding objects as shown in FIG. 67B. As a result, labels A through E, for example, are assigned to each of the intruding objects as shown in FIG. 67B.

The labeling process shown in FIG. 68 is carried out by the control computer 212 shown in FIG. 58, for example. In FIG. 68, a step S501 initially sets a moving object number (label) L that is assigned to the moving object to "1", and initially sets both i and j of a region (i, j) to "0". A step S502 decides whether or not a motion is generated in the region (i, j). This process of detecting the motion may employ the method employed in any of the embodiments described above. If the decision result in the step S502 is YES, a step S503 sets the label of the region (i, j) to L, k to "0", 1 to "0", and "count" to "0". A step S504 decides whether or not the label of a region (k, l) is L. If the decision result in the step S504 is YES, a step S505 decides whether or not a motion is generated in a region (k−1, l−1) and this region is unlabeled. If the decision result in the step S505 is YES, a step S506 sets the label of the region (k−1, l−1) to L, and increments "count" by "1". If the decision result in the step S504 is NO, the process advances to a step S521 which will be described later.

If the decision result in the step S505 is NO or after the step S506, a step S507 decides whether or not a motion is generated in a region (k−1, l) and this region is unlabeled. If the decision result in the step S507 is YES, a step S508 sets the label of the region (k−1, l) to L, and increments "count" by "1". If the decision result in the step S507 is NO or after the step S508, a step S509 decides whether or not a motion is generated in a region (k−1, l+1) and this region is unlabeled. If the decision result in the step S509 is YES, a step S510 sets the label of the region (k−1, l+1) to L, and increments "count" by If the decision result in the step S509 is NO or after the step S510, a step S511 decides, whether or not a motion is generated in a region (k, l−1) and this region is unlabeled. If the decision result in the step S511 is YES, a step S512 sets the label of the region (k, l−1) to L, and increments "count" by "1". If the decision result in the step S511 is, NO or after the step S512, a step S513 decides whether or not a motion is generated in a region (k, l+1) and this region is unlabeled. If the decision result in the step S513 is YES, a step S514 sets the label of the region (k, l+1) to L, and increments "count" by "1".

If the decision result in the step S513 is NO or after the step S514, a step S515 decides whether or not a motion is generated in a region (k+1, l−1) and this region is unlabeled. If the decision result in the step S515 is YES, a step S516 sets the label of the region (k+1, l−1) to L, and increments "count" by "1". If the decision result in the step S515 is NO or after the step S516, a step S517 decides whether or not a motion is generated in a region (k+1, 1) and this region is unlabeled. If the decision result in the step S517 is YES, a step S518 sets the label of the region (k+1, l) to L, and increments "count" by "1".

If the decision result in the step S517 is NO or after the step S518, a step S519 decides whether or not a motion is generated in a region (k+1, l+1) and this region is unlabeled. If the decision result in the step S519 is YES, a step S520 sets the label of the region (k+1, l+1) to L, and increments "count" by "1". If the decision result in the step S519 is NO or after the step S520, a step S521 increments 1 by "1", and a step S522 decides whether or not 1 is equal to NUM_X. If the decision result in the step S522 is NO, the process returns to the step S504. On the other hand, if the decision result in the step S522 is YES, a step S523 sets 1 to "0" and increments k by "1". In addition, a step S524 decides whether or not k is equal to NUM_Y, and the process returns to the step S504 if the decision result in the step S524 is NO. If the decision result in the step S524 is YES, a step S525 decides whether or not "count" is equal to "0", and a step S526 increments L by "1" if the decision result in the step S525 is YES. If the decision result in the step S525 is NO, the process returns to the step S503.

On the other hand, if the decision result in the step S502 is NO or after the step S526, a step S527 increments j by "1", and a step S528 decides whether or not j is equal to NUM_X. If the decision result in the step S528 is YES, a step S529 sets j to "0" and increments i by "1". A step S530 decides whether or not i is equal to NUM_Y, and the process ends if the decision result in the step S530 is YES. On the other hand, if the decision result in the step S528 or S530 is NO, the process returns to the :step S502.

In this manner, it is possible to automatically label each region of the input image in which the motion exists.

Figure 69:
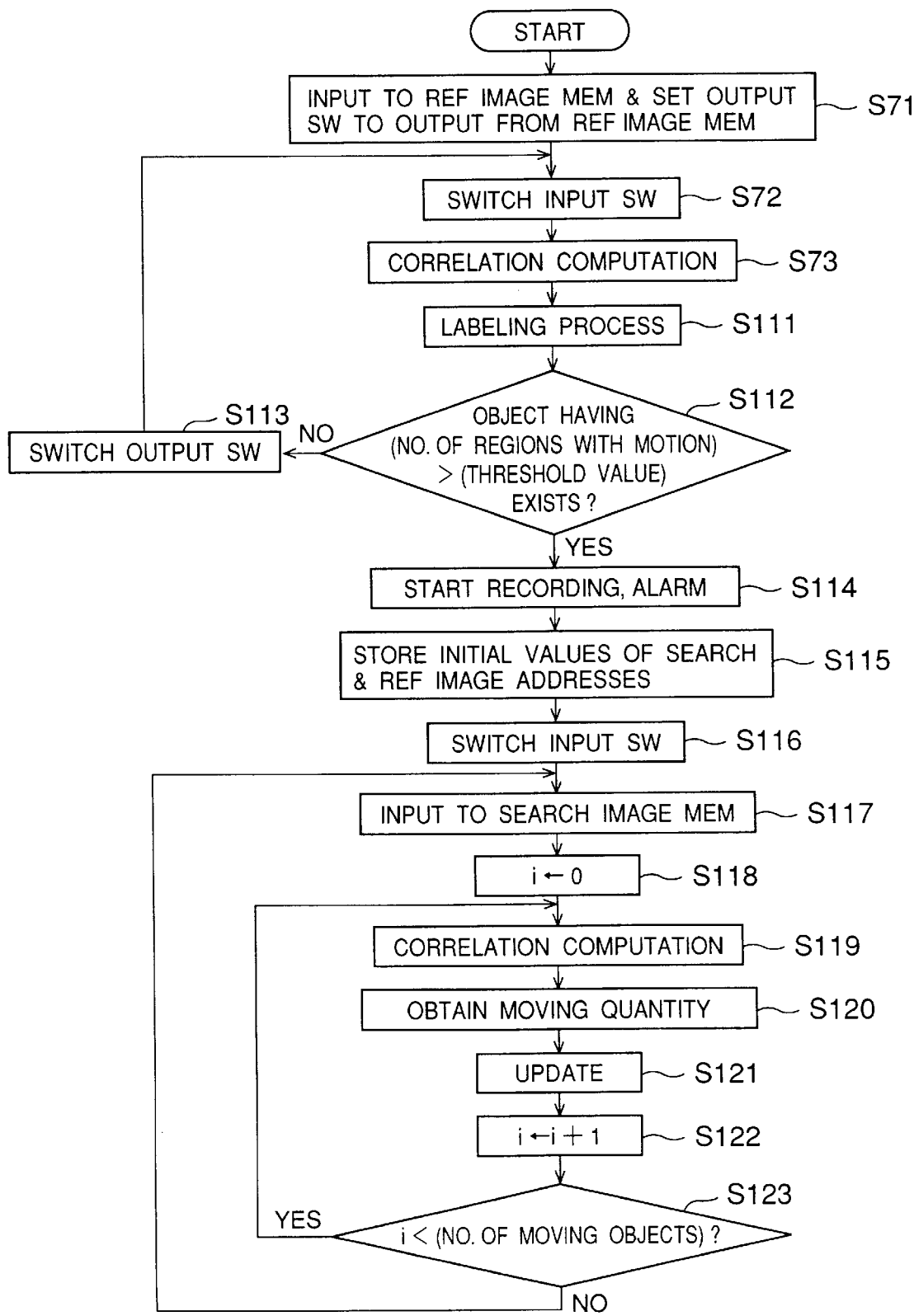
FIG. 69 is a flow chart for explaining the operation of a twenty-first embodiment of the local region image tracking apparatus according to the present invention.

FIG. 69 is a flow chart for explaining the operation of the twenty-first embodiment. In FIG. 69, those steps which are the same as those corresponding steps in FIG. 59 are designated by the same reference numerals, and a description thereof will be omitted. In this embodiment, it is assumed for the sake of convenience that the camera 501 is fixed, and a plurality of moving objects (intruding objects) within the field of vision of the fixed camera 501 are automatically tracked. Hence, it is possible to omit the camera base controller 208 and the camera base 209 shown in FIG. 58 and provided with the moving means such as the motor. For example, a camera having a wide-angle lens and having a wide field of vision is suited for use as the fixed camera 501.

In FIG. 69, when the process from the step S71 up to the step S73 is carried out, a step S111 carries out the labeling process in the control computer 212 with respect to each region of the input image in which the motion is generated, so as to divide the input image into individual intruding objects. Hence, this step S111 corresponds to the process shown in FIG. 68. Next, a step S112 decides in the control computer 212 whether or not there exists an object for which the number of regions in which the motion is generated is greater than a threshold value. If the decision result in the step S112 is NO, a step S113 switches and controls the output switch 211 from the control computer 212, and the process returns to the step S72.

Other hand, if the decision result in the step S112 is YES, a step S114 starts the recording of the input image data by the video recorder 201 from the control computer 212, and generates the alarm from the alarm unit 205. A step S115 stores the position of the reference image (template image) for use in the tracking process of each intruding object (or moving object) for which the number of regions in which the motion is generated is greater than the threshold value within the control computer 212 or into a memory that is connected to the control computer 212, as the initial values of the search image address and the reference image address. A step S116 switches and controls the input switch 210 from the control computer 212, and a step S117 stores the input image data in the search image memory 503. A step S118 sets i to "0" from the control computer 212.

A step S119 sets the search image address and the reference image address that are stored for the intruding object (i) in the address generator 506B from the control computer 212, and the correlation computing unit 505 carries out the correlation computation. In addition, a step S120 obtains the moving quantity of the intruding object (i) in the correlation value peak position detector 507, and a step S121 updates the search image address in the control computer 212 by adding the moving quantity to the search image address of the intruding object (i). A step S122 increments i by "1" in the control computer 212, and a step S123 decides whether or not i is smaller than the number of intruding objects. If the decision result in the step S123 is YES, the process returns to the step S119. On the other hand, the process returns to the step S117 if the decision result in the step S123 is NO.

According to this embodiment, it is possible to carry out the tracking process with respect to each of the plurality of intruding objects (moving objects) within the field of vision of the fixed camera.

Figure 70:
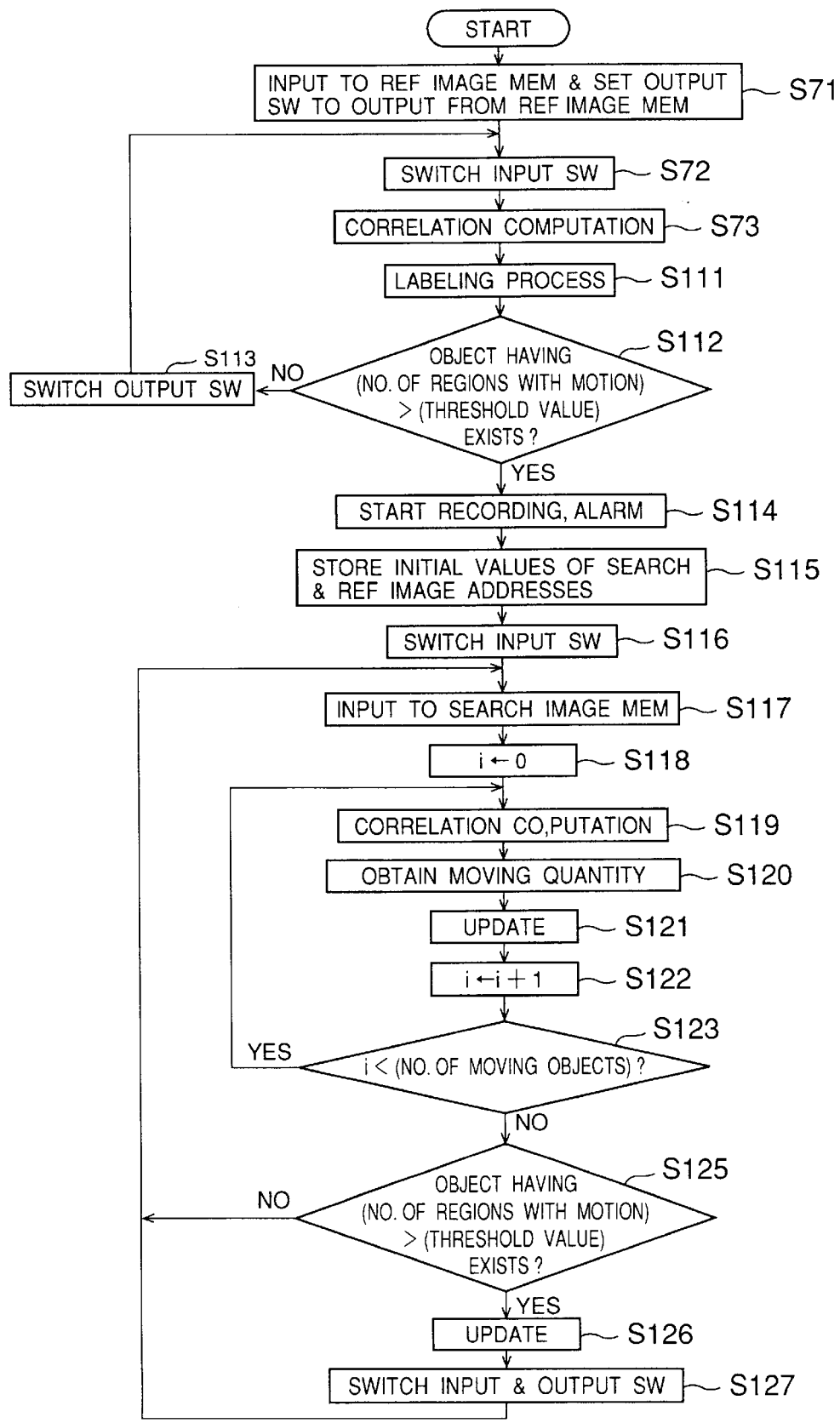
FIG. 70 is a flow chart for explaining the operation of a twenty-second embodiment of the local region image tracking apparatus according to the present invention.

Next, a description will be given of a twenty-second embodiment of the local region image tracking apparatus according to the present invention, by referring to FIG. 70. In this embodiment, the construction of the local region image tracking apparatus is identical to that shown in FIG. 58, and an illustration and description thereof will be omitted. FIG. 70 is a flow chart for explaining the operation of the twenty-second embodiment. In FIG. 70, those steps which are the same as those corresponding steps in FIG. 69 are designated by the same reference numerals, and a description thereof will be omitted.

In this embodiment, it will be assumed for the sake of convenience that the camera 501 is fixed, and that a plurality of moving objects (intruding objects) within the field of vision of the fixed camera 501 are automatically tracked while automatically updating the reference images. Hence, it is possible to omit the camera base controller 208 and the camera base 209 shown in FIG. 58 and provided with the moving means such as the motor. For example, a camera having a wide-angle lens and having a wide field of vision is suited for use as the fixed camera 501.

In FIG. 70, the process from the step 571 up to the step S122 is identical to that shown in FIG. 69. However, in FIG. 70, the process advances to a step S125 if the decision result in the step S123 is NO. The step S125 decides in the control computer 212 whether or not there exists an intruding object for which the peak value of the correlation value is greater than a threshold value. The process returns to the step S117 if the decision result in the step S125 is NO. On the other hand, if the decision result in the step S125 is YES, a step S126 updates the reference image address of each intruding object to the present search image address in the control computer 121. In addition, a step S127 switches and controls the input switch 210 and the output switch 211 from the control computer 212, and the process returns to the step S117.

According to this embodiment, even if there exists at least one intruding object having a deteriorated correlation value, it is possible to positively track each of the intruding objects because the reference images are updated for each screen, that is, the reference images of all of the intruding objects are updated.

Figure 71:
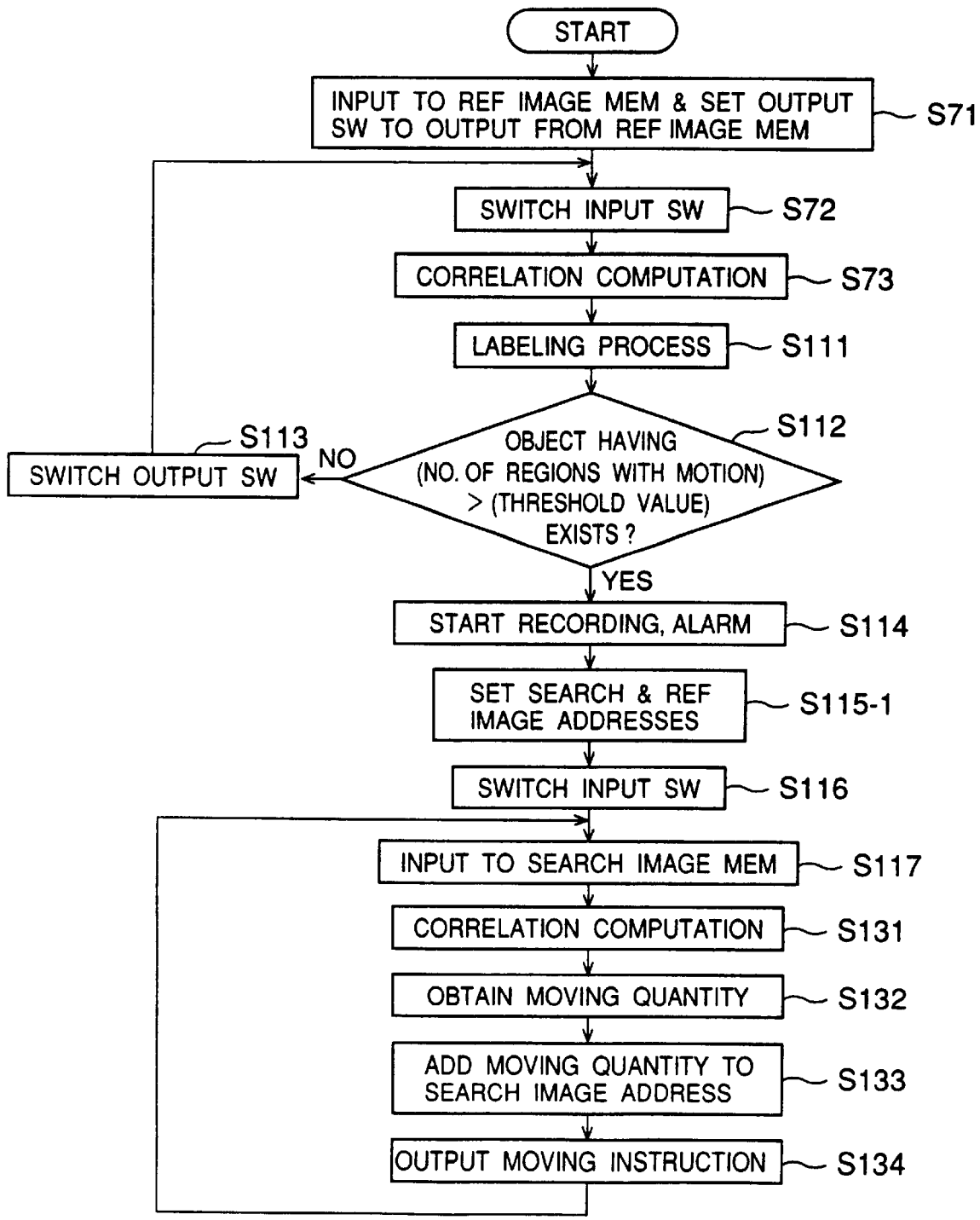
FIG. 71 is a flow chart for explaining the operation of a twenty-third embodiment of the local region image tracking apparatus according to the present invention.

Next, a description will be given of a twenty-third embodiment of the local region image tracking apparatus according to the present invention, by referring to FIG. 71. In this embodiment, the construction of the local region image tracking apparatus is identical to that shown in FIG. 58, and an illustration and description thereof will be omitted. FIG. 71 is a flow chart for explaining the operation of the twenty-third embodiment. In FIG. 71, those steps which are the same as those corresponding steps in FIG. 69 are designated by the same reference numerals, and a description thereof will be omitted.

In this embodiment, the camera 501 is movable by the camera base controller 208 and the camera base 208 which is provided with a moving means such as the motor.

In FIG. 71, after the step S114, a step S115-1 sets the position of the reference image for use in the tracking process with respect to the intruding object having the largest number of regions in which the motion is generated in the address generator 506B as the search image address and the reference image address by the control computer 212. The steps S116 and S117 are the same as those shown in FIG. 69. After the step S117, a step S131 controls the address generator 506B from the control computer 212, and the correlation computing unit 505 carries out the correlation computation by reading the search image data and the reference image data from the search image memory 503 and the reference image memory 207-1 or 207-2. A step S132 obtains the moving quantity of the intruding object by the correlation value peak position detector 507, and a step S133 adds the moving quantity to the search image address and sets the added value to the address generator 506B from the control computer 212. A step S134 outputs a moving instruction from the control computer 212 for controlling the camera base 209 via the camera base controller 208 depending on the moving quantity so that the intruding object is located at the central portion of the screen, and the process thereafter returns to the step S117.

According to this embodiment, the largest of the plurality of intruding objects which are detected, that is, the intruding object having the largest sum total of the regions in which the motion is detracted, is automatically selected and automatically tracked by controlling the camera base 209. Thus, this embodiment is particularly suited for application in an unattended monitoring system or the like.

Next, a description will be given of a twenty-fourth embodiment of the local region image tracking apparatus according to the present invention, by referring to FIG. 72. In this embodiment, the construction of the local region image tracking apparatus is identical to that shown in FIG. 64, and an illustration and description thereof will be omitted. FIG. 72 is a flow chart for explaining the operation of the twenty-fourth embodiment. In FIG. 72, those steps which are the same as those corresponding steps in FIG. 69 are designated by the same reference numerals, and a description thereof will be omitted.

In this embodiment, 2 cameras 501 and 501-1 are used. Preferably, the tracking is carried out by the camera 501 having a wide field of vision while updating the reference images of a plurality of intruding objects, and the individual intruding objects are sequentially picked up on the zoom camera 501-1.

In FIG. 72, if the decision result in the step S112 is YES, a step S141 stores the position of the reference image (template image) for use in the tracking process of each intruding object (or moving object) for which the number of regions in which the motion is generated is greater than a threshold value within the control computer 212 or into a memory that is connected to the control computer 212, as the initial values of the search image address and the reference image address. A step S142 switches and controls the input switch 210 from the control computer 212, and sets j to "0". A step S143 stores the input image data in the search image memory 503, and sets i to "0".

A step S144 sets the search image address and the reference image address that are stored for the intruding object (i) in the address generator 506B from the control computer 212, and the correlation computing unit 505 carries out the correlation computation. In addition, a step S145 obtains the moving quantity of the intruding object (i) in the correlation value peak position detector 507, and a step S146 updates the search image address in the control computer 212 by adding the moving quantity to the search image address of the intruding object (i). A step S147 increments i by "1" in the control computer 212, and a step S148 decides whether or not i is smaller than the number of intruding objects. If the decision result in the step S148 is YES, the process returns to the step S144. On the other hand, the process advances to a step S149 if the decision result in the step S148 is NO. The step S149 decides whether or not there exists an object for which a peak value of the correlation value is greater than a threshold value, and the process returns to the step S143 if the decision result is NO. On the other hand, the process advances to a step S150 if the decision result in the step S149 is YES.

The step S150 updates the reference image address of each intruding object to the present search image address in the control computer 212. A step S151 switches and controls the input switch 210 and the output switch 211 from the control computer 212, and a step S152 decides in the control computer 212 whether or not the image pickup time has ended. If the decision result in the step S152 is YES, a step S153 increments j by "1" in the control computer 212, and a step S154 decides in the control computer 212 whether or not j is smaller than the number of intruding objects. If the decision result in the step S154 is YES, a step S155 outputs a moving instruction from the control computer 212 for controlling the camera base 209-1 so that the zoom camera 501-1 faces the direction of the moving object (i), so as to start the image pickup. If the decision result in the step S152 or S154 is NO or, after the step S155, the process returns to the step S143.

According to this embodiment, it is possible to carry out the tracking process with respect to each of the plurality of intruding objects (moving objects) while updating the reference images of the intruding objects. Furthermore, it is possible to pick up the image of each of the intruding objects in sequence by the zoom camera. For this reason, it is possible to monitor the plurality of intruding objects in a satisfactory manner.

In each of the embodiments described above, parts of the local region image tracking apparatus excluding the camera, the camera base, the A/D converter, the video recorder and the alarm unit may easily be made in the form of a package as a semiconductor device or a semiconductor device unit, for example. In addition, the camera base controller may be provided externally to the package by excluding the camera base controller from the package. Moreover, the A/D converter may be included in the package.

Of course, it is possible to arbitrarily combine the fifteenth through twenty-fourth embodiments described above.

Further, the present invention is not limited to these embodiments, but various variations and modifications may be made without departing from the scope of the present invention.

What is claimed is:

1. A local region image tracking apparatus, comprising:
an image data bus coupled to an image pickup unit and transferring therefrom input image data representing an input image; and
a plurality of correlation tracking processors, coupled in parallel to said image data bus, each correlation tracking processor capable of independently tracking a respective local region of the input image each correlation tracking processor including:
at least three image memories;
a selector that selects, from the at least three image memories, an input image memory that stores received input image data included in the input image data, a search image memory that stores search image data representing a search image included in the input image, and a reference image memory that stores reference image data, the search image including a local region to be tracked and the reference image data being related to the local region;
an address generator that generates a search image address to identify the search image memory and a reference image address to identify the reference image memory;
a correlation computing unit that computes a correlation value indicating a correlation between the reference image data and the search image data; and
a peak position detector that detects a peak position within the input image, the peak position having a correlation value indicating a highest correlation.

2. The local region image tracking apparatus as claimed in claim 1, wherein the input image data includes a plurality of frames and wherein the selector controls, for each of the correlation tracking processors, in accordance with a predetermined storage sequence:
storage of the received input image data to the input image memory for tracking with each frame of the input image data;
storage of each frame of the search image data to the search image memory; and
updating of the reference image data at arbitrary frame intervals.

3. The local region image tracking apparatus as claimed in claim 1, wherein:
each of the correlation tracking processors further includes a fourth image memory; and
wherein the selector controls, for each of the correlation processors, in accordance with a predetermined storage sequence:
storage of the received input image data to the input image memory for tracking with each frame of the received input image data;
storage of each frame of the search image data to the search image memory; and
storage of the reference image data to the reference image memory and successive reference image data to at least another image memory.

4. The local region image tracking apparatus as claimed in claim 1, wherein: the reference image data represents a reference image consisting of a square array of pixels having 16 pixels on each side thereof; and
the search image is larger than the reference image and includes a plurality of partial region images.

5. The local region image tracking apparatus as claimed in claim 1, wherein the image pickup unit generates the input image data in accordance with a first number of processing bits, and further comprising a converter that converts the input image data into converted image data in accordance with a second number of processing bits, the second number corresponding to processing by said plurality of correlation tracking processors.

6. The local region image tracking apparatus as claimed in claim 5, wherein:
the first number is larger than the second number;
the input image data is color image data with each color represented by the first number of processing bits; and
the converted image data is pseudo-color data with each pseudo-color represented by the second number of processing bits.

7. The local region image tracking apparatus as claimed in claim 5, wherein said converter includes a memory that prestores a conversion table.

8. The local region image tracking apparatus as claimed in claim 5, wherein:
the image pickup unit includes a memory that stores a conversion table; and
said converter converts the input image data in accordance with the conversion table.

9. A local region image tracking apparatus, comprising:

an image data bus coupled to an image pickup unit and transferring therefrom input image data representing an input image; and a plurality of correlation tracking processors coupled in parallel to said image data bus and distributively tracking the local region by comparing, for each local region, search image data representing a search image including the local region with reference image data related to the local region, each correlation tracking processor including:

at least three image memories;

a selector that selects from the image memories, for each of a successive series of iterations, an input memory that stores received input image data included in the input image data, a search image memory that stores search image data representing a search image included in the input image, and a reference image memory that stores reference image data, the search image including a local region to be tracked and the reference image data being elated to the local region;

a first-in-first-out memory that temporarily and successively stores a plurality of successive reference image data read from the image memories and a plurality of successive search image data read from the image memories; and a correlation computing unit that computes a correlation value indicating a correlation between a successive reference image data read from the first-in-first-out memory and a corresponding successive search image data read from the first-in-first-out-memory.

10. A local region image tracking apparatus for distributive local region image tracking, comprising: an image data bus coupled to an image pickup unit and transferring therefrom input image data representing an input image;

a plurality of correlation tracking processors coupled in parallel to said image data bus, each correlation tracking processor including a plurality of image memories, a selected image memory thereof storing reference image data relating to a local region included in the input image and to be tracked;

a control computer bus having said plurality of correlation tracking processors coupled thereto in parallel; and a control computer coupled to said control computer bus and communicating therethrough with each of the correlation tracking processors to control updating of the reference image data and selection and switching of the image memories in the correlation tracking processor.

11. The local region image tracking apparatus as claimed in claim 10, wherein for each of the correlation tracking processors the plurality of image memories includes at least three image memories, and each of the correlation tracking processors further comprises:

a selector that selects from the image memories an input image memory that stores received input image data included in the input image data, a search image memory that stores search image data representing a search image included in the input image, and a reference image memory that stores the reference image data;

a correlation computing unit that computes a correlation value indicating a correlation between the reference image data and the search image data;

a peak position detector that detects a peak position within the input image, the peak position having a correlation value indicating a highest correlation; and a control computer interface, coupled to the selector means and to said control computer bus.

12. The local region image tracking apparatus as claimed in claim 11, wherein for each of the correlation tracking processors said control computer registers, through said control computer bus, an instruction in the control computer interface to update the reference image date at a first arbitrary time.

13. The local region image tracking apparatus as claimed in claim 8, wherein for each of the correlation tracking processors the control computer interface comprises a first first-in-first-out memory that successively stores instructions from said control computer, the instructions controlling the correlation tracking processor to track the local region without intervention from said control computer.

14. The local region image tracking apparatus as claimed in claim 13, wherein for each of the correlation tracking processors:

the control computer interface comprises a second first-in-first-out memory that successively stores at least one of the correlation value from the correlation computing unit and the peak position from the peak position detector; and said control computer reads information stored in the second first-in-first-out memory at a second arbitrary time.

15. The local region image tracking apparatus as claimed in claim 11, wherein for each of the correlation tracking processors the control computer interface comprises:

a storage device that stores a correlation value distribution comprising a plurality of correlation values obtained from the correlation computing unit during tracking of the local region; and an adder that adds the first correlation value distribution to a second correlation value distribution obtained with respect to tracking the local region.

16. The local region image tracking apparatus as claimed in claim 15, wherein for each of the correlation tracking processors the control computer interface is controlled by an instruction from said control computer indicating whether to add the first and second correlation value distributions.

17. The local region image tracking apparatus as claimed in claim 11, wherein for each of the correlation tracking processors said control computer controls the control computer interface, for tracking of the local region with respect to a reference image having an arbitrary magnifications, by:

generating, for each of a plurality of fixed-size adjacent reference images, a correlation value distribution obtained from the correlation computing unit in accordance with the adjacent reference image, the adjacent reference image being represented by the reference image data;

obtaining a sum of all of the correlation value distributions for the respective adjacent reference images; and obtaining a peak position of the sum.

18. The local region image tracking apparatus as claimed in claim 11, wherein for each of the correlation tracking processors said control computer registers, through said control computer bus, an instruction in the control computer interface to read at a first arbitrary time data representing the local region from the search image memory and the reference image memory.

19. The local region image tracking apparatus as claimed in claim 11, wherein for each of the correlation tracking processors the control computer interface comprises a storage that stores at least one of the correlation value from the correlation computing unit and the peak position from the peak position detector, said control computer reading information stored in the storage at a first arbitrary time through said control computer bus.

20. The local region image tracking apparatus as claimed in claim 10, wherein each of the correlation tracking processors tracking processors includes:
   a first-in-first-out memory that temporarily and successively stores a plurality of successive reference image data read from the image memories and a plurality of successive search image data read from the image memories; and
   a correlation computing unit that computes a correlation value on the basis of the successive search image data and the successive reference image data successively stored in the first-in-first-out memory.

21. A local region image tracking apparatus which continuously tracks an arbitrary local region within a search image that is described by search image data by comparing the search image data to be subjected to a tracking process out of input image data picked up by image pickup means with reference image data related to the arbitrary local region, said local region image tracking apparatus comprising:
   at least three image memories;
   selector means for selectively switching said image memories to an input image memory which stores the input image data, a search image memory which stores the search image data, and a reference image memory which stores the reference image data;
   correlation computing means for computing a correlation value which indicates a correlation between the reference image data stored in the reference image memory and the search image data stored in the search image memory by carrying cut a correlation computing process;
   peak position detecting means for obtaining a peak position of the correlation value from said correlation computing means; and
   image memory managing means for controlling said selector means based on the peak position from said peak position detecting means and successively storing a history of the reference image data in said image memory, so as to update the reference image data based on a history of the peak position of the correlation value stored within the search image memory.

22. The local region image tracking apparatus as claimed in claim 21, which further comprises:
   correlation comparing means for updating the reference image data by setting the image memory which stores the reference image data having a maximum correlation value as a result of the tracking process as the reference image memory via said image memory managing means based on the peak position from said peak position detecting means.

23. The local region image tracking apparatus as claimed in claim 21, which further comprises:
   correlation evaluating means for evaluating the correlation of the reference image data stored in the reference image memory as a result of the tracking process based on the peak position from said peek position detecting means, and updating the reference image data based on the evaluated correlation value.

24. The local region image tracking apparatus as claimed in claim 23, wherein said correlation evaluating means updates the reference image data to most recent reference image data only when the correlation value becomes less than or equal to a predetermined threshold value during the tracking process.

25. The local region image tracking apparatus as claimed in claim 23, which further comprises:
   correlation comparing means for updating the reference image data by setting the image memory which stores the reference image data having a maximum correlation value as a result of the tracking process as the reference image memory via said image memory managing means based on the peak position from said peak position detecting means only when said correlation evaluating means detects that the correlation value has become less than a predetermined threshold value during the tracking process.

26. A local region image tracking apparatus which continuously tracks an arbitrary local region within a search image that is described by search image data by comparing the search image data to be subjected to a tracking process out of input image data picked up by image pickup means that is supported on moving means with reference image data related to the arbitrary local region, said local region image tracking apparatus comprising:
   memory means for storing at least the search image data and the reference image data;
   reference image data generating means for automatically generating the reference image data from the input image data;
   address generating means for generating addresses for reading the search image data and the reference image data from said memory means;
   correlation computing means for computing a correlation value which indicates a correlation between the reference image data and the search image data read from said memory means by carrying out a correlation computing process; and
   control means for outputting a moving instruction which moves said image pickup means by said moving means so as to track the arbitrary local region based on a peak position of the correlation value obtained from said correlation computing means.

27. The local region image tracking apparatus as claimed in claim 25, wherein said memory means stores the input image data, and said reference image data generating means compares the input image data and a preset background image data and generates the reference image data based on a difference between the compared image data.

28. The local region image tracking apparatus as claimed in claim 26, wherein said reference image data generating means divides the input image data at predetermined time intervals into a plurality of regions, obtains the regions in which motion is generated by carrying out the correlation computing process in said correlation computing means with respect to each of the divided regions, and generates the reference image data based on whether or not a number of regions in which the motion is generated exceeds a predetermined value.

29. The local region image tracking apparatus as claimed in claim 26, wherein said control means updates the reference image data by setting an address of the search image data into said address generating means as an address of the reference image data when the peak value of the correlation value exceeds a predetermined value.

30. The local region image tracking apparatus as claimed in claim 26, wherein said image pickup means comprises zoom means, and said control means controls a zoom value of said zoom means so that the arbitrary local region is gradually picked up with a preset zoom setting value.

31. The local region image tracking apparatus as claimed in claim 30, wherein said control means outputs a signal indicating one of an alarm and a start of recording of the input image data based on the motion in the arbitrary local region and the zoom value.

32. The local region image tracking apparatus as claimed in claim 26, wherein said control means comprises:

means for assigning a label to each of a plurality of local regions to identify each of the local regions; and means for carrying out the tracking process with respect to a largest local region out of the plurality of labeled local regions.

33. The local region image tracking apparatus as claimed in claim 26, wherein said image pickup means comprises:

a first image pickup device movably supported on said moving means; and a second image pickup device having zoom means, said control means outputting a moving instruction which controls said first image pickup device to track the arbitrary local region and controls a direction of said second image pickup device depending on a zoom ratio.

34. The local region image tracking apparatus as claimed in claim 33, wherein said control means comprises:

means for assigning a label to each of a plurality of local regions to identify each of the local regions; and means for controlling said first image pickup device to carry out the tracking process with respect to the plurality of labeled local regions and controlling said second image pickup means to zoom up on each of the labeled local regions in sequence.

35. A local region image tracking apparatus which continuously tracks an arbitrary local region within a search image that is described by search image data by comparing the search image data to be subjected to a tracking process out of input image data picked up by image pickup means with reference image data related to the arbitrary local region, said local region image tracking apparatus comprising:

memory means for storing at least the search image data and the reference image data;

reference image data generating means for automatically generating the reference image data related to a plurality of local regions from the input image data;

labeling means for labeling the plurality of local regions to identify the plurality of local regions;

address generating means for generating addresses for reading the search image data and the reference image data from said memory means;

correlation computing means for computing a correlation value which indicates a correlation between the reference image data and the search image data read from said memory means by carrying out a correlation computing process with respect to each of the plurality of labeled local regions; and control means for tracking the plurality of labeled local regions based on a peak position of the correlation value obtained from said correlation computing means.

36. The local region image tracking apparatus as claimed in claim 35, wherein said memory means stores the input data, and said reference image data generating means compares a preset background image data and the input image data and generates the reference image data based on a difference between the compared image data.

37. The local region image tracking apparatus as claimed in claim 35, wherein said reference image data generating means divides the input image data at predetermined time intervals into a plurality of regions, obtains the regions in which motion is generated by carrying out the correlation computing process in said correlation computing means with respect to each of the divided regions, and generates the reference image data based on whether or not a number of regions in which the motion is generated exceeds a predetermined value.

38. The local region image tracking apparatus as claimed in claim 35, wherein said control means updates the reference image data for each of the local regions by setting an address of the search image data into said address generating means as an address of the reference image data when the peak value of the correlation value exceeds a predetermined value.

39. The local region image tracking apparatus as claimed in claim 35, wherein said control means outputs a signal indicating one of an alarm and a start of recording of the input image data based on the motion in each of the local regions.

40. A local region image tracking apparatus for continuously tracking a plurality of local regions within a search image represented by search image data, said local region image tracking apparatus comprising:

at least four image memories;

a selector that selects, from the at least four image memories, an input image memory that stores input image data, a search image memory that stores the search image data, and a reference image memory that stores reference image data relating to a selected local region in the plurality of local regions;

a correlation computing unit that computes a correlation value indicating a correlation between the reference image data and the search image data representing a specified local region included in the plurality of local regions;

a peak position detector that obtains a peak position when the correlation value indicates a highest correlation within the input image; and an image memory manager that controls said selector based on the peak position from said peak position detector.

41. The local region image tracking apparatus as claimed in claim 40, wherein said image memory manager identifies a plurality of successive reference image data stored in at least one image memory included in said at least four image memories, and further comprising a correlation comparator that designates next reference image data in the plurality of successive reference image data when the designated successive reference image data has a corresponding peak position with a maximum correlation value relative to the reference image data and the other successive reference image data.

42. The local region image tracking apparatus as claimed in claim 40, further comprising a correlation evaluator that designates the input image data as next reference image data when the correlation value of the peak position of the search image data satisfies a predetermined condition.

43. The local region image tracking apparatus as claimed in claim 42, wherein the predetermined condition includes the condition that the correlation value of the peak position is greater than or equal to a predetermined threshold value.

44. A local region image tracking apparatus for continuously tracking a local region within a search image represented by search image data, said local region image tracking apparatus comprising:

at least one memory that stores the search image data and reference image data related to the local region, the search image data being included in input image data picked up by a motorized image pickup unit;

a motion detector that automatically generates the reference image data on the basis of the input image data;

an address generator that generates addresses for reading the search image data and the reference image data from the at least one image memory;

a correlation computing unit that computes a correlation value indicating a correlation between the reference image data and the search image data; and a controller that generates a moving instruction controlling the motorized image pickup unit to track the specified local region based on a peak position of the correlation value obtained from said correlation computing unit.

45. The local region image tracking apparatus as claimed in claim 44, wherein the at least one image memory stores the input image data, and the motion detector compares the input image data with a preset background image data and generates the reference image data based on a difference therebetween.

46. The local region image tracking apparatus as claimed in claim 44, wherein the motion detector:

receives the input image data at a predetermined time interval;

divides the input image data into a plurality of regions including the local region;

identifies at least one motion region from among the plurality of regions when said correlation computing unit computes a respective correlation value indicating motion in the at least one motion region;

compares an enumeration of the at least one motion region with a predetermined region value; and identifies next reference image data in accordance with a result of comparing the enumeration with the predetermined region value.

47. The local region image tracking apparatus as claimed in claim 46, wherein:

the motorized image pickup unit includes a zoom mechanism responsive to a zoom value generated by said controller; and said controller adjusts the zoom value by at least one zoom increase value in accordance with a target zoom value when the motion detector determines that the enumeration exceeds the predetermined region value.

48. The local region image tracking apparatus as claimed in claim 44, further comprising a peak position detector that obtains a peak position when the correlation value indicates a highest correlation within the input image, and wherein said controller designates the search image data as next reference image data when the correlation value of the peak position exceeds a predetermined threshold value.

49. The local region image tracking apparatus as claimed in claim 44, wherein said controller includes:

a labeling section that assigns an identifying label to each one of a plurality of regions included in the input image, the plurality of regions including the local region; and a decision section that determines a largest local region from the plurality of regions and controls said motion detector to track the largest region.

50. The local region image tracking apparatus as claimed in claim 44, wherein the motorized image pickup unit includes:

a first image pickup device supported on a movable support; and a second image pickup device having a zoom mechanism; and wherein said controller generates a moving instruction to control the first image pickup device to track the local region and to control the second image pickup device in accordance with a zoom ratio.

* * * * *

UNITED STATES PATENT AND TRADEMARK OFFICE
CERTIFICATE OF CORRECTION

PATENT NO.: 5,838,365
DATED : November 17, 1998
INVENTOR(S): Naoyuki SAWASAKI et al.

It is certified that error appears in the above-identified patent and that said Letters Patent is hereby corrected as shown below:

Col. 9, line 27, delete ")".

Col. 17, line 1, delete "it at";
line 49, change "74" to --74B--.

Col. 24, line 14, change "n=5" to --m=5--.

Col. 33, line 23, delete ",".

Col. 37, line 22, delete ",".

Col. 39, line 20, change "571" to --S71--.

Col. 44, line 13, change "8" to --11--.

Col. 45, line 65, change "peek" to --peak--.

Signed and Sealed this

Eleventh Day of May, 1999

Attest:

Q. TODD DICKINSON

*Attesting Officer*   Acting Commissioner of Patents and Trademarks